(12) United States Patent
Liu

(10) Patent No.: US 7,592,915 B2
(45) Date of Patent: Sep. 22, 2009

(54) RFID CONVEYOR SYSTEM

(75) Inventor: Zhong-Min Liu, Doylestown, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 49 days.

(21) Appl. No.: 11/387,629

(22) Filed: Mar. 23, 2006

(65) Prior Publication Data

US 2006/0232422 A1 Oct. 19, 2006

Related U.S. Application Data

(60) Provisional application No. 60/773,634, filed on Feb. 15, 2006, provisional application No. 60/666,938, filed on Mar. 29, 2005.

(51) Int. Cl.
*G08B 13/14* (2006.01)
(52) U.S. Cl. .................. 340/572.1; 340/572.8; 343/751
(58) Field of Classification Search ... 340/572.1–572.9; 343/751, 866; 235/435
See application file for complete search history.

(56) References Cited

U.S. PATENT DOCUMENTS

| | | | |
|---|---|---|---|
| 3,295,134 A | 12/1966 | Lowe | 343/100 |
| RE29,911 E | 2/1979 | Munson | 343/700 |
| 4,893,129 A | 1/1990 | Kodera et al. | 343/700 |
| 5,005,001 A | 4/1991 | Cordery | |
| 5,126,749 A | 6/1992 | Kaltner | |
| 5,210,541 A | 5/1993 | Hall et al. | 343/700 |
| 5,303,815 A | 4/1994 | Dooley | |
| 5,382,959 A | 1/1995 | Pett et al. | 343/700 |

(Continued)

FOREIGN PATENT DOCUMENTS

EP 0 135 049 3/1985 ............. 13/24

(Continued)

OTHER PUBLICATIONS

European Search Report dated Jul. 11, 2006.

(Continued)

*Primary Examiner*—Phung Nguyen
(74) *Attorney, Agent, or Firm*—Nelson Mullins Riley & Scarborough, LLP

(57) ABSTRACT

A conveyor system processes items on which radio frequency identification tags are disposed and includes a frame and a conveyor that is disposed moveably on the frame and that conveys items through a path of travel, each item having at least one respective radio frequency identification tag disposed thereon. An antenna is disposed on the frame with respect to the path of travel so that the antenna radiates radio frequency signals into a first area through which the items pass. The antenna comprises a substrate and a plurality of patch elements having respective generally planar surfaces and that are disposed on the substrate in respecting positions that are sequential with respect to a direction transverse to the path of travel. The generally planar surfaces of the patch elements are generally coplanar. The antenna includes a feed network that applies respective signals to each patch element that drive electric current at the patch elements to radiate the radio frequency signals. The respective signals applied by the feed network to at least two patch elements define a predetermined phase shift with respect to each other. A radio frequency transmitter drives the antenna to emit the radio frequency signals.

18 Claims, 51 Drawing Sheets

U.S. PATENT DOCUMENTS

| | | | |
|---|---|---|---|
| 5,510,803 A | 4/1996 | Ishizaka et al. | |
| 5,523,749 A | 6/1996 | Cole et al. | |
| 5,661,494 A | 8/1997 | Bondyopadhyay | 343/700 |
| 5,686,928 A | 11/1997 | Pritchett et al. | 343/711 |
| 5,881,886 A | 3/1999 | Lawandy | |
| 5,884,754 A | 3/1999 | Fromm | |
| 5,927,475 A | 7/1999 | Santicchi | |
| 5,929,760 A | 7/1999 | Monahan | |
| 5,943,017 A | 8/1999 | Cosenza et al. | 343/700 |
| 5,995,048 A | 11/1999 | Smithgall et al. | 343/700 |
| 6,107,921 A * | 8/2000 | Eberhardt et al. | 340/572.7 |
| 6,114,961 A | 9/2000 | Denholm et al. | |
| 6,215,402 B1 | 4/2001 | Rao Kodukula et al. | 340/572.8 |
| 6,259,413 B1 | 7/2001 | Schmidt et al. | |
| 6,278,368 B1 | 8/2001 | Goldberg et al. | |
| 6,288,677 B1 | 9/2001 | Fink | 343/700 |
| 6,320,542 B1 | 11/2001 | Yamamoto et al. | 343/700 |
| 6,362,787 B1 | 3/2002 | Judd et al. | 343/700 |
| 6,473,054 B1 | 10/2002 | Lopez et al. | 343/820 |
| 6,538,603 B1 * | 3/2003 | Chen et al. | 342/372 |
| 6,943,688 B2 | 9/2005 | Chung et al. | |
| 6,967,579 B1 | 11/2005 | Elizondo | |
| 7,088,248 B2 | 8/2006 | Forster | |
| 7,183,921 B2 * | 2/2007 | Bonnell et al. | 340/572.1 |
| 7,183,922 B2 * | 2/2007 | Mendolia et al. | 340/572.1 |
| 7,187,288 B2 * | 3/2007 | Mendolia et al. | 340/572.1 |
| 7,195,159 B2 | 3/2007 | Sloan et al. | |
| 7,221,269 B2 | 5/2007 | Onderko et al. | |
| 7,277,469 B2 | 6/2007 | Varner et al. | |
| 7,323,996 B2 | 1/2008 | Mullins | |
| 7,345,635 B2 | 3/2008 | Hohler | |
| 2002/0084945 A1 | 7/2002 | Huebner | 343/853 |
| 2003/0038747 A1 | 2/2003 | Patel et al. | 343/368 |
| 2003/0179093 A1 | 9/2003 | Hartmann et al. | 340/572.7 |
| 2003/0184477 A1 | 10/2003 | Shafai et al. | 343/700 |
| 2003/0227414 A1 | 12/2003 | Saliga et al. | 343/725 |
| 2004/0070503 A1 | 4/2004 | Monahan | |
| 2004/0257294 A1 * | 12/2004 | Bernard et al. | 343/866 |
| 2005/0099358 A1 | 5/2005 | McCarrick | 343/853 |
| 2005/0110641 A1 | 5/2005 | Mendolia et al. | 340/572.7 |
| 2005/0159187 A1 * | 7/2005 | Mendolia et al. | 455/562.1 |
| 2006/0226989 A1 | 10/2006 | Hillegass | 340/572.7 |
| 2006/0232420 A1 | 10/2006 | Cox | 340/572.7 |
| 2006/0232421 A1 | 10/2006 | Liu | 340/572.7 |
| 2006/0232423 A1 | 10/2006 | Cox | 340/572.7 |
| 2006/0238351 A1 | 10/2006 | Hillegass | 340/572.7 |
| 2006/0238352 A1 | 10/2006 | Hillegass et al. | 340/572.7 |
| 2006/0238353 A1 | 10/2006 | Cox | 340/572.7 |
| 2006/0244607 A1 | 11/2006 | Liu et al. | 340/572.7 |
| 2006/0244608 A1 | 11/2006 | Cox | 340/572.7 |
| 2006/0244609 A1 | 11/2006 | Liu | 340/572.7 |
| 2006/0244610 A1 | 11/2006 | Cox | 340/572.7 |
| 2006/0244611 A1 | 11/2006 | Cox | 340/572.7 |
| 2006/0250253 A1 | 11/2006 | Liu | 340/572.7 |
| 2007/0185613 A1 | 8/2007 | Feldenzer | |

FOREIGN PATENT DOCUMENTS

| | | | |
|---|---|---|---|
| EP | 1 612 579 | 1/2006 | 13/75 |
| GB | 2308504 | 12/1995 | |

OTHER PUBLICATIONS

European Patent Office Communication pursuant to Article 96(2) EPC, dated Jul. 11, 2006.

Response to European Patent Office Communication of Nov. 21, 2006, dated May 22, 2007.

Official Communication from the European Patent Office in European application 06251664.6, dated Jul. 5, 2007.

Response to European Patent Office Communication of Jul. 5, 2007, dated Jan. 11, 2008, in a corresponding European application.

Claims as presently pending in U.S. Appl. No. 11/387,667.

* cited by examiner

RFID CONVEYOR SYSTEM

The present application claims priority to U.S. Provisional Application No. 60/666,938, entitled RFID Tracking System and filed Mar. 29, 2005, and U.S. Provisional Application No. 60/773,634, entitled RFID Tracking System and filed Feb. 15, 2006, the entire disclosure of each of which is incorporated by reference herein.

BACKGROUND OF THE INVENTION

Most item tracking systems in commercial settings can be classified as either a supply chain system or a manufacturing system. Manufacturing systems generally track items that remain within a facility, whereas supply chain systems generally track items that move into, through and out of a facility. One common supply change system is a distribution center conveyor system on which boxes or other packages from a receiving area are placed and transported to one or more stations at which the packages are identified, sorted and distributed to appropriate locations depending on the sortation. It is well known in such systems to employ bar code labels to the packages to thereby affix relevant information, for example manufacturer and package contents, that can be read by barcode scanners disposed along the conveyor. The scanner outputs information to a controller that associates the information with the package and outputs the associated information to a host system that can then manage the package's progression to its ultimate destination.

Barcode systems, although having developed to a high degree of reliability, suffer from certain inherent limitations in that they require a line of sight between the barcode scanner and the label, and the barcode label must be applied on the package so as to be optically readable. In contrast, radio frequency identification (RFID) tags do not require an optical line of sight for reading by an RFID reader.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
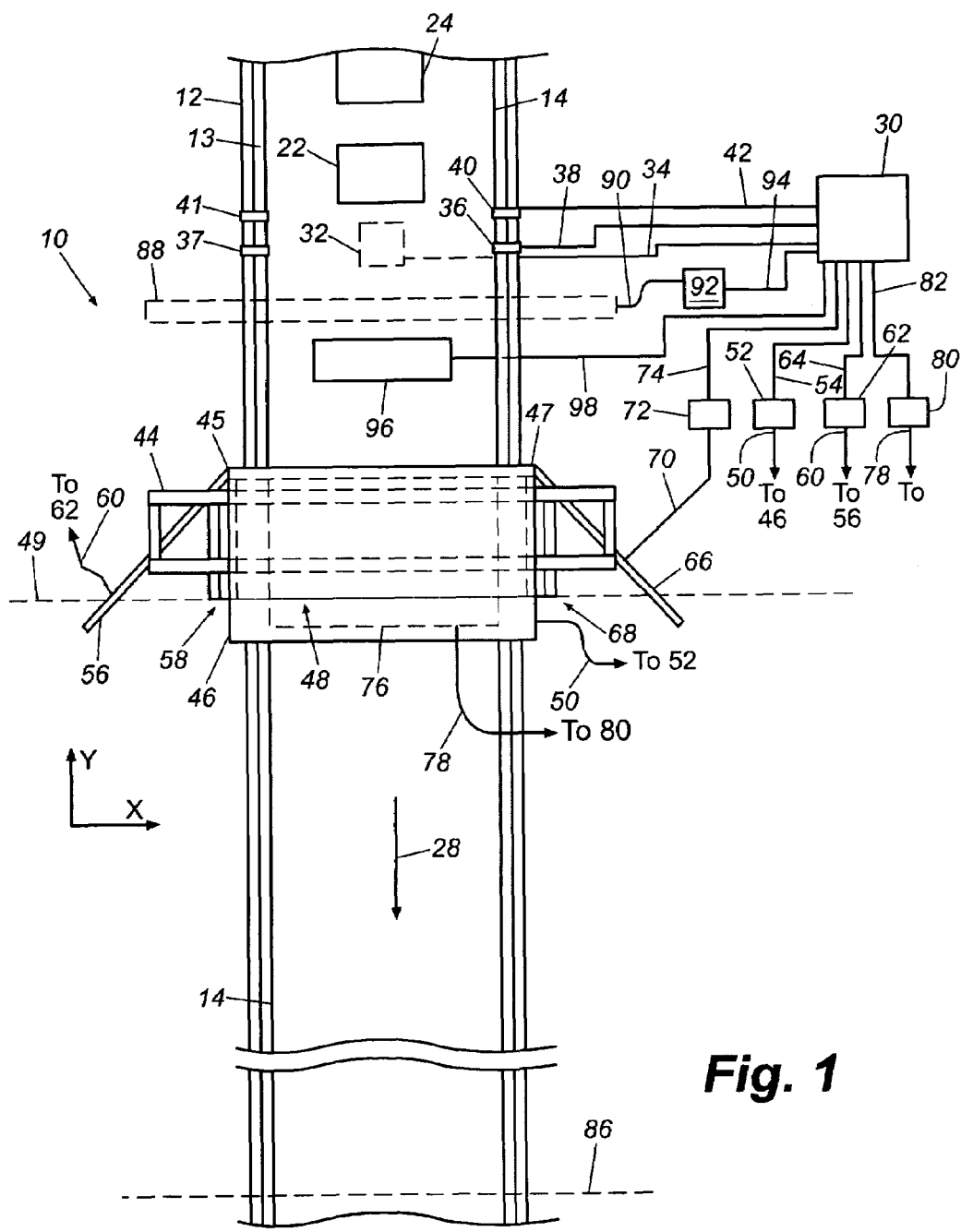
FIG. 1 is a schematic view of a conveyor system in accordance with an embodiment of the present invention.

Repeat use of reference characters in the present specification and drawings is intended to represent same or analogous features or elements of the invention.

DETAILED DESCRIPTION

Reference will now be made in detail to presently preferred embodiments of the invention, one or more example of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure.

Referring to FIG. 1, a conveyor system 10 includes a belt 14 and a frame 12 that defines a generally planar horizontal top surface 13 extending the length of the conveyor and over which belt 14 carries a plurality of successive packages, e.g. boxes 22 and 24, in the belt's running direction (indicated at 28) from an upstream entry point indicated schematically at 26. Top surface 13 may be comprised of a series of rollers extending transverse to running direction 28, a planar metal sheet, or a combination of both. The specific construction of the conveyor frame and belt is not, in and of itself, a part of the present invention, nor is the present invention limited to any particular such construction.

As described in more detail below, an RFID high speed controller ("HSC") 30 interfaces multiple RFID antenna engines and other devices in tracking packages 22 and 24 as they progress down the conveyor. In the presently described embodiment, HSC 30 is a PENTIUM equivalent microprocessor that is part of an industrial computer. HSC 30 runs the WINDOWS XP EMBEDDED operating system and is programmed with several threads developed under the WINDOWS.NET platform and written in the VB.NET language. It should be understood, however, that the organization and operation of these threads as described herein is provided for purposes of illustration only and that a control program may be written in any suitable language for operation on any suitable operating system.

A tachometer wheel ("TAC") 32 is attached to frame 12 in contact with the underside of conveyor belt 14 so that TAC 32 rotates with movement of belt 14 and outputs (to HSC 30 over a connection line 34) pulses that correspond to the belt's linear movement over top surface 13. Because the pulse signals correlate in a consistent manner to movement of conveyor belt 14 in direction 28, they are used by HSC 30 to selectively track the locations of packages 22 and 24 along conveyor system 10.

A photodetector 36 is disposed on the frame next to the belt so that a line of sight is defined across and just above the belt between photodetector 36 and a retroreflective sensor 37 disposed on the frame opposite the photodetector. Photodetectors and retroreflective sensors should be understood in this art and are available, for example, from Rockwell Automation/Allen-Bradley of Chelmsford, Mass. Because the photodetector line of sight is perpendicular to the path of conveyor belt 14, packages 22 and 24 traveling down conveyor system 10 interrupt the line of sight as they move in direction 28, thereby causing detector 36 to output a first signal to HSC 30 via a connection line 38 at the point the package's leading edge enters the line of sight. Photodetector 36 outputs a second signal to HSC 30 when the package's trailing edge passes out of the line of sight. HSC 30 monitors the number of TAC pulses between reception of the first and second signals and thereby determines the length of the package. Although a photo-eye is described herein with respect to the presently illustrated embodiments, it should be understood that any other suitable presence detector, such as a light curtain or transfer plate system, for detecting an object may be used.

A second photodetector 40 is disposed on conveyor frame 12 at a distance upstream from first photodetector 36 less than the length (in direction 28) of the smallest-length package the conveyor is expected to carry. Second photodetector 40 and an opposing reflector 41 are attached to conveyor frame 12 so that a resulting line of sight is perpendicular to the conveyor belt's path at a predetermined height above conveyor belt 14 so that the photodetector detects the presence or absence of packages of at least the predetermined height. When the leading edge of such a package crosses the line of sight, second photodetector 40 outputs a corresponding signal to HSC 30 via a connection line 42. As described below, the height of the second photodetector 40 line of sight corresponds to the minimum height of packages it is desired to monitor by an overhead antenna. In presently preferred embodiments, the second line of sight is 24 inches and 28 inches, respectively, above the surface of conveyor belt 14, but this variable is configurable by the user, and it should be understood that the user can set the height variable as desired for varying conditions. Furthermore, it should also be understood that second photodetector may be comprised of a single photo-eye disposed at the predetermined height, a light curtain having a variable output, or any other suitable presence detector capable of outputting a signal corresponding to package height. Where a single photo-eye is employed, the detector's binary signal indicates the presence or absence of a package of the predetermined height. When a light curtain is used, however, the output varies with actual package height, and HSC 30 therefore determines whether a package of the predetermined height has occurred through analysis of the light curtain output. Thus, the "line of sight" for a light curtain arrangement is defined by the sensor output in combination with logic at the HSC.

An antenna frame 44 is disposed on conveyor frame 12 at a predetermined distance downstream from first photodetector 36. As described in more detail below, frame 44 defines an RFID antenna tunnel through which packages 22 and 24 travel for detection of RFID tags disposed on the packages. Very generally, the tunnel is defined by a top antenna 46, a pair of side antennas 56 and 66 and a bottom antenna 76, each of which defines a radiation pattern that extends from the respective antenna toward an area above belt 14 through which the packages travel.

A top antenna 46 is attached horizontally to the top of antenna frame 44 so that the antenna is disposed directly above frame 12, spans transversely across the path of belt 14 on the side of the belt on which packages are conveyed and is angled so that antenna 46, and therefore the center of its radiation pattern, faces belt 14 at a 45 degree angle (with respect to a horizontal plane parallel to the conveyor belt) in the downstream direction. In the illustrated embodiment, it is desired to read tags on the packages only when the packages enter a predetermined detection zone, in this instance beginning at a line 49 defined by the downstream edge of a series of radiation absorbent pads associated with the top and side antennas. With respect to top antenna 46, a stack of absorber pads 48 are attached to the top of antenna frame 44 at the upstream edge of top antenna 46 so that absorber pads 48 are disposed just below and close to the antenna. Absorber pads 48, which are generally planar in shape and extend parallel to conveyor belt 14 across the width of antenna 46, significantly shield the pattern and thereby inhibit antenna 46 from detecting upstream RFID tags.

A feed line 50 connects top antenna 46 to an antenna engine 52 that drives transmission signals to the antenna and receives and processes signals received by the antenna. An output line 54 connects antenna engine 52 to HSC 30.

Side antenna 56 is attached to the left side of frame 44 and laterally offset from the belt so that the antenna is oriented in a vertical plane (perpendicular to the horizontal plane in which belt 14 is disposed) at a 45 degree angle with respect to a vertical plane including the conveyor belt's centerline and so that antenna 56, and therefore the center of its radiation pattern, faces the conveyor belt at a 45 degree angle (with respect to a vertical plane parallel to the belt's center line) in the downstream direction. Antenna 56 is disposed sufficiently high on the left side of antenna frame 44 so that the bottom of antenna 56 is above the plane of conveyor belt 14. Absorber pads 58 are attached to the left side of antenna frame 44 between antenna 56 and belt 14 so that the pads extend from the antenna's upstream edge 45 downstream to line 49. Pads 58 extend parallel to a vertical plane including the belt's centerline to a height at least equal the height of antenna 56. Similarly to pads 48, absorber pads 58 absorb radiation from antenna 56 and thereby block at least a part of the antenna's upstream radiation pattern to thereby inhibit detection of RFID tags upstream of a line extending transversely across the belt at the upstream edges of side antennas 56 and 66.

A feed line 60 connects left side antenna 56 to an antenna engine 62 that drives transmission signals to the antenna and that receives and processes signals received by the antenna. An output line 64 connects antenna engine 62 to HSC 30.

Side antenna 66 is attached to the right side of antenna frame 44 so that the antenna is oriented in a vertical plane (perpendicular to the horizontal plane in which belt 14 is disposed) at a 45 degree angle with respect to a vertical plane including the conveyor belt's centerline and so that antenna 66, and therefore the center of its radiation pattern, faces the conveyor belt at a 45 degree angle (with respect to a vertical plane parallel to the belt's center line) in the downstream direction. Antenna 66 is disposed sufficiently high on the right side of antenna frame 44 so that the bottom of antenna 66 is above the plane of belt 14. Absorber pads 68 are attached to the right side of antenna frame 44 between antenna 66 and belt 14 so that the pads extend from the antenna's upstream edge 47 downstream to line 49. Pads 68 are of identical construction and orientation to pads 58. Similarly to pads 58, pads 68 absorb radiation from antenna 66 and thereby block at least a part of the antenna's upstream radiation pattern to thereby inhibit detection of RFID tags upstream of the transverse line at the side antenna's upstream edges.

A feed line 70 connects right side antenna 66 to an antenna engine 72 that drives transmission signals to the antenna and that receives and processes signals received by the antenna. An output line 74 connects antenna engine 72 to HSC 30.

A fourth antenna 76 is disposed in a horizontal plane below belt 14 so that the antenna's radiation pattern extends upward and above the belt surface. Antenna 76 is located directly between antennas 56 and 66 and directly below antenna 46. A feed line 78 connects bottom antenna 76 to an antenna engine 80 that drives transmission signals to the antenna and that receives and processes signals received by the antenna. An output line 82 connects antenna engine 80 to HSC 30.

Figure 19:
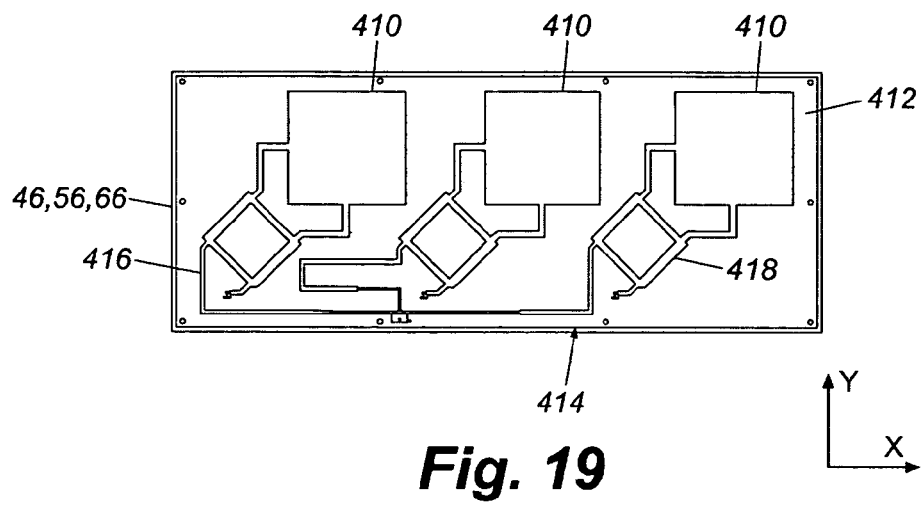
FIG. 19 is a schematic illustration of an RF antenna for use with top and side antennas in a conveyor system as in FIG. 1.

Antennas 46, 56, and 66 are patch antennas that transmit and receive in the range of 902 MHz to 928 MHz. Such patch antennas should be understood in this art, and it should be understood that various types of antenna arrangements could be employed in the present system. Referring to FIG. 19, for example, each patch antenna 46, 56 and 66 is comprised of three patch elements 410 disposed on a dielectric substrate 412 on the opposite side of the substrate from a ground plane. A drive signal to each patch is provided by a feed network 414 comprised of respective feed lines 416 that provide the drive signal to respective square connectors 418. The side of each square patch is approximately 5.15 inches, which is approximately one-half the wavelength of the drive signal. The feed lines to each patch attach to adjacent sides of the patch midway along the sides' lengths. The construction of the patches, and the materials comprising antennas 46, 56 and 66, are similar to that of the construction of bottom antenna 76, which is discussed in detail below.

Figure 20A:
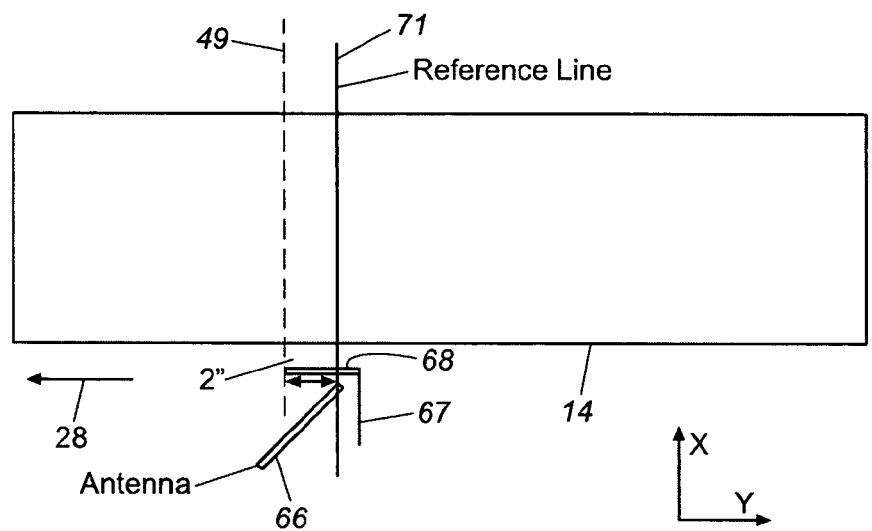
FIG. 20A is a schematic illustration of a side antenna in a conveyor system as in FIG. 1.
Figure 20B:
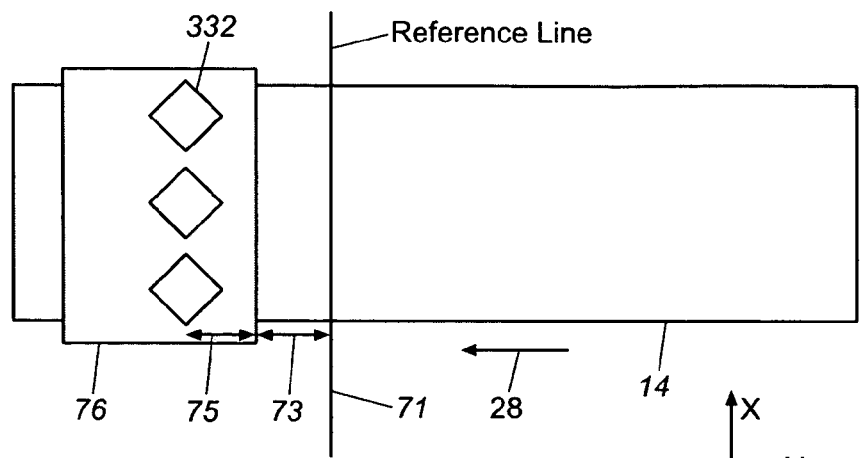
FIG. 20B is a schematic illustration of a bottom antenna in a conveyor system as in FIG. 1.
Figure 20C:
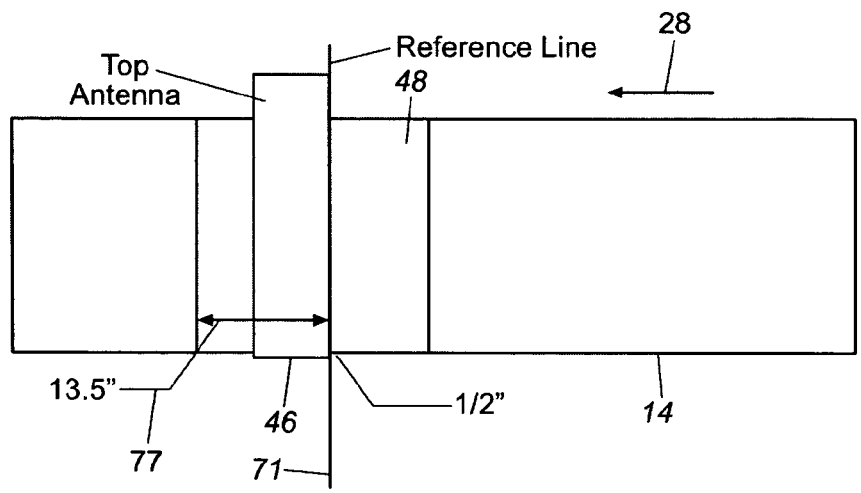
FIGS. 20C and 20D are schematic illustrations of a top antenna in a conveyor system as in FIG. 1.
Figure 21:
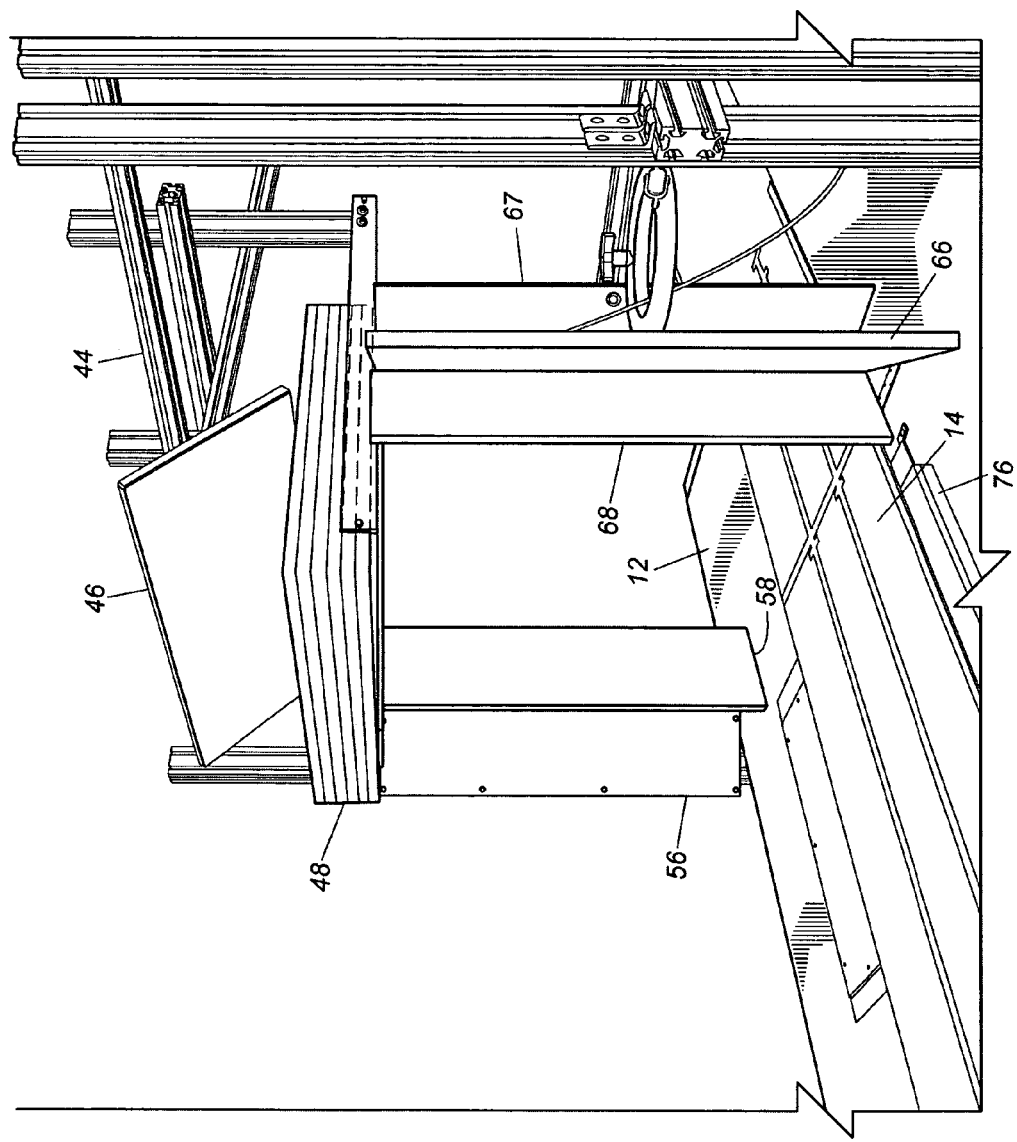
FIG. 21 is a perspective view of an antenna tunnel for use in a conveyor system as in FIG. 1.

FIGS. 20A-20C schematically illustrate the disposition of the top, side and bottom antennas with respect to the absorber pads and the conveyor belt. FIG. 21 is a perspective view of an exemplary antenna tunnel.

Referring to FIG. 20A, side antenna 66 is disposed beside conveyor belt 14 approximately 2 inches above the conveyor frame. A metal plate 67 extends vertically upward from the conveyor and has an L-shaped cross-section in the X-Y plane. The length of each leg of metal plate 67 is approximately 7.5 inches. The length (in the Y direction) of ferrite absorber pads 68 is approximately 7.75 inches, such that the absorber pads extend slightly downstream of the downstream edge of metal plate 67.

Side antenna 56 (not shown in FIG. 20A) is the mirror image of antenna construction 66, as shown in FIG. 21. A reference line 71 can be considered to extend transversely across conveyor belt 14 at the back edges of antennas 66 and 56. Upstream from this line (with respect to the belt's running direction 28), there should be no detection of RFID tags by the antenna tunnel. Moreover, absorber pads 58 and 68 significantly reduce the antenna radiation pattern between reference lines 71 and line 49. Thus, while it is possible that an RFID tag may be read between lines 71 and 49, the absorber pads reduce this likelihood.

Referring to FIG. 20B, bottom patch antenna is disposed at a distance 73 (approximately 8 inches) downstream from reference line 71. The transverse center line of patch elements 332 is a distance 75 (approximately 7 inches) downstream of the leading edge of antenna 76, resulting in an approximately 15 inch downstream distance between reference line 71 and the line of patch elements 332.

Figure 20D:
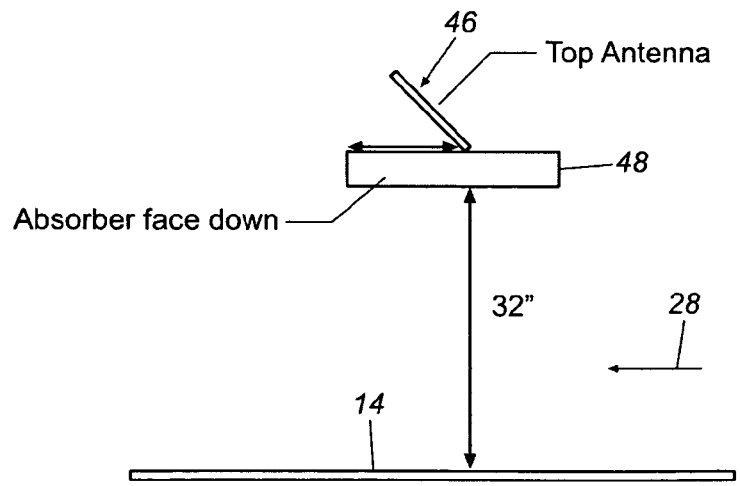

Referring to FIG. 20C top antenna 46 is disposed so that its upstream edge is aligned with reference line 71. Absorber pads 48 extend upstream and downstream from antenna 46, the downstream edge of absorber pads 48 being at a distance 77 (approximately 13.5 inches) from reference line 71. Thus, the downstream edge of absorber pads 48 extend downstream from line 49 (FIG. 20A). Referring also to FIG. 20D, absorber pads 48 are disposed approximately 32 inches above the surface of conveyor belt 14.

As should be understood in the art, each of antennas 46, 56 and 66 exhibit circular polarization in a plane parallel to the front surface of the antenna. That is, the antenna tends to strongly detect a dipole antenna disposed in such a parallel plane but tends not to detect a dipole antenna to the extent it is oriented perpendicular to such a plane. Because most packages expected to pass through the presently described RFID antenna tunnel embodiment are six-sided boxes with relatively planar sides, the RFID tag antenna disposed on those sides are likely to be disposed in vertical planes parallel or perpendicular to the longitudinal center line of conveyer belt 14 or parallel to the belt's horizontal plane. Accordingly, while alignment of the side and top antennas parallel and perpendicular to such planes would increase the likelihood the antennas would detect some RFID tags, such an arrangement could eliminate one or more of the antennas from reading tags with perpendicular antennas, thereby possibly increasing the likelihood the tag will not be read. To increase the possibility that any one of the three antennas can detect a tag passing through the tunnel, the antennas are disposed at the 45° angles discussed above, although it should be understood that this angle may be varied.

While the present embodiment employs four radio frequency antennas, it should be understood that other configurations and constructions are possible. For instance, various types of RF antennas, in various configurations, could be employed depending on conveyor system size and configuration, antenna cost, and RFID tag antenna variations.

Figure 4:
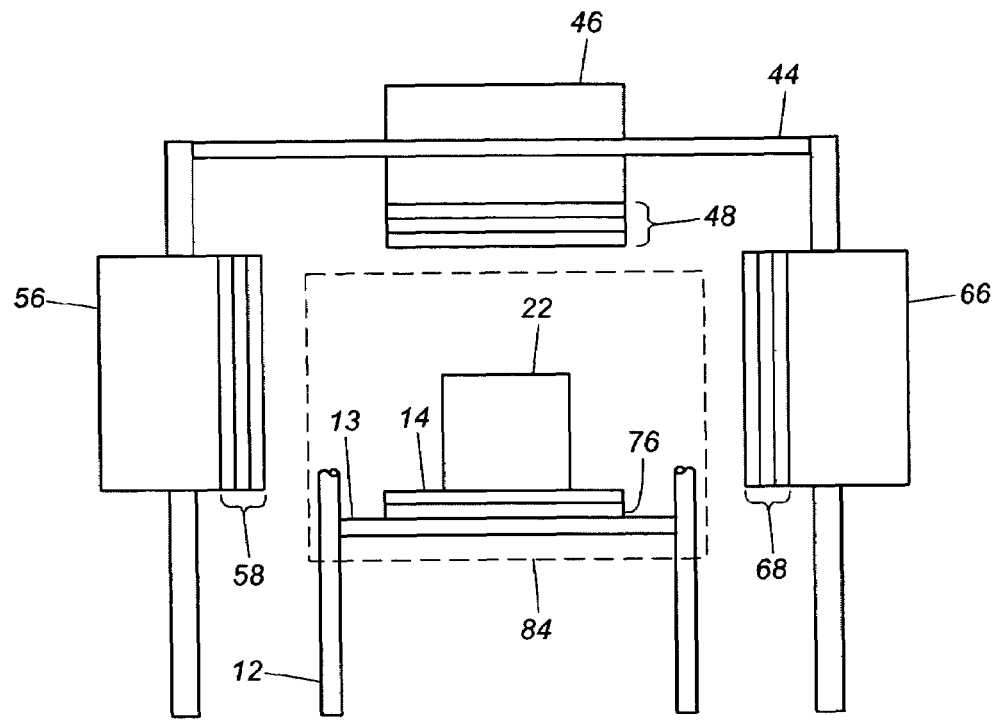
FIG. 4 is a front schematic view of the conveyor system shown in FIG. 1.

Referring to FIGS. 1 and 4, a start window 84 (FIG. 4) is defined by a plane intersecting conveyor belt 14 at transverse line 49 (FIG. 1) and marks the beginning of the most efficient antenna reading zone. A transmit point 86 is defined by a second vertical plane transverse to and intersecting conveyor belt 14. The transmit point marks the location at which HSC 30 saves information associated with a given package and removes the information from a package queue. In the presently described embodiment, transmit point 86 is located downstream from start window 84 at a distance of or greater than twice the maximum package length (in the belt's longitudinal direction) of a package expected to be carried by the conveyor, plus the maximum spacing between packages. For instance, if conveyor system 10 is to convey packages up to 36 inches in length at a between-package spacing of up to 15 inches, the minimum distance (along the path of travel of belt 14) between start window 84 and transmit point 86 is 87 inches.

Figure 3:
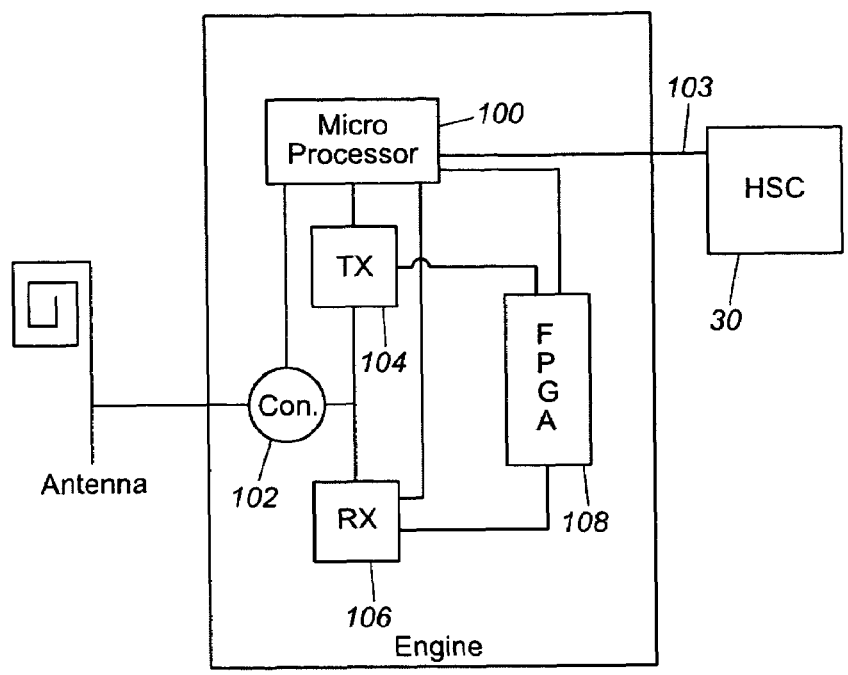
FIG. 3 is a schematic illustration of an RF engine for use in a system as in FIGS. 1 and 2.

Antenna engines 52, 62, 72, and 80 are identical. Each is comprised of the schematically illustrated components of FIG. 3, including a microprocessor 100, connector 102, transmitter 104, receiver 106, and FPGA 108. Connector 102 connects transmitter 104 and receiver 106 to the antenna's feed line. Transmitter 104 and receiver 106 connect in turn to FPGA 108. Microprocessor 100 controls connector 102, transmitter 104, receiver 106 and FPGA 108 and communicates with HSC 30 via a connection line 103. HSC 30 initiates a transmission from the antenna by a command to microprocessor 100. In response, microprocessor 100 sends a bit sequence to transmitter 104, which then transmits the signal at a specified frequency and power level to the antenna via connector 102 and the antenna's feed line. The antenna returns a detected signal from an RFID tag to receiver 106 via the antenna's feed line and connector 102. Receiver 106 removes the carrier signal and sends the resulting information signal to FPGA 108. FPGA 108 extracts digital data from the receiver's signal and outputs a resulting digital signal to microprocessor 100, which then transmits the digital data to HSC 30. RFID engines suitable for use in the presently disclosed system are available from AWID Wireless Informations, Inc. of Monsey, N.Y.; Symbol Technologies, Inc. of San Jose, Calif. (e.g. the Matrics AR400); and ThingMagic of Cambridge, Mass. (e.g. the MERCURY 4).

Conveyor system 10 may also include a scout reader 88 disposed between photodetector 36 and antenna frame 44. In one preferred embodiment, scout reader 88 is identical in construction and arrangement to the antenna tunnel defined by antennas 46, 56, 66 and 76 and includes an antenna frame, top antenna, opposing side antennas, bottom antenna and respective RFID engines as discussed above. For ease of explanation, the separate feed lines from the engines of scout reader 88 (corresponding to feed lines 50, 60, 70, and 78) are indicated as a single connection line 90 in FIG. 1. Similarly, the antenna engines of scout reader 88 (corresponding to antenna engines 52, 62, 72, and 80) are indicated collectively as antenna engine 92, and the output lines (corresponding to output lines 54, 64, 74, and 82) are indicated collectively at output line 94. Output lines 94 connect the scout reader antenna engines 92 with HSC 30.

A barcode scanner 96 is disposed above belt 14 at a point between photodetector 36 and transmit point 86. Barcode scanner 96 reads barcode labels on packages 22 and 24 and outputs corresponding information to HSC 30 via a connection line 98. Barcode scanner 96 can comprise any suitable bar code scanning system capable of reading barcode labels on packages traveling at a speed defined by conveyor system 10 and outputting corresponding information to a computer such as HSC 30, for example as available from Accu-Sort Systems, Inc. of Telford, Pa.

Figure 2:
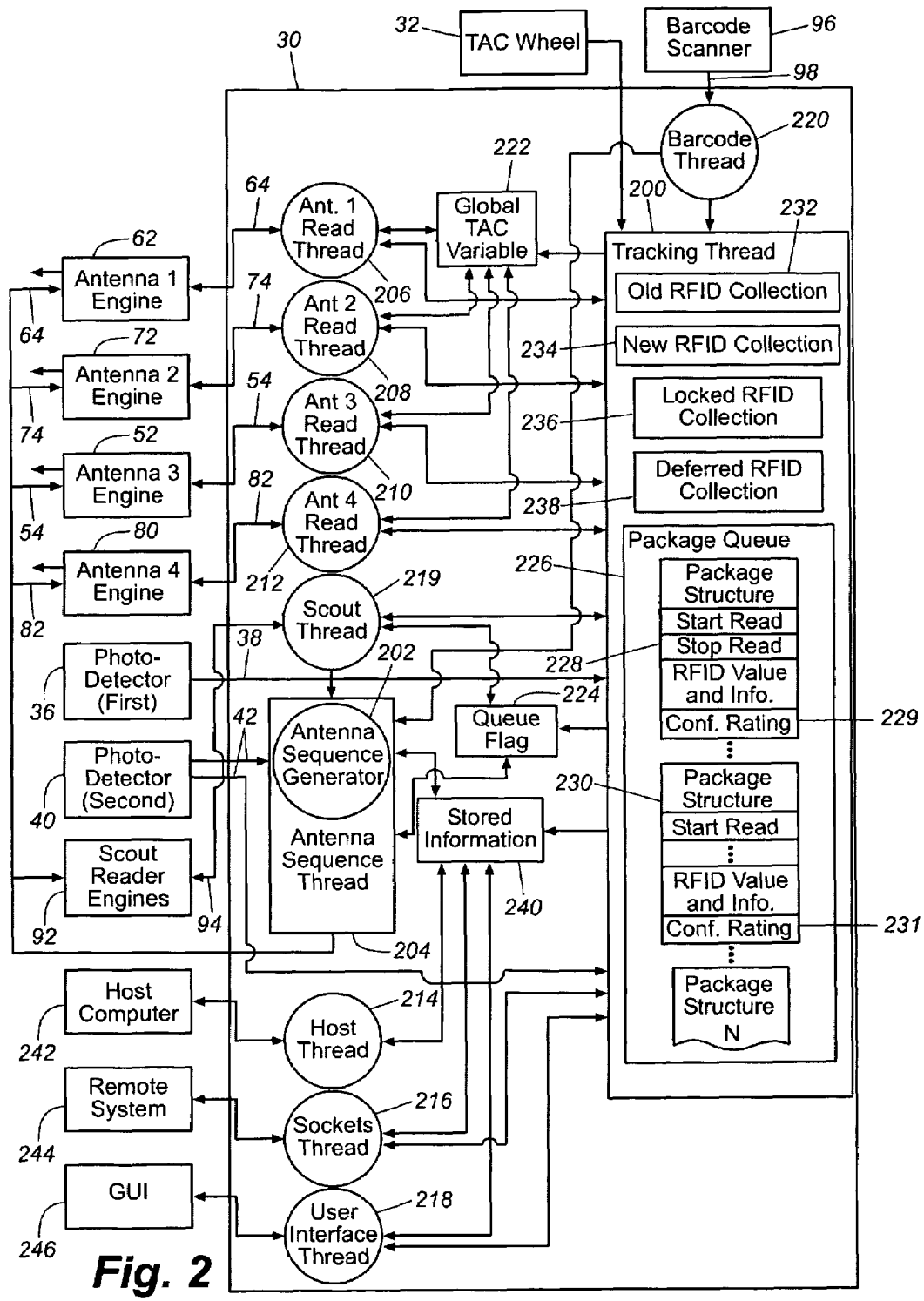
FIG. 2 is a functional block diagram of a tracking system for use with the conveyor system as in FIG. 1.

As noted above, HSC 30 comprises a PENTIUM equivalent microprocessor running the WINDOWS XP EMBEDDED operating system and is programmed with several threads developed under the WINDOWS.NET platform and written in the VB.NET language. Referring to FIG. 2, the software supported by HSC 30 for operating the RFID tracking system described herein includes a tracking thread 200, engine read threads 206, 208, 210 and 212, an antenna sequence generator 202, an antenna sequence thread 204, a host thread 214, a socket thread 216, a user interface thread 218 and a barcode thread 220.

Tracking thread 200 is set to the highest priority defined by the operating system and runs continuously until encountering a sleep command and thereafter entering a 1 millisecond ("ms") sleep period. Antenna sequence thread 204 is also set to the operating system's highest priority and has a dynamically-set sleep time that defaults to 2 ms. Read engine threads 206, 208, 210, and 212 are set to above-normal priority and sleep for 3 ms.

Tracking thread 200 handles communications with tachometer 32. As long as conveyor belt 14 moves in direction 28, TAC 32 constantly sends corresponding pulse signals to HSC 30. Tracking thread 200 receives these signals and increments a global TAC variable 222 with the TAC pulse id. That is, global TAC variable 222 is a running count of TAC pulses from a defined start point. Referring also to FIG. 1, when belt 14 moves a first package 22 so that it crosses into the photodetector 36 line of sight, photodetector 36 immediately transmits a signal to tracking thread 200 via connection line 38. At this point, package 22 has entered the tracking system. Accordingly, upon receipt of the signal, tracking thread 200 creates a package structure 228 with an id unique to the new package (unique, at least, with respect to other packages otherwise presently in the tracking system). The tracking thread stores in the package structure both the value of the global TAC variable at the point photodetector 36 detected the package and an initialized (i.e., zero) local TAC value. That is, tracking thread 200 identifies the package and identifies its starting position in the tracking system by a zero local TAC value, associating those two values in package structure 228. As the conveyor belt moves the package through the conveyor system, tracking thread 200 increments the package's local TAC value in its package structure 228 at each subsequent TAC pulse. Thus, the local TAC value in structure 228 represents the distance the package associated with the package structure has moved from the point at which it first reached photodetector 36. Additionally, the sum of the package structure's local TAC variable and its initially stored global TAC value (referred to herein as the "running TAC value") can be used to compare the associated package's position with respect to other events that may occur downstream from photodetector 36.

Package structure 228 also includes a start-of-read window distance and a stop-read window distance. The start-of-read window represents the TAC pulse distance between photodetector 36 and start window 84. At each incoming TAC pulse, tracking thread 200 decrements the start-of-read window distance so that, at any given time between the point at which the leading edge of package 22 enters the photodetector 26 line of sight and the point at which the package's leading edge reaches start window 84, the start-of-read window distance represents the number of tachometer pulses (the "TAC distance") remaining between the package's leading edge and start window 84. That is, the start-of-read window distance represents the distance package 22 needs to travel before entering the package's RFID detection zone.

Referring also to FIGS. 1 and 4, package structure 228 also includes a stop-read window variable that defines the length of the detection zone, more specifically corresponding to a distance (again, preferably defined in TAC pulses) a package will travel beyond start window 84 during which tracking thread 200 will correlate RFID information received from the antennas with the package and store such information in the associated package structure 228. In other words, the stop-read window is the distance downstream from start window 84 through which the package will pass while the tracking system attempts to read RFID tags that may be attached to the package. When the package first enters the tracking system at photodetector 36, tracking thread 200 initializes the stop-read window to a predefined default distance defined in TAC pulses. In the presently described embodiment, the default number of TAC pulses corresponds to a distance of approximately 36 inches, although this is a configurable variable. Thus, unless the stop-read window changes as discussed below, the detection zone for the package will extend approximately 36 inches downstream from start window 84.

Tracking thread 200 adds package structure 228 to a package queue 226, which maintains a running list of all packages presently in the tracking system between photodetector 36 and transmit point 86. In the present embodiment, package queue 226 can store up to 500 package structures, although this limit is a configurable variable. Tracking thread 200 also updates a queue flag 224—a global flag that indicates whether package queue 226 contains package information. If queue flag 224 is zero, no packages are in the tracking system.

As package 22 continues to pass by photodetector 36, the photodetector's line of sight remains blocked. When the following edge of package 22 finally passes out of the line of sight, tracking thread 200 reads the TAC variable in the package structure at that moment. This value represents the length of the package (in the direction of the conveyor belt's movement), and tracking thread 200 stores the package length (plus a user-defined addition) in package structure 228.

If package 22 is taller than 24 inches (assuming the user has set the height variable to 24 inches), it will have crossed the second photodetector 40 line of sight by the time it crosses the photodetector 36 line of sight. If so, second photodetector 40 transmits a signal to antenna sequence generator 202 via connection line 42. The spacing between photodetectors 36 and 40 should be sufficiently short that the shortest package carried by the belt will be simultaneously detected by the two sensors.

When a subsequent package (24) enters the photodetector 36 line of sight, tracking thread 200 creates new package structure 230 in the same manner as the creation of package structure 228 and adds the new structure to package queue 226. As there is now a package following a previous package (i.e., package 22) in the system, tracking thread 200 checks the stop-read window variable for previous package 22 to confirm that the distance between packages 22 and 24 does not require the variable's reduction. As described above, the stop-read window variable defines a package's detection zone from start window 84. If a subsequent package is sufficiently close to the previous package that it and the previous package would be in the previous package's detection zone at the same time, the possibility that the system may undesirably read RFID tags from both packages and incorrectly associate one of the tags with the wrong package is increased. Accordingly, if the subsequent package is sufficiently close to the previous package, tracking thread 200 reduces the previous package's stop-read window to exclude the subsequent package from the previous package's detection zone.

More specifically, upon detecting the presence of subsequent package 24, tracking thread 200 adds the length of previous package 22 to the distance between previous package 22 and subsequent package 24. The distance between the two packages is equal to the difference between the global TAC values stored in the respective package structures for the trailing edge of package 22 and the leading edge of package 24. If this value is less than the default stop-read window value, the packages are too close to maintain the existing stop-read window, and tracking thread 200 resets the stop-read window value for previous package 22 to a new value equal to the length of previous package 22 plus one-half the distance between packages 22 and 24.

In another preferred embodiment, upon detecting the presence of subsequent package 24, tracking thread 200 adds the length of previous package 22 to the distance between previous package 22 and subsequent package 24. If this value is less than the default stop-read window value (e.g. 36 inches), and if the gap between packages 22 and 24 is twenty inches or more, tracking thread 200 resets the stop-read window value for previous package 22 to a new value equal to the length of previous package 22 plus one-half the distance between packages 22 and 24. If the value is less than the default stop-read window value, and if the gap between packages 22 and 24 is less than twenty inches but greater than or equal to ten inches, tracking thread 200 resets the stop-read window value for previous package 22 to a new value equal to the length of previous package 22 plus the length of the gap between package 22 and package 24, less ten inches. If the value is less than the default stop-read window value, and if the gap between packages 22 and 24 is less than ten inches, tracking thread 200 resets the stop-read window value for previous package 22 to a new value equal to the length of previous package 22.

If the system includes scout reader 88, scout thread 219 constantly checks queue flag 224 to determine when a package has been added to package queue 226. If queue flag 224 indicates a package (assume package 22) is present in the system, scout thread 219 activates scout reader 88 via connection lines 94 to scout reader antenna engines 92. Scout thread 219 activates scout reader 88 a predetermined number of TAC pulses after the package's detection to allow the package to reach the scout reader. This variable is user-configurable and can be set as low as zero, effectively activating the scout reader as soon as the package enters the tracking system. The scout reader's engines do not read the information on RFID tags disposed on the packages, but instead only determine the class of the RFID tags, which can be more rapidly accomplished. As should be understood in this art, determining the class of the RFID tags does not require the scout reader's engines to fully decode the tags, but rather to simply analyze the received signal for RFID class. Antenna engines 92 transmit this information to HSC 30, where scout thread 219 receives and parses the signal and transfers the resulting information to antenna sequence generator 202, which is part of antenna sequence thread 204.

As should be understood in this art, there are presently two general types of RFID tags—"class 0" tags produced by Matrics, Inc. and "class 1" tags produced by Alien Technology. A "gen 2" tag is a modification from class 0 not yet in wide use. Approximately 80% of present tags are class 1. As should also be well understood, different protocols are required to read the different tags. Thus, in a default mode of operation in which the class of tags on packages passing through the detection zone is unknown, engines 52, 62, 72 and 80 alternately query for class 0 and class 1 protocols to thereby assure either tag type is read. In the presently described embodiment, scout reader 88 does not associate class type with particular packages, but because it outputs to HSC 30 signals describing the number of tags of each respective class passing through the scout reader, it provides HSC 30 with sufficient information to determine the percentage of tags of each class passing through the tracking system over any given window of time. If tags in the tracking zone are of only one class, HSC 30 can exclude the other tag's protocol from the engine queries, thereby increasing the system's read speed and efficiency. In an alternate embodiment, if one tag type predominates the other, HSC 30 can set the engines to issue a correspondingly greater number of queries for that type, thereby increasing the chance more tags will be read.

Antenna sequence thread 204 controls the RFID engines in transmitting RFID queries according to a sequence defined by antenna sequence generator 202. The antenna sequence generator defines the order in which the antenna sequence thread is to activate the antennas. In the present embodiment, the sequence is defined by a list of id's associated with the respective antennas. For example, if id's 1, 2, 3 and 4 respectively refer antenna 56, 66, 46 and 76, a sequence of 1-2-3-4 causes antenna sequence thread 204 to activate the antennas in that order. In the presently described embodiment, antenna sequence generator 202 defaults to such a round-robin sequence, except that if a package has a height less than 24 inches, such that it is not detected by second photodetector 40, top antenna 46 (id 3) is eliminated from the sequence. It should be understood, however, that the present invention encompasses other sequences as desired.

Antenna sequence thread 204 constantly checks queue flag 224. If queue flag 224 indicates that a package structure is in package queue 226, antenna sequence thread 204 initializes antenna engines 52, 62, 72 and 80, including setting the engines to operate at 57,600 baud. The antenna sequence thread then requests an antenna sequence from antenna sequence generator 202 and instructs the RFID engines to drive the antennas according to the sequence. Since queue flag 224 is a binary value, this means that if there is at least one package anywhere in the tracking system, the antenna tunnel actively queries for RFID tags. The tunnel deactivates only when there are no packages in the queue, i.e., when there are no packages traveling along the conveyor system between first photodetector 36 and transmit point 86.

For each antenna present in the sequence, sequence generator 202 defines the power level at which to drive the antenna during its activation, the class of RFID tags to attempt to read during the antenna activation (i.e. read class 0, read class 1 or alternately read class 0 and class 1), and the length of time the antenna is activated during its turn. In a preferred embodiment, these parameters are defined as part of the round-robin sequence described above. In another embodiment, in which antenna sequence generator 202 has received information from scout thread 219 indicating that the packages in package queue 226 over a predefined look back period approximately equal to the time necessary to move from photodetector 36 to start window 84 do not include one class of RFID tags or the other, antenna sequence generator 202 excludes that class from the antenna sequence instructions. The ability to exclude an entire RFID class improves read time and, therefore, the read rate and efficiency of the antennas' read capability. Otherwise, antenna sequence generator 202 includes an instruction in the antenna sequence requiring that each antenna alternate between attempts to read class 0 and class 1 tags. In one preferred embodiment, the sequence generator defines an antenna sequence requiring that each antenna sequence through attempts to read class 0 tags, class 1 tags, and GEN2 tags. The particular tag protocol is not, in and of itself, part of the present invention, and those skilled in the art should understand that the system can be configured to operate with respect to different protocols. Accordingly, while the present discussion primarily provides examples of systems that read class 0 tags and class 1 tags, it should be understood that this is for example only and that the systems can query for and read GEN2 (or other protocol) tags in addition to or instead of class 0 tags and/or class 1 tags.

The antenna sequence defines the power level at which each antenna is driven based on tag class. As should be understood in this art, class 0 tags have a stronger response than class 1 tags. Thus, it is desired to drive the antennas at a lower power level when reading class 0 tags to avoid over-driving the receiver, and the antenna sequence therefore includes an instruction requiring the antenna engines to reduce power when querying for class 0 tags, although it should be understood that the antennas may be driven at the same power level for class 1 tags and class 0 tags. Furthermore, because the position of the top antenna farther above the conveyor belt potentially enables the top antenna to read tags farther from the top antenna than the side antennas, the power level at which the top antenna is driven is preferably less then the side antenna power levels.

Once determining (by checking the value of queue flag 224) that it is necessary to activate the antennas, antenna sequence thread 204 obtains a sequence from antenna sequence generator 202 and begins to execute the defined sequence. Starting with the first antenna in the sequence, sequence thread 204 instructs the antenna's engine to set power to one of the two levels and to read the corresponding tag class, as defined by the sequence. Thread 204 then sleeps for 1 ms. Upon waking, antenna sequence thread 204 issues a start reading command to the same antenna engine and then sleeps for the time required for the engine to read a return signal received by the antenna from a tag of the predefined class type. The sleep/read time in the presently described embodiment is 10 ms for a class 0 tag and 10 ms for a class 1 tag. If the sequence requires that the antenna tunnel query for both tag types, antenna sequence thread 204, upon waking from the sleep/read period, issues an instruction to the same engine setting the power level for the other tag class and then sleeps for 1 ms. Upon waking, sequence thread 204 issues a start read command to the same engine and then sleeps for the time required for the engine to read a response from the antenna from a tag of the predefined class type. Having completed queries for both tag types at this antenna, or upon completion of the first query if only one query is required, antenna sequence thread 204 issues a power off instruction to the antenna's engine and then sleeps 3 ms to allow any responding RFID tag to fully discharge before being subsequently queried.

Antenna sequence thread 204 then queries antenna sequence generator 202 for a new sequence and repeats the process for the next antenna as defined by that sequence. Antenna sequence generator 202 always ensures that antenna sequence thread 204 has the correct sequence of antennas and the correct tag class queued. Because sequence thread 204 gets a new sequence at each antenna read, the system can respond to sequence changes from sequence generator 202 as they occur. For example, if at some point there are no packages in the tracking system having a height of 28 inches or more, when there had previously been such packages, sequence generator 202 eliminates the top antenna from the sequence. In one preferred embodiment, antenna sequence generator 202 updates the antenna sequence upon detection of a package leaving the tracking system (i.e., passing transmit point 86).

In the presently described embodiment, the elimination or addition of tall packages to or from the tracking system is the only event that causes a change in the round robin antenna sequence. In another preferred embodiment, however, antenna sequence generator 202 updates the sequence based on information stored by the system regarding the level at which each antenna performs valid reads and the prevalence of one RFID tag class or the other. As described below, antenna read threads 206, 208, 210 and 212 receive tag response information from their respective RFID engines/antennas. As valid reads (as determined and reported by the antenna engines) are received, the antenna threads report the information to tracking thread 200, which then stores corresponding information at 240 identifying the antenna id, the tag class for each successful read, and the TAC value from TAC variable 222 at which the read occurred. If the data at 240 indicates that a given antenna has received a predefined greater number or percentage of successful reads than the others over a selectable predefined look back period, antenna sequence generator 202 weights that antenna's occurrence in the sequence correspondingly to its number of successful reads in the look back period. Preferably, the look back period is defined as a range of global TAC values extending back from the present value of TAC variable 222 by a predetermined number of TAC pulses. Thus, antenna sequence generator 202 can review stored tag read information at 240 for those tag reads having associated global TAC values within the look back range.

Additionally, if one class of RFID tag was read predominantly more than the other during the look back period, antenna sequence generator 202 can set the instructions for successive reads for each antenna to reflect the weightings of the two classes. For example, if the system's statistical information at 204 shows that 85% of the successful reads during the look back period were of class 0 tags and that the remaining 15% were of class 1 tags, the antenna sequence generator can set the antenna sequence out for a predetermined period in the future (e.g. equal to the look back period) so that class 0 is queried at each antenna activation (or, alternatively, at 85% of the activations over that time period) but that both classes are queried at only 15% of those activations.

Where a barcode scanner 96 is included in the system between first photodetector 36 and window start 84 (as discussed above, start window 84 is defined by a plane intersecting the belt at transverse line 49 shown in FIG. 1), barcode information received from barcode scanner 96 may also be used in defining the antenna sequence instead of, or in conjunction with, scout reader information. As should be understood in this art, barcode information typically identifies the product in the package and the product's manufacturer. If it is known that a given manufacturer applies tags of one class or the other to its packages, that class can be associated with the manufacturer in a predefined table at 240, along with the TAC value from variable 222 at which the barcode information was received. As barcode information is received by barcode thread 220 (which handles communications between HSC 30 and the barcode scanner) and passed therefrom to tracking thread 200, the tracking thread compares each manufacturer detected in the barcode information with the associated class for that manufacturer defined in the table. Thus, to the extent that manufacturers are associated with specific classes of RFID tags, the detection of those manufacturers in the barcode information is a detection of the associated RFID tag class. Accordingly, tracking thread 200 increments a count of tag class occurrences based on detection of manufacturers from the barcode information. Antenna sequencer 202 can therefore weight the antenna queries between the two types of tags based on this information in the same manner as described above with respect to the scout reader.

Generally, antennas 56 and 66 can read RFID information located on the top of package 22 unless the height of package 22 is greater than the height of the side antennas, in this example 24 inches. Because antenna 46 is disposed at a relatively high position on frame 44, its radiation pattern extends farther downstream on the conveyor than the other antenna patterns and may therefore be more likely to undesirably read a tag on a downstream package that is otherwise beyond the package's detection zone. Thus, as noted above, antenna 46 is included in the antenna sequence in the present embodiment only where second photodetector 40 indicates a package is 24 inches high or taller. More specifically, sequence generator 202 adds the top antenna to the sequence when the start-of-read window variable for the identified tall package decrements to zero (i.e. when the tall package reaches start window 84) and removes the top antenna from the sequence when the package's stop-read window then decrements to zero (i.e. when the package reaches the end of its detection zone), or makes such changes at the nearest respective points at which packages cross the transmit point to thereby trigger a sequence update.

Accordingly, antenna sequence generator 202 possesses the ability to create independent power levels, frequency, and read times for any given antenna, thereby allowing customization of the antenna sequence.

In a still further embodiment, it may be desired to always include all four antennas in the antenna sequence. For example, where the conveyor system carries packages containing liquids or other materials that block RF signals, RFID tags are sometimes readable only by the top antenna. Thus, even where package height is below the level that would otherwise trigger activation of the top antenna in the sequence described above, in this embodiment the top antenna is always included in the round-robin sequence. In one preferred embodiment, the sequence generator emphasizes the top antenna, defining a repeating five-step sequence for the four antennas of (a) bottom antenna, (b) left antenna, (c) top antenna, (d) right antenna, and (e) top antenna. In the embodiment described below in which the bottom antenna is offset from the other three antennas and is therefore excluded from the round-robin sequence for these antennas, the sequence generator defines a four-step sequence for the three remaining antennas of (a) left antenna, (b) top antenna, (c) right antenna, and (d) top antenna. The user may select among the round-robin sequences (i.e. with top antenna control based on package height, with top antenna always included regardless of package height, or with top antenna emphasis) through selection of a variable via remote system 244 and sockets thread 216.

As each antenna receives a power setting and a read command, it attempts to read RFID tags present within its radiation pattern. As noted above, antennas 46, 56, and 66 are adjacent to absorber pads 48, 58, and 68, respectively, which inhibit antennas 46, 56, and 66 from reading upstream RFID tags. The operation and construction of antenna 76 is described in more detail below, but the operation of the RFID engines associated antennas 46, 56, 66, and 76 is the same for all antennas and is therefore described only with respect to antenna 56 by way of example. During a read sequence, antenna 56 may detect responses from RFID tags in its radiation pattern. The antenna then passes a corresponding signal to antenna engine 62 via feed line 60. Antenna engine 62 parses the received information, as described above, and transmits the resulting digital data, along with an interrupt, to HSC 30 via output line 64. Engine read thread 206 sees the interrupt, retrieves the data, and assigns to it the present TAC value from global TAC variable 222. The resulting RFID information includes the RFID data returned from the RFID tag (this data will generally be a tag number unique to the tag and is referred to hereinafter as the RFID tag's "value"), the RFID tag class, the receiving antenna id, and the global TAC value. Engine read thread 206 forwards the RFID information to tracking thread 200.

Tracking thread 200 receives the posted RFID information and checks the RFID value against RFID tag values stored in a locked RFID collection 236 and an old RFID collection 232. As indicated in the discussion below, if the RFID value of the newly-posted RFID information matches an RFID value in either locked RFID collection 236 or old RFID collection 232, the RFID response is from a tag that has been previously read, and the newly-posted tag information is therefore discarded. If the new tag value does not match the values in collections 236 or 232, tracking thread 200 checks a new RFID collection 234 to determine whether this is the first instance the RFID value has been seen. If the RFID value is new, tracking thread 200 adds the value to new RFID collection 234.

Whether or not the RFID value is new with respect to the list in collection 234, tracking thread 200 then checks each package structure in queue 226 and determines if there are any package structures for which (a) the start-of-read window value has decremented to zero as of the global TAC value associated with the newly-posted information and (b) the stop-read window value has not decremented to zero as of the TAC value associated with the newly-posted information. If no package structure meets this criteria, no package was within its detection zone (i.e. the area beginning, and extending downstream from, start window 84 within which the antenna radiation patterns extend and within which it is desired to read tags on the package) when the tag that provided the newly-posted information was read. There is therefore no package to which to associate the tag information at that time, and tracking thread 200 places the newly-posted RFID information in a deferred RFID collection, or table, 238. If there is a package structure meeting the criteria, a package (assume package 22) has reached start window 84 and was within its detection zone as defined by the stop-read window variable when the responding tag was read. Tracking thread 200 then checks package structure 228 to determine whether any RFID information has been previously associated with package 22. If not, tracking thread 200 associates the newly-posted RFID information with package structure 228, waits for the next incoming RFID information and, when the next signal is received, repeats the procedure.

If there is RFID information associated with package 22 (i.e., RFID information stored in package structure 228), tracking thread 200 checks how many such records have previously been associated with the package structure. That is, the tracking thread checks to see if there have been any previous RFID tag responses associated with this package. If there is only one occurrence of previously associated RFID information, and if the RFID value of the previous information matches the RFID value of the newly-posted RFID information, the system has now received two consecutive identical RFID tag responses for the same package, where no other tag responses have been received for that package. Tracking thread 200 then determines if the RFID value of the first-received RFID information was a new RFID value. If so, no previous package has been associated with this tag. Under these conditions, there is a high likelihood that the received RFID tag information corresponds to a tag on the package associated with package structure 228, and tracking thread 200 therefore stores the RFID value in a locked variable defined in package 228 and assigns the RFID value to locked RFID collection 236. Since the RFID value of any subsequently received RFID information is checked against the locked collection, no subsequent package will be associated with the locked RFID tag value, even if the tag value is received in response to a subsequent query.

If the RFID value of the first-received RFID information was not a new value, then the same tag was read before the present package reached its detection zone. There is therefore an increased possibility that the responding tag is not associated with that package. The tracking thread therefore associates the newly-posted RFID information with the package structure, but does not put the RFID value in the package structure's lock variable or add the RFID value to the lock collection, and awaits the next incoming RFID information.

If there is only one previous occurrence of RFID information associated with package structure 228, but the RFID value for the previous information is different than the RFID value of the newly-posted information, then either (a) there may be more than one RFID tag on the package, or (b) at least one of the tag reads is from another package. In either event, the system has now received information reducing the confidence that the RFID values now associated with the package correspond to a tag that should be permanently associated with that package. Thus, the tracking thread associates the newly-posted RFID information with the package structure, without putting the RFID value in the package structure's lock variable or adding the RFID value to the lock collection, and awaits the next incoming RFID information.

If there are multiple previous occurrences of RFID information associated with package structure 228, then (a) the package structure is already locked to an RFID value, or (b) there are multiple different RFID values already associated with the package that preclude a lock, or (c) there are at least two of the same RFID values that were associated with the package under conditions not justifying a lock. In any such event, the newly-posted RFID value cannot result in a lock, and the tracking thread therefore associates the newly-posted RFID information with the package structure, without putting the RFID value in the package structure's lock variable or adding the RFID value to the lock collection, and awaits the next incoming RFID information. Accordingly, a package structure can collect multiple associated RFID values regardless whether it has a locked value.

As noted above, the presently described embodiment requires two exclusive matching tag reads associated with a package in order to determine that an RFID tag is disposed on the package and to thereby lock that tag's RFID value to the package, thereby precluding the tag's association with any other package. The number of such successive, exclusive occurrences required to lock the RFID value to package structure 228 is user configurable and can therefore be varied as desired. Moreover, the present algorithm assumes that there can be only one valid tag on any given package, but it will be understood that it is possible to vary the algorithm to allow one or more RFID values to lock on a package under different desired criteria, for example where it is known that a package may support more than one valid RFID tag.

In the event a package passes through its detection zone without being assigned any RFID information, there is the possibility that a tag on the package was read just before the package reached start window 84 but not thereafter. In that event, the tracking algorithm checks deferred RFID collection 238 and determines whether RFID information was received within a predetermined period prior to the point the package entered its detection zone. If so, the tracking algorithm associates this information with the package, although without locking any corresponding RFID value. More specifically, when both the start-of-read and stop-read window variables for any package structure reach zero (i.e. when the package has passed through its detection zone), tracking thread 200 checks the RFID information associated with the package structure. If there is any RFID information associated with the package structure, then valid tag reads have been received for this package. As there is likely less confidence for tag reads in the deferred collection than for those tag reads occurring while the package was in the detection zone, it is less desirable to rely on the earlier tag reads, and the deferred tag reads are not associated with the package. Further, since the highest likely association of any RFID information presently in the deferred collection is to the package now leaving the detection zone, there is no need to further retain such information if it is not to be associated with that package. Thus, under such circumstances, tracking thread 200 removes all RFID values stored in deferred RFID collection 238.

If, however, there is no RFID information associated with the package structure as the associated package leaves its detection zone, tracking thread 200 determines whether any RFID information stored in deferred RFID collection 238 was posted within a set number of TAC pulses prior to the global TAC pulse at which the package reached start window 84. If so, tracking thread 200 associates this RFID information with package structure 228 but does not lock any RFID value. Tracking thread 200 then removes all RFID values stored in deferred RFID collection 238. In the presently described embodiment, the deferred collection look back period is five TAC pulses, but this variable is configurable and can therefore be set as desired.

If the system includes a barcode scanner 96, and if barcode scanner 96 reads a barcode located on package 22, the barcode scanner outputs a signal to HSC 30 that is received by barcode thread 220. Barcode thread 220, which is set to an operating systems priority below the other threads discussed herein, checks for information received from barcode scanner 96 and associates with it the current TAC value from the global TAC variable 222. Barcode thread 220 transmits this information to tracking thread 200, which compares the barcode TAC value with the running TAC value of each package. If there is a package structure (assume package structure 228) corresponding to a package with a local TAC value equal to the TAC pulse distance between barcode scanner 96 and photodetector 36 when the package structure's running TAC value is equal to the global TAC value associated with the barcode information, plus or minus a predetermined tolerance (e.g. 1 TAC pulse), tracking thread 200 stores the barcode information in package structure 228, thereby associating the barcode information with package 22.

When tracking thread 200 determines that the local TAC variable of any given package structure (assume package structure 228) increments to a value equal to a stored value corresponding to the distance between photodetector 36 and transmit point 86 (i.e. package 22 reaches transmit point 86), tracking thread 200 once again checks the RFID information associated with package 22. Tracking thread 200 compares each unlocked RFID value stored in package structure 228 with the RFID information associated with the immediately subsequent (or, upstream) package 24 (stored in package structure 230). If any RFID value stored in package structure 230 matches any RFID value stored in package structure 228, tracking thread 200 creates confidence ratings 229 and 231 for each common RFID value. Confidence rating 229 is equal to the occurrences of the given RFID value associated with package 22 as a percentage of the total occurrences of the RFID value associated with packages 22 and 24. Similarly, confidence rating 231 is equal to the occurrences of the given RFID value associated with package 24 out of the total occurrence of the RFID value associated with packages 22 and 24. Tracking thread 200 retains the RFID information for the RFID value in association with the package structure having the higher confidence rating and removes the corresponding RFID information from the other package structure. If the confidence ratings are equal, the RFID information is retained in the latter package structure (230) and removed from the earlier package structure (228). Once every RFID information record in package structure 228 has been compared to the RFID information records in package structure 230, tracking thread 200 adds each RFID value remaining in package structure 228 to old RFID collection 232. Package structure 228 is then added to stored information 240 and removed from package queue 226. Tracking thread 200 performs the same routine for each package that reaches transmit point 86.

If package queue 226 thereafter empties of all package structures, tracking thread 200 instructs antenna sequence thread 204 and scout thread 219 to forward an instruction signal to the RFID engines of the main antenna tunnel and the scout tunnel, respectively, to power down all antennas. After a set number of TAC pulses following the power down instruction, tracking thread 200 removes all RFID values stored in new RFID collection 234, old RFID collection 232 and locked RFID collection 236.

In other preferred embodiments, the tracking thread may apply an additional confidence rating to the package structure when the corresponding package reaches transmit point 86. In one embodiment, a default confidence rating of 1,000 is applied to each package structure upon its creation. When a package reaches the transmit point, tracking thread 200 reduces the initial confidence rating depending on the occurrence of any of five conditions. That is, for each condition that is present, tracking thread 200 subtracts a number from the default value (i.e. 1,000) that is associated with the particular condition. The values, or weightings, associated with each condition can be set by the user via remote system 244 or GUI 246. By assigning a zero weighting to any given condition, that condition is ignored in defining the confidence rating.

Condition 1. When the package reaches the transmit point, tracking thread 200 reviews the package structure stored at 240 for the previous (i.e. downstream) package. If that package had no RFID information associated with it when it passed the transmit point, there may be reduced confidence that RFID information associated with the present package was transmitted by a tag on the present package. That is, there may be a higher likelihood that the RFID information originated from a tag on the previous package. Accordingly, a user-defined negative weighting may be applied to the default confidence value. Additionally, the tracking thread may also check the package structure of the next upstream package in package queue 226 and, if either the downstream or upstream package has no tag reads, reduce the confidence rating for the package at the transmit point.

Condition 2. Depending on system conditions such as belt speed, package size and package spacing, there may be an increased likelihood that RFID responses may be incorrectly associated not only with an adjacent package, but also with the next package downstream or upstream from the adjacent package. Accordingly, when a package reaches the transmit point, the tracking thread may also check the stored information at 240 for the second-previous package passing the transmit point (and, optionally, the second-upstream package in package queue 226) and, if that package (or, either package) has no associated RFID information associated with it at the transmit point, apply a user-defined negative weighting to the confidence level for the present package.

Condition 3. As described above, where two adjacent packages have been assigned common RFID information, tracking thread 200 associates the information with the package having the greater number of reads. However, even though the system has determined to which package the information should be associated, the fact that the information was associated with both packages to begin with reflects a probability that the tag information is incorrectly assigned that is higher than if the information had been associated with only one package. Accordingly, when the package reaches the transmit point, the tracking thread reviews the package structures for the upstream packages in package queue 226. If any package structure has been assigned a tag value that is also assigned to the package at the transmit point, the tracking thread lowers the confidence rating for the package at the transmit point by a user-defined negative weighting. As noted above, if the next previous package structure includes a tag value in common with the package at the transmit point, the tracking thread allocates the tag value to the package having the greater number of reads and removes the tag value from the other package structures in the package queue. Thus, if an upstream package structure in package queue 226 has a tag in common with a package at the transmit point, there is a likelihood that the tag value will be removed from the upstream package structure as a result of the tracking algorithm comparison, thereby preventing application of the negative weighting to the upstream package's confidence rating based on the common tag when the package later reaches the transmit point. Accordingly, when the tracking thread reduces the confidence rating for a package at the transmit point on the grounds that there exists at least one upstream package structure with the same tag value, the tracking thread also reduces the confidence rating for the upstream package structure. When the upstream package structure eventually reaches the transmit point, the tracking thread may reduce the package's confidence rating if it shares other common tag values with upstream package structures, or, alternatively, the algorithm may be programmed (e.g. by examination of a flag in each package structure set when the confidence rating is reduced based on common tag values) to reduce the confidence rating for any given package only once for this condition.

Condition 4. As described above, if RFID tag information is received when no package is within its detection zone defined by the start/stop read variables, the tag information is assigned to the deferred group. If the information is thereafter removed from the deferred collection without application to a package, there may be diminished confidence in a later association of the same RFID information with a package. Accordingly, when RFID information is removed from the deferred collection, tracking thread 200 stores the tag values at 240. If a package reaching the transmit point includes RFID information corresponding to a tag that has been removed from the deferred collection and not assigned to a package (i.e. those tags removed from the deferred collection and stored at 240), the tracking thread applies a user-defined negative rating to the confidence level for the package at the transmit point.

Condition 5. If a conveyor system carries packages on which it is expected there to be only one RFID tag, the association of multiple RFID tag information reduces the confidence that the correct tag has been associated with the package. Accordingly, if multiple RFID tag information is associated with a package at the transmit point, tracking thread 200 applies a user-defined negative weighting to the confidence level for the package at the transmit point.

The confidence rating is stored with the package structure and may be utilized by downstream systems to make decisions about the package. For example, a sortation system may require at least a minimum confidence rating to process packages. Thus, upon receiving the package structure from HSC 30, the sortation system checks the confidence rating and, if it is below a user-defined threshold, diverts the package for special handling.

In a still further embodiment, tracking thread 200 locks RFID values as described above, but, after assigning an RFID value to the locked collection, nevertheless assigns the same (i.e. locked) RFID value to the same or subsequent packages if RFID information with the now-locked value is received when the same or subsequent packages are in the detection zone. When the tracking thread determines that the local TAC variable of any given package structure (assume package structure 228 for package 22) increments to a value equal to a stored value corresponding to the distance between photodetector 36 and transmit point 86 (i.e. package 22 has reached transmit point 86) and checks the RFID information associated with package 22, the tracking thread compares each locked RFID value stored in package structure 228 with the RFID information associated with the immediately subsequent (i.e. upstream) package 24. If any locked RFID value stored in package structure 228 is also associated with package structure 230 for package 24, tracking thread 200 creates respective confidence ratings for each such common RFID value. The confidence rating for package structure 228 is equal to the occurrences of the given locked RFID value associated with package 22 as a percentage of the total occurrences of that RFID value associated with packages 22 and 24. Similarly, the confidence rating for package structure 230 is equal to the occurrences of that RFID value associated with package 24 out of the total occurrences associated with packages 22 and 24. If the confidence rating for package 24 (i.e. the subsequent package) is greater than the confidence rating for package 22 (i.e. the package at the transmit point) by a multiple of 2.5 or more, tracking thread 200 assigns the RFID information to package structure 230 for package 24 and removes the information from package structure 228 for package 22 and all other package structures in queue 226. The tag value is stored in old RFID collection 232, thereby preventing its association with subsequent packages. If the confidence rating for package 24 is less than 2.5 times the confidence rating for package 22, the RFID information remains with package 22. The tag value is removed from package structures in package queue 226 and added to old collection 232.

Host thread 214 supports a list of host interface protocols and allows HSC 30 to send tracking information to a host computer 242 via an Ethernet or serial connection. Host thread 214 can transmit package tracking information to host computer 242 from stored information 240. Host thread 214 is set to the lowest priority and will be interrupted by any of the other higher priority threads that require processor time. The threshold level (2.5, in this example) used to compare the confidence ratings for locked tags can be configured by the user through GUI 246 or remote system 244.

Socket thread 216 allows remote connection to the system for remote monitoring and testing. User interface thread 218 provides a user with information from the system including, but not limited to, reports and statistics of total packages, total packages with RFIDs, total packages with barcodes, total packages with both, and total packages without RFIDs. Graphical user interface ("GUI") 246 is a web based interface and is preferably written in JAVA or other platform-independent language that allows GUI 246 to run on any system. Socket thread 216 and user interface thread 218 are set to the lowest priority and are interrupted by any of the other higher priority threads that require processor time.

A user or technician can connect to the system from GUI 246 or remote system 244 to make changes to several of the system parameters discussed above. The user may set through GUI 246 the respective power levels for reading class 0 and class 1 RFID tags, the read time through which each engine will transmit a query signal from each antenna in the sequence (and, therefore, the time antenna sequence thread 204 sleeps prior to reading the response), the time for which an engine will attempt to read a response (and, therefore, the corresponding time the sequence thread will sleep), and whether the sequence generator thread can include in the sequence only class 0 tags, only class 1 tags or both. GUI 246 sends these parameters to user interface thread 218, which then forwards them to antenna sequence generator 202 for consideration in generating subsequent antenna sequences.

A user may change the following variables via remote system 244 to sockets thread 216: (a) the number of consecutive, exclusive new RFID values required to be received before an RFID value is locked to a package; (b) the number of TAC pulses that must occur before tracking thread 200 removes all RFID information from old RFID collection 232, new RFID collection 234, and locked RFID collection 236 following emptying of queue 226; (c) the number of inches (in TAC pulses) to add to the length of each package from the length determined by photodetector 36; (d) the start-of-read window value; (e) the default stop-read window value; (f) the TAC pulse distance between barcode scanner 96 and photodetector 36; (g) the number of TAC pulses to be used as the tolerance level in associating barcode information to an RFID package structure; (h) the number of TAC pulses between photodetector 36 and transmit point 86; (i) the number of pulses the tachometer will output per inch; (j) sequence option; (k) confidence rating weightings; and (l) the threshold level for comparison of confidence ratings for locked tags. Remote system 242 transmits these parameters to sockets thread 216, which forwards the information to tracking thread 200.

Host thread 214, sockets thread 216, and user interface thread 218 can retrieve stored information 240. This information can be used to display statistics on RFID class, percentages of each antenna used, barcode associations, and success rate of the RFID system. Display statistics can apply to specific packages (e.g. associated RFID tag values, barcodes, tag class, antenna reads, and confidence levels) as well as to running count statistics for the tracking system (e.g. number of RFIDs, number of barcodes, the number of combined RFID tags and barcodes, and the number of no reads). Host thread 214, sockets thread 216, and user interface thread 218 can display these statistics via host computer 242, remote system 244, and GUI 246 respectively.

Figure 5:
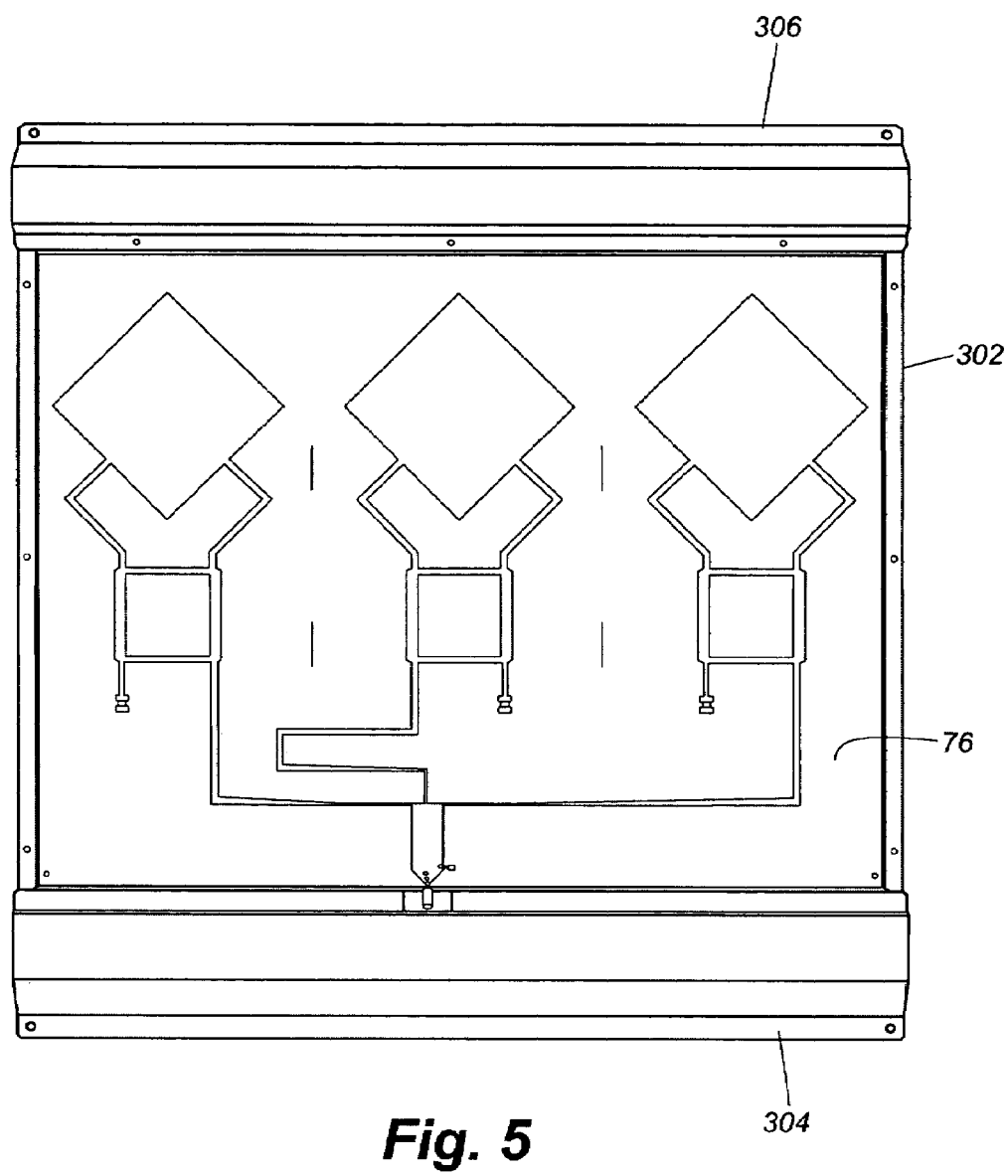
FIG. 5 is a top perspective view of an RF antenna for use with the conveyor system as in FIG. 1.
Figure 6:
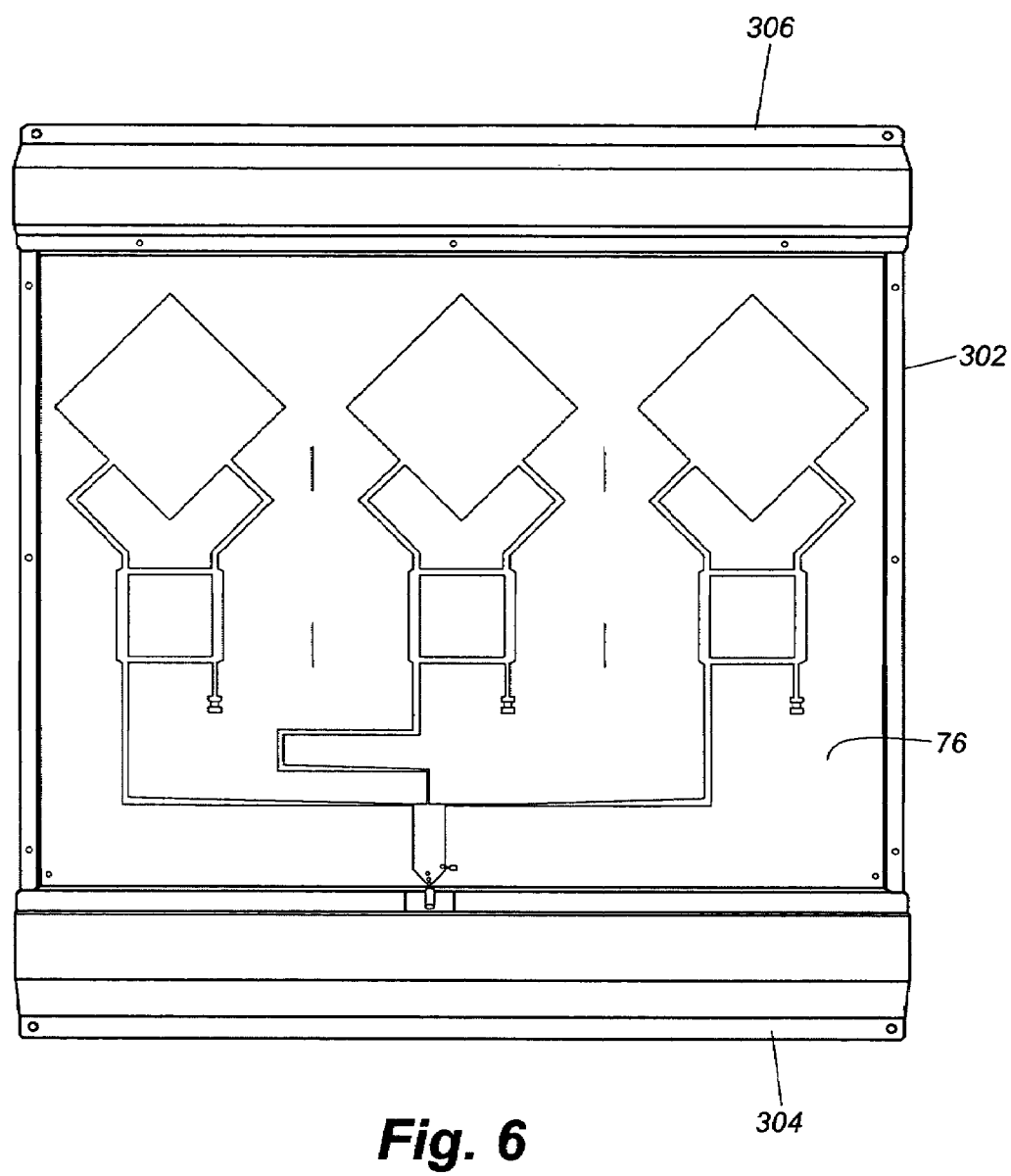
FIG. 6 is a top perspective view of an RF antenna in accordance with an embodiment of the present invention.
Figure 18:
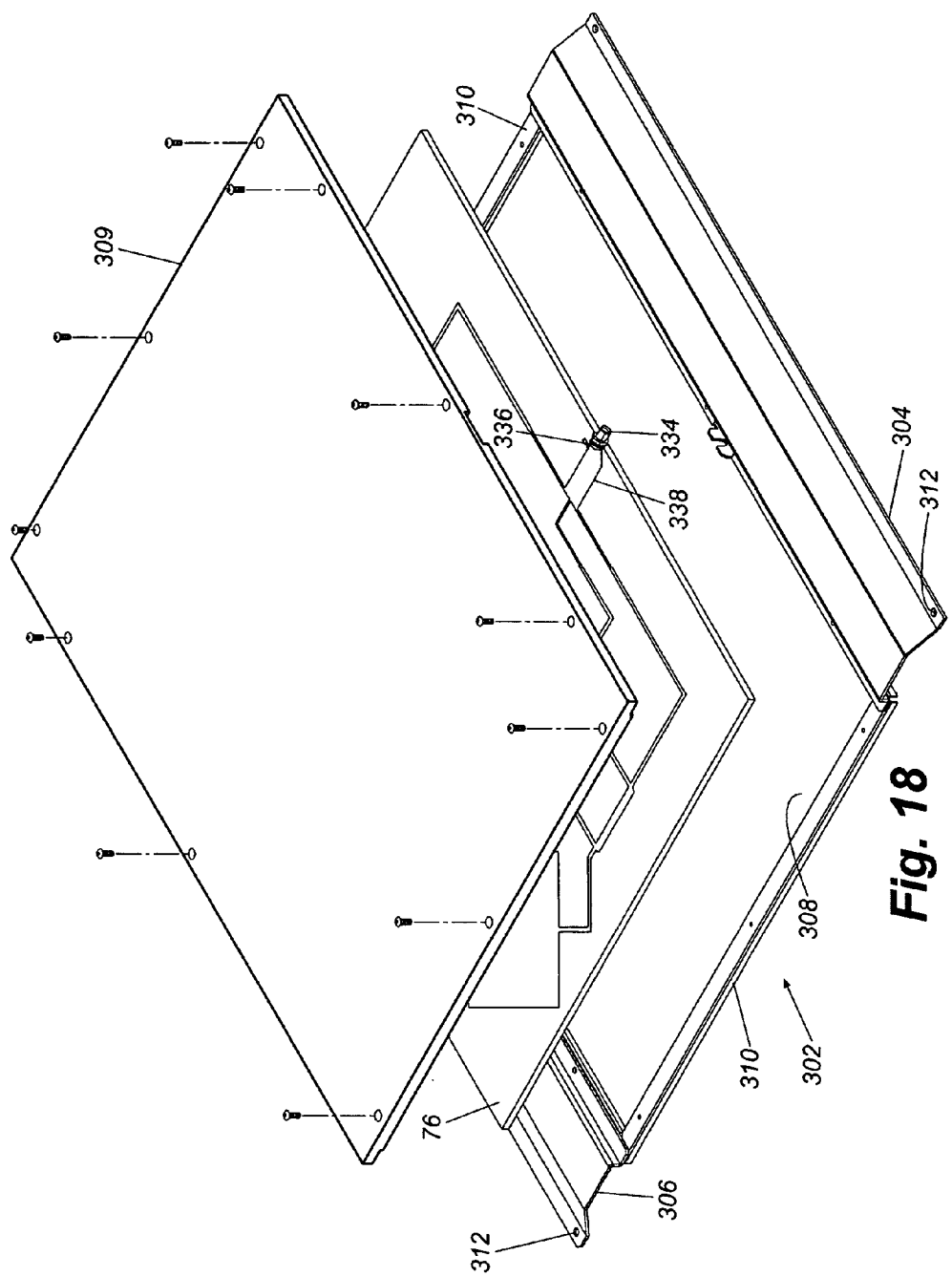
FIG. 18 is an exploded view of an RF antenna in accordance with an embodiment of the present invention.

As noted above, with reference to FIG. 1, conveyor system 10 includes a bottom antenna 76 that defines a radiation pattern extending above conveyor belt 14. Referring also to FIG. 5, bottom antenna 76 is comprised of a patch array antenna disposed in a frame 302 having forward and rear ramps 306 and 304. With reference also to FIGS. 6 and 18, which illustrate patch array antennas in similar frames, frame 302 also includes a bottom pan 308 made of a planar sheet of stainless steel and received between ramps 304 and 306 and side rails 310.

Frame 302 is secured to the conveyor system frame immediately under the conveyor belt by screws (not shown) received through holes 312 in front and rear ramps 306 and 304 and that screw into the conveyor frame's planar top surface 13 (FIG. 4). The antenna frame therefore creates a slight rise as the belt moves over forward ramp 306, across patch array antenna 76 and down rear ramp 304. Due to the antenna frame's low profile, however, the rise is slight, and in a preferred embodiment the vertical height of the frame and antenna combination, measured from the connection between ramps 304/306 and the top surface of the antenna, is about 0.8 inches. It should be understood, however, that the antenna frame may be dimensioned as desired, provided the frame/antenna assembly's height does not impair progress of the packages on the conveyor system.

Side rails 310 are received in grooves defined at the corner of front and rear ramps 304 and 306. A 0.5 inch ultra-high molecular weight (UHMW) polyethylene cover 309 secures the patch antenna array within the ramps and the rails and is secured to the ramps and the rails by a plurality of screws.

The bottom antenna may be disposed on the conveyor in a frame without ramps. Referring to the embodiment shown in FIG. 7, for example, bottom pan 308 is bounded by a rim 314 secured by screws or rivets to side rails 310. Rim 314 is raised from the surface of pan 308 so that the rim and pan define a depression that receives patch array antenna 76. A plurality of flanges 318 are stamped and bent upwardly from the body of pan 308, and pins 320 are disposed on the planar surface of pan 308 between the flanges. Flanges 318 and pins 320 are received in corresponding slots and holes 322 and 324 in patch array antenna 76 to securely orient antenna 76 in the pan's depression. Cover 309 is disposed over the top of antenna 76 and secured to rails 310 by flanges 326 received in respective longitudinal grooves 328 in rails 310.

In each of the above-mentioned embodiments, the antenna frame depression's depth, and the thickness of patch array antenna 76, is approximately 0.75 inches, so that the top surface of the antenna is approximately flush with the top of rim 314 (FIG. 7) or rails 310 (FIGS. 5, 6 and 18).

Figure 17:
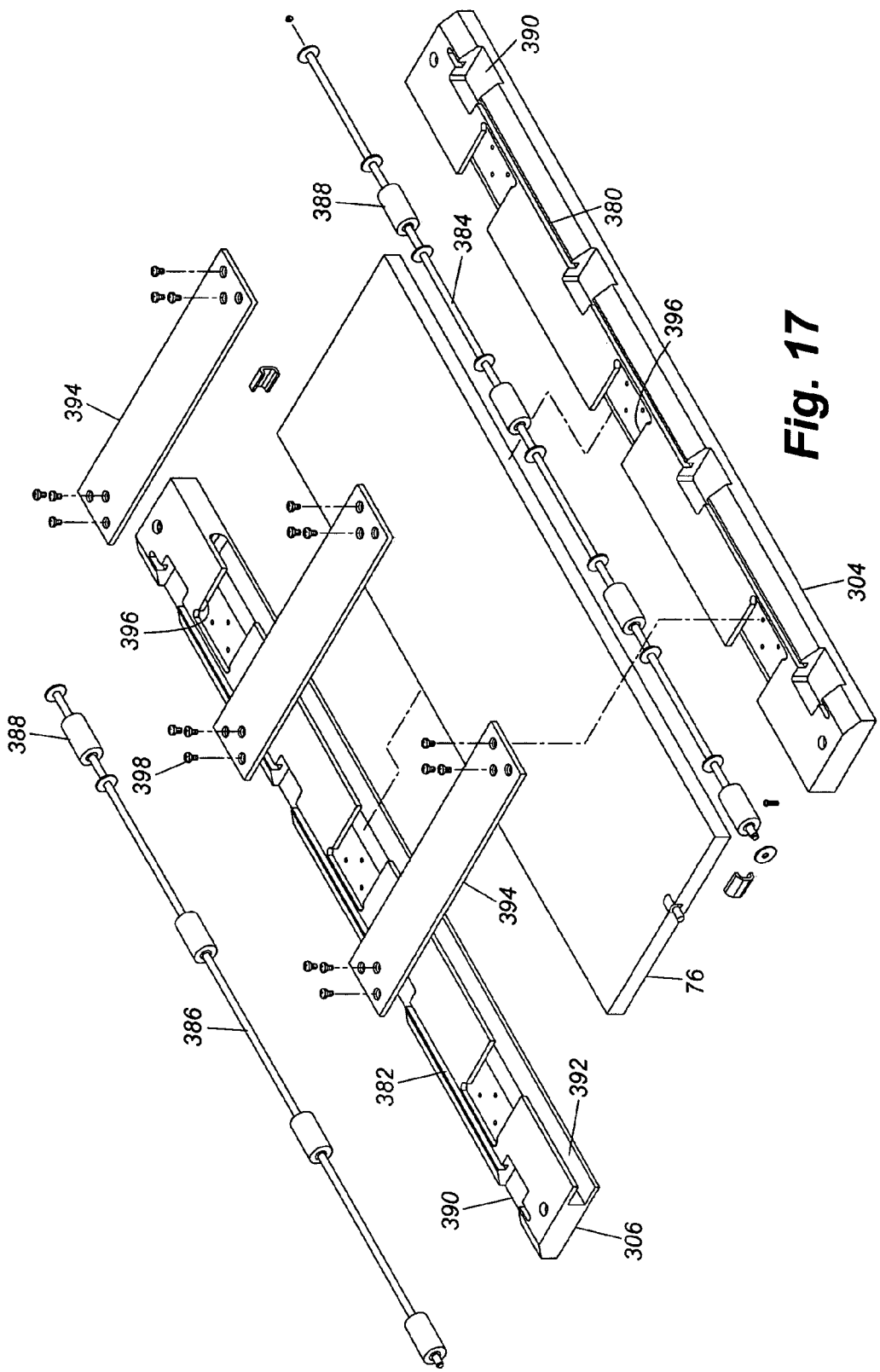
FIG. 17 is an exploded view of an RF antenna in accordance with an embodiment of the present invention.

Furthermore, the forward and rear ramps may include or be replaced by rollers or other suitable structure. Referring to FIG. 17, for example, front and back ramps 304 and 306 define longitudinal grooves 380 and 382, respectively, that receive axles 384 and 386 on which are disposed axially aligned rollers 388 received in respective notches 390 in the ramps. Antenna 76 is received in respective slots 392 (only one of which is shown in FIG. 17) in frames 304 and 306 to secure the antenna in position with respect to the ramps. Slats 394 extend over antenna 76 and are secured at slots 396 in ramps 304 and 306 by screws 398. The conveyor belt passes over the assembled frame such that the belt's movement is facilitated by the rollers.

While the above-described embodiments of antenna frame 302 may be presented with an antenna having a given patch element arrangement, it should be understood that this is for purposes of example only and that the antenna arrangements disclosed herein can be housed in any of the various frames.

Patch array antenna 76 is comprised of a low permittivity polymer foam substrate 330 and a copper ground plane (not shown) bonded to the substrate's underside. An exemplary substrate/ground plane material is FOAMCLAD 100, available from Arlon Microwave Materials Division of Arlon, Inc., of Bear, Del.

In the embodiments illustrated in FIGS. 5, 7, 8, 10 and 18, patch array antenna 76 includes a single row of three patch elements 332 on the side of substrate 330 (see, e.g. FIG. 7) opposite the ground plane. Each patch is stamped from approximately 0.0014 inch thick copper or other high-conductivity metal to form a 5.15 inch sided square and is disposed in the substrate so that the top of the patch is flush with the top surface of the substrate.

As noted in more detail below, however, the antenna may have more or fewer than three patch elements, for example depending on the frequency band at which the antenna will operate and the physical space of the conveyor belt. Systems in accordance with the present invention may employ antennas having two or four, or other suitable number of, patch elements.

Referring to the embodiments illustrated in FIGS. 5 and 18, a coaxial connector 334/336 connects the antenna PCB board 76 to an RF cable from the respective RF engine. In the embodiment shown in FIG. 7, coaxial connector 334/336 is connected to the antenna assembly by pins 340.

In all the illustrated embodiments, feed network 338 is a corporate network that combines the power received from each patch element and delivers the combined signal to center conductor 342 along separate paths from respective patch elements 332. Each path includes two feed lines 346 and 348 attached mid-way along adjacent sides of the patch element. Feed lines 346 and 348 are attached at their opposite ends to adjacent top corners of a square connector 350 comprised of sides of a length approximately one-quarter the wavelength of the signal carried by the feed network. A trace 352 extends from a first bottom corner of square connector 350 and is connected to ground through a resistor. The opposite bottom corner of the square connector is connected to the feed trace.

The feed line extending from square connector 350 has an impedance of 130 ohms, whereas the initial feed line extending from an entry point 344 has an impedance of 150 ohms. Accordingly, a one-quarter wave element may be disposed within the feed trace to match the impedances. The patch elements' impedance varies with frequency, and the elements define an impedance giving an acceptable impedance match only over a relatively small percentage of the radiation bandwidth. Of course, the range of what is considered an acceptable impedance match may depend on the performance required of an antenna in a given system. As should be well understood in this art, several things affect a patch array's achievable bandwidth. Chief among these are dielectric thickness and dielectric losses between the patch elements and ground. Accordingly, these characteristics may be varied as desired to achieve a desired impedance match and operative frequency range. In the presently described embodiments, patch array antenna 76 operates within a frequency range of 902 to 928 MHz, as dictated by the Federal Communications Commission. The feed network and patch elements are constructed and arranged so that there is less than −15 dB return loss.

It should also be understood that the antenna construction and arrangement may otherwise vary. For example, the patch elements may define shapes other than squares.

Assuming the center of the 902 MHz to 928 MHz operative bandwidth, or 915 MHz, the antenna's center wavelength (in air) is approximately 13 inches. As should be understood in this art, however, the permittivity of the substrate and cover material reduces the wavelength of the drive signal in the antenna from the in-air wavelength, the two wavelengths being related by a factor of the in-air wavelength divided by the square root of 2.3, and in the illustrated embodiment, the antenna wavelength is approximately 10.3 inches. As noted above, the length of each side of each square patch element 332 is one-half the antenna wavelength, and the length of each side of each square connector 350 is one-quarter the antenna wavelength: Accordingly, the side of each patch element 332 is approximately 5.15 inches, and the length of each side of square connector 350 is approximately 2.58 inches.

The patch elements are aligned in a row extending transverse (the X direction) to the path of the conveyor belt so that the center patch 332 is disposed in the center of the belt's path. The side patches are aligned with the center patch in the transverse direction, and the distance from patch corner 366 to patch corner 368 is approximately 26 inches, or approximately the width of the conveyor belt. The center-to-center spacing between adjacent patches is approximately nine inches.

Figure 7:
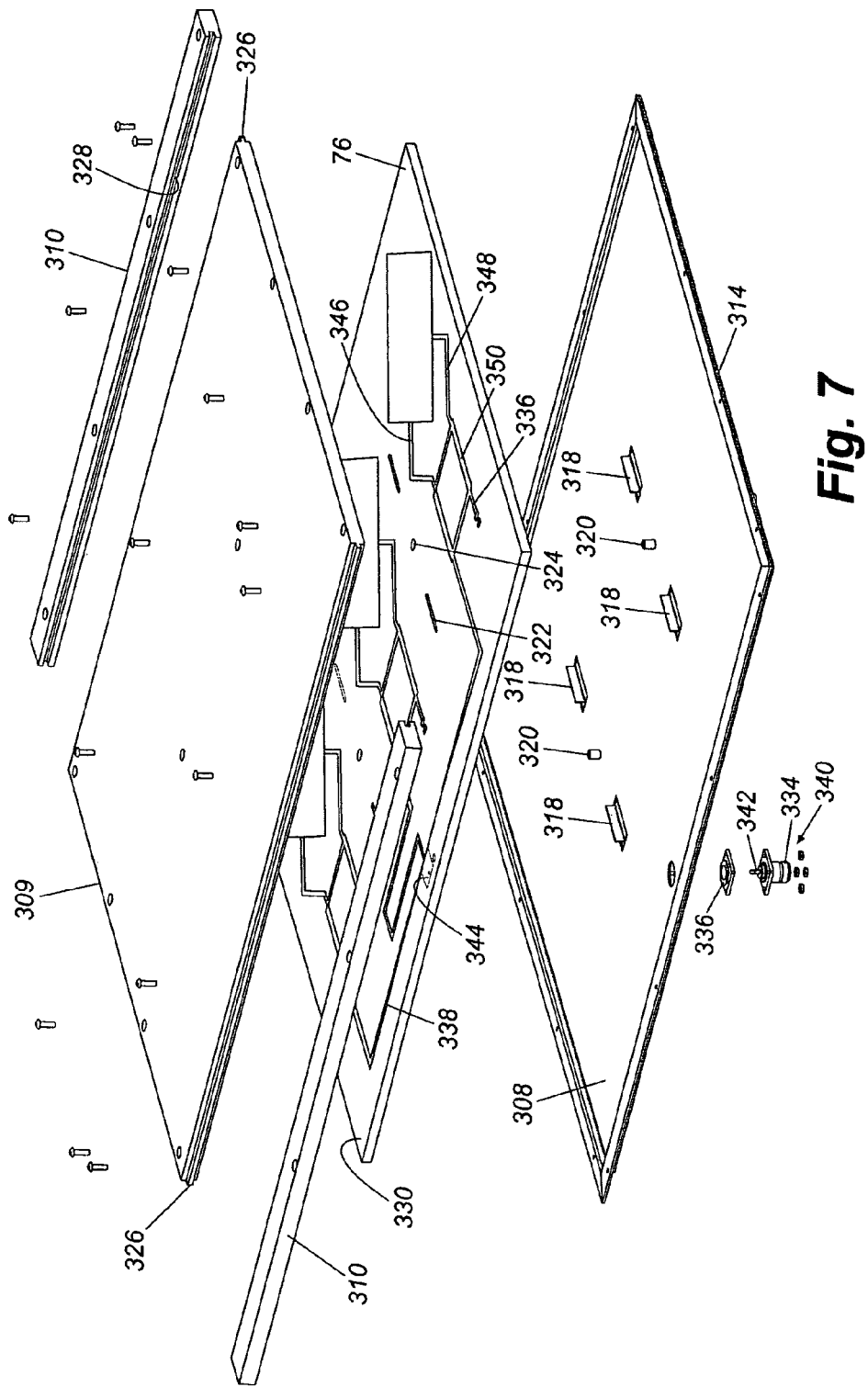
FIG. 7 is an exploded view of an RF antenna in accordance with an embodiment of the present invention.
Figure 8:
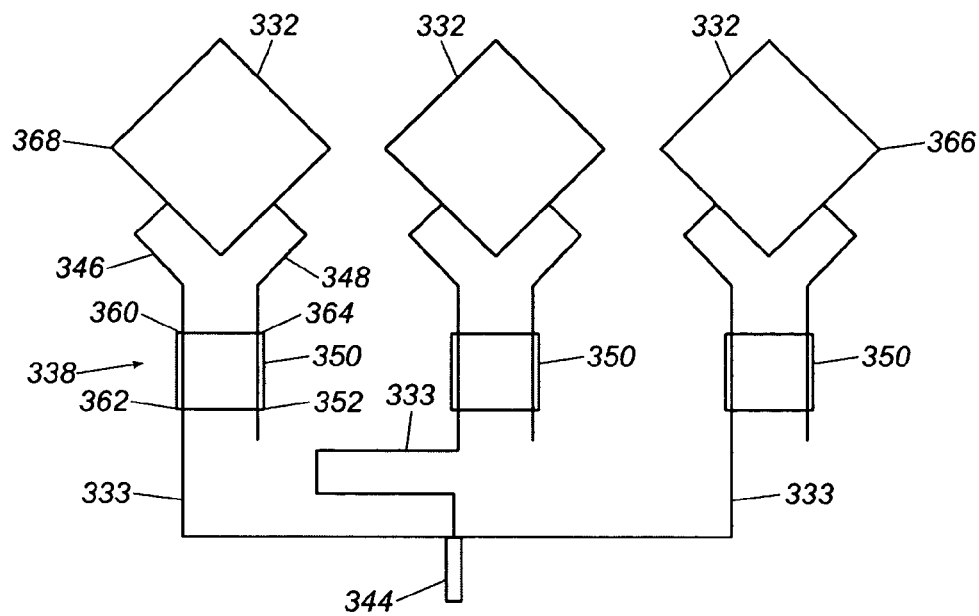
FIG. 8 is a schematic illustration of the RF antenna as in FIG. 7.

In operation, and referring initially to the embodiments shown in FIGS. 6, 7 and 8, center conductor 342 applies the drive signal to entry point 344 so that the drive signal is then applied by feed traces 333 to the bottom left corners of the respective square connectors 350. Because the length of each leg of the square connector is one-quarter of the drive signal wavelength, each leg introduces a one-quarter phase shift in the signal. That is, for example, the drive signal measured at square connector corner 360 lags the signal measured at corner 362 by ninety degrees, and the signal measured at corner 364 lags the signal measured at 360 by ninety degrees. Thus, and because the lengths of feed lines 346 and 348 are equal, the drive signal applied to patch element 332 by feed line 346 leads the signal at the connection between the patch element and feed line 348 by 90°.

As should be understood by those skilled in this art, each patch element resonates primarily at its edges, and the 90° phase shift in the signals at feed lines 346 and 348 causes the electric current pattern in the patch elements to rotate in the counterclockwise direction.

Figure 9A:
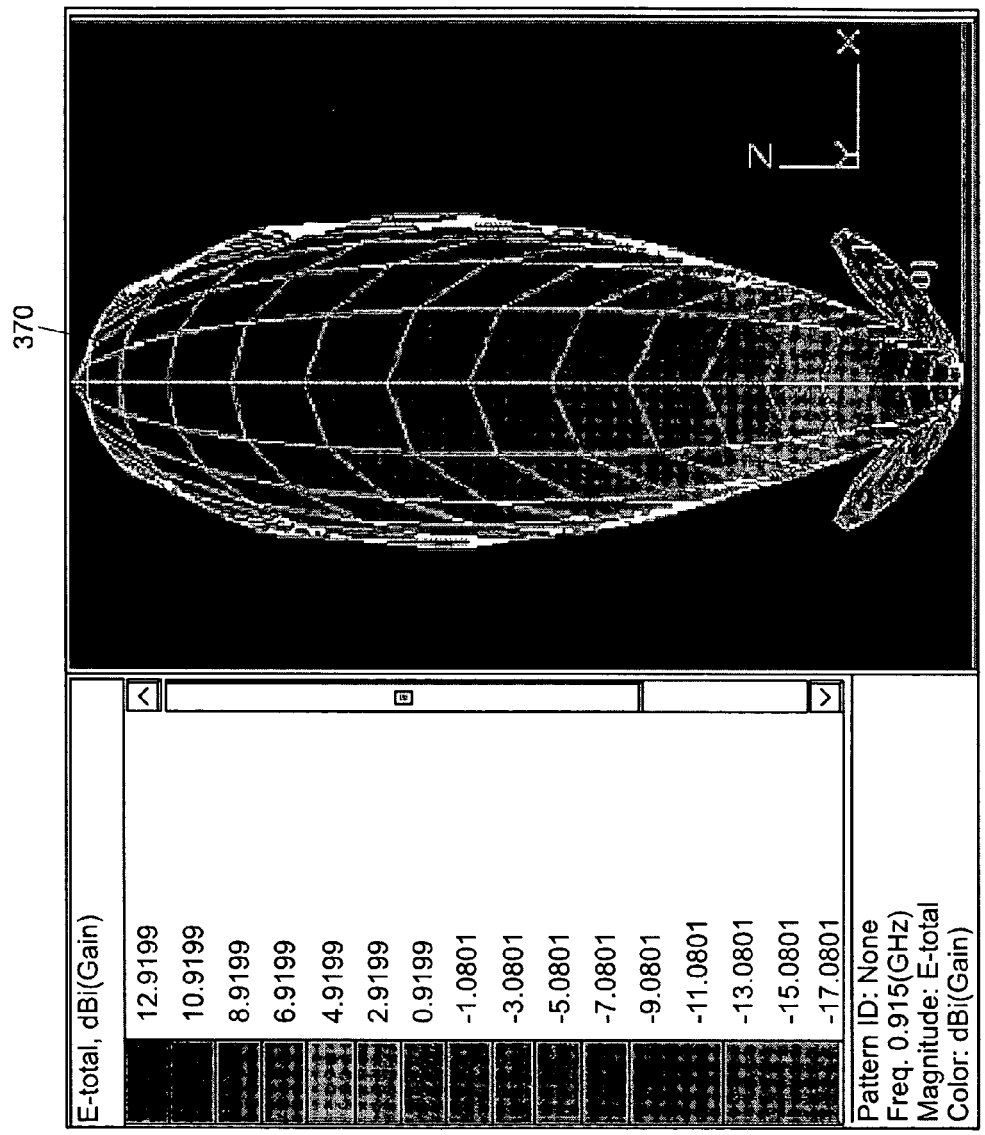
FIG. 9, which is presented as FIGS. 9A, 9B and 9C, is a schematic view of a radiation pattern of the RF antenna as in FIG. 8.
Figure 9B:
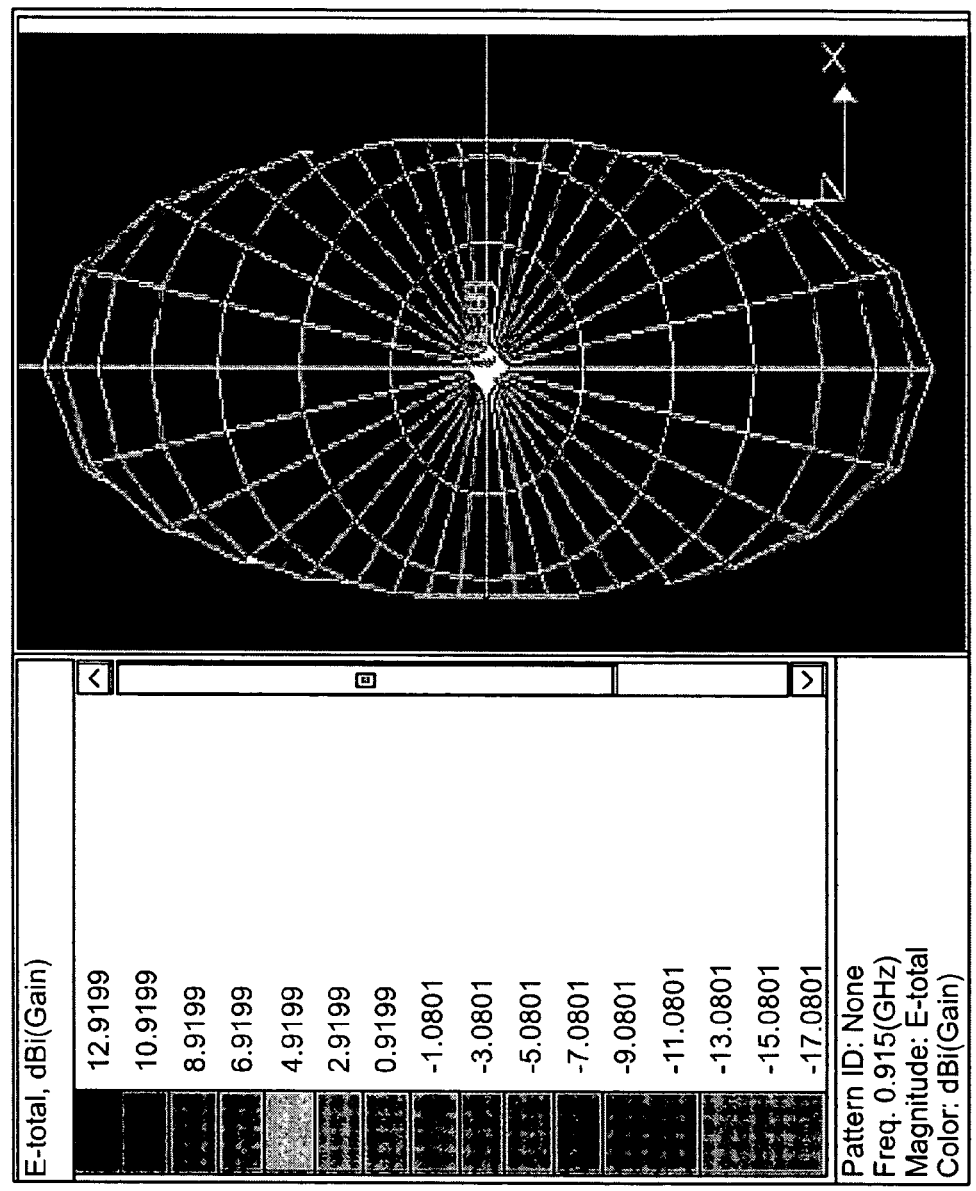
Figure 9C:
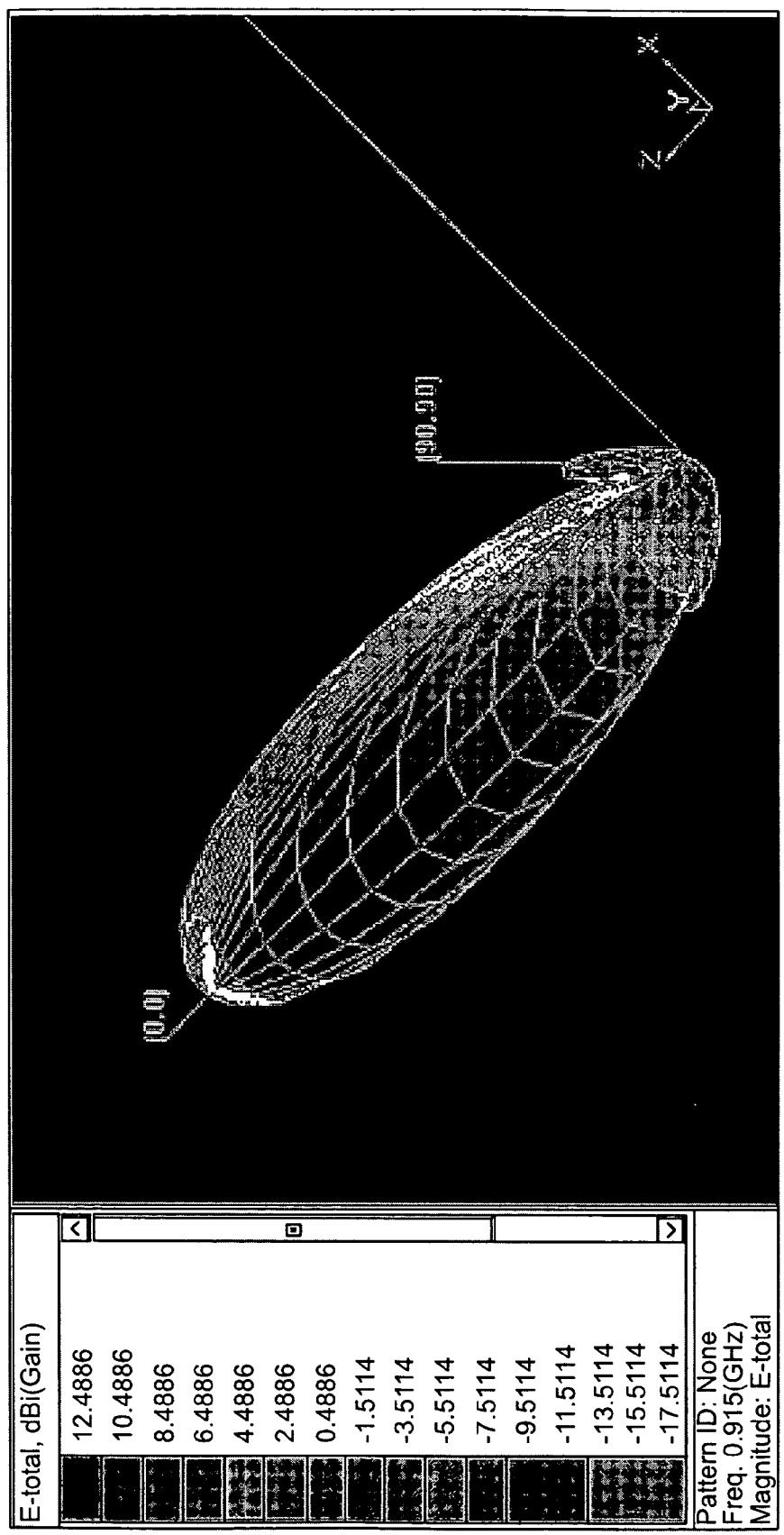

Because the corresponding feed lines 333, square connectors 350 and feed traces 346/348 for each patch element 332 of the array embodiment shown in FIGS. 6, 7 and 8 are of identical lengths and arrangement, the electric current patterns in the patch elements rotate in the same direction, and the patches' radiation patterns are in phase. Referring also to FIGS. 9A, 9B, and 9C, the antenna arrangement shown in FIGS. 6, 7 and 8 produces a radiation pattern 370, in which the X direction extends transverse to the path of the conveyor belt, the Y direction extends longitudinally to the belt's path (i.e. the X-Y plane is the conveyor belt plane), and the Z direction extends vertically above the belt.

Radiation pattern 370 is the radiation pattern's far field electric component. As should be understood in this art, the far field can be considered as the area outside a sphere of a radius equal to twice the square of the antenna array's longest dimension (in this instance, 26 inches), divided by the in-air wavelength, where the patch array is considered to be a point. While there is a transition area between the near and far fields, the radiation pattern in the near field area is dominated by the electric field component. Particularly when above or otherwise very close to a patch in the near field, an RFID tag is detected by the patch's near field component without interference from the other patches. Generally, it is desired that the RFID tags respond to the near field pattern, but not the far field pattern, to thereby reduce the likelihood of an undesired response from an RFID tag on a package other than the desired package.

Again referring to FIGS. 9A-9C, radiation pattern 370 has a main lobe having a relatively wide dimension in the Y axis along the conveyor belt's center line. The size of the two side lobes is generally a function of the spacing between the patches and is minimized when the center-to-center spacing between the patches is equal to one-half the drive signal's in-air wavelength. Given the preferred dimensions of patch elements 332 in the presently described embodiments, the nine inch center-to-center spacing was chosen to extend across the approximately 26 conveyor belt span, thereby resulting in the side lobes illustrated in FIGS. 9A-9C.

As shown in the figures, the radiation pattern extends from the patch array upstream and downstream in the Y direction with respect to the conveyor belt's path of travel and above the belt in the Z direction so that the front and back edges of the radiation pattern extend at an angle in the Y-Z plane. Accordingly, RFID tags disposed on relatively low packages carried by the conveyor belt may not impact the far field radiation pattern until relatively close to bottom antenna 76. Tags on taller packages, however, may impact the main lobe farther before and farther after the antenna. Thus, depending on the spacing between the packages, there may be an increased probability that the antenna will simultaneously receive responses from different RFID tags disposed on different packages that are simultaneously within the radiation pattern.

To reduce the far field pattern, and thereby reduce the probability that responses from tags on different packages will be simultaneously received by the antenna array, the phase of the drive signal applied to the individual patches in the antenna array is shifted at the respective patches to a predetermined relationship with respect to the drive signal phase at the other patches. Referring to the embodiment shown in FIGS. 5 and 10, for example, patch array antenna 76 is comprised of three patches 332a, 332b, and 332c constructed identically to the patches described in the patch array with respect to FIGS. 6, 7 and 8. Square connectors 350a, 350b, and 350c and feed traces 346a/348a, 346b/348b and 346c/348c are also of the same construction as the corresponding components in the embodiment of FIGS. 6, 7 and 8. The feed network between entry point 344 and the square connectors, however, is changed both to shift the drive signal phase to the respective patch elements and to alternate the electric current pattern rotations. More specifically, feed line 333b has the same length as in the arrangement of FIGS. 6, 7 and 8 and attaches to the same corner 362b of its square connector. Feed line 333a however, is shortened by one-quarter wavelength and now attaches to a lower right hand corner 372a of square connector 350a. Corner 362a is now grounded. Similarly, corner 362c of square connector 350c is grounded, whereas feed line 333c now connects to corner 372c.

Because feed line 333a is shortened by one-quarter wavelength with respect to feed line 333b, the phase of the drive signal presented to patch element 332a at its square connecter is shifted by −90° with respect to the drive signal presented to patch element 332b at its square connector. On the other hand, feed line 333c is increased by a quarter wavelength with respect to feed line 333b, and the phase of the drive signal presented to patch element 332c at its square connector 352c is shifted by a +90° with respect to the drive signal presented to 332b.

Because the length of the feed network between entry point 344 and patch element 332a differs from the length of the feed network between entry point 344 and patch element 332c by a half wavelength, and because feed lines 333a and 333c are connected to the bottom right hand corners of their respective square connectors, the electric current patterns in patch elements 332a and 332c rotate in the same direction, and these two patch elements are always 180° out of phase. Because feed line 333b remains connected to the lower left hand corner of its square connector, however, the current pattern on patch element 332b (which is 90° with each of the other two patches) rotates in the opposite direction to that of the two adjacent patches. That is, the current pattern rotational direction alternates among adjacent patch elements.

Figure 10:
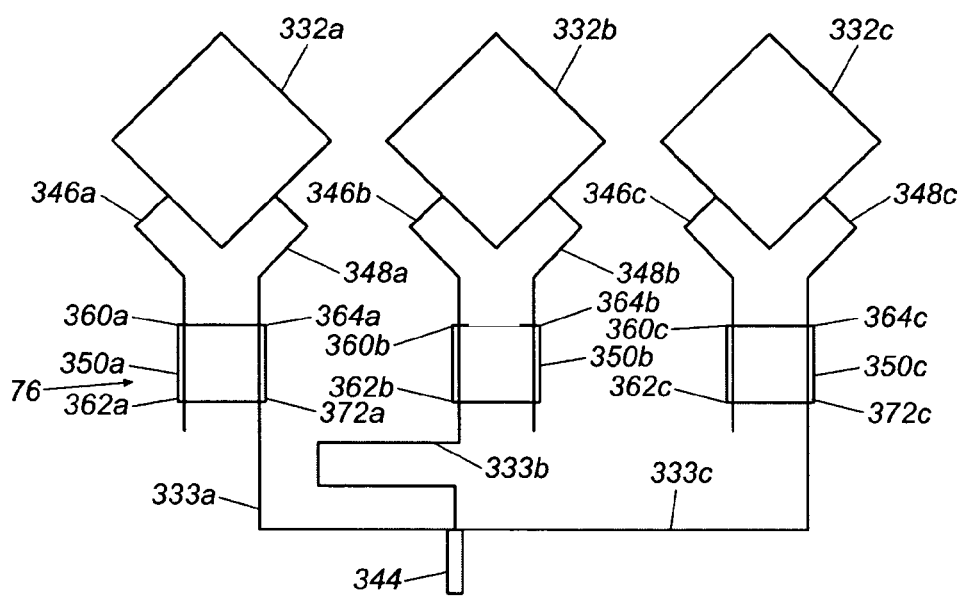
FIG. 10 is a schematic illustration of the RF antenna as in FIG. 5.
Figure 11A:
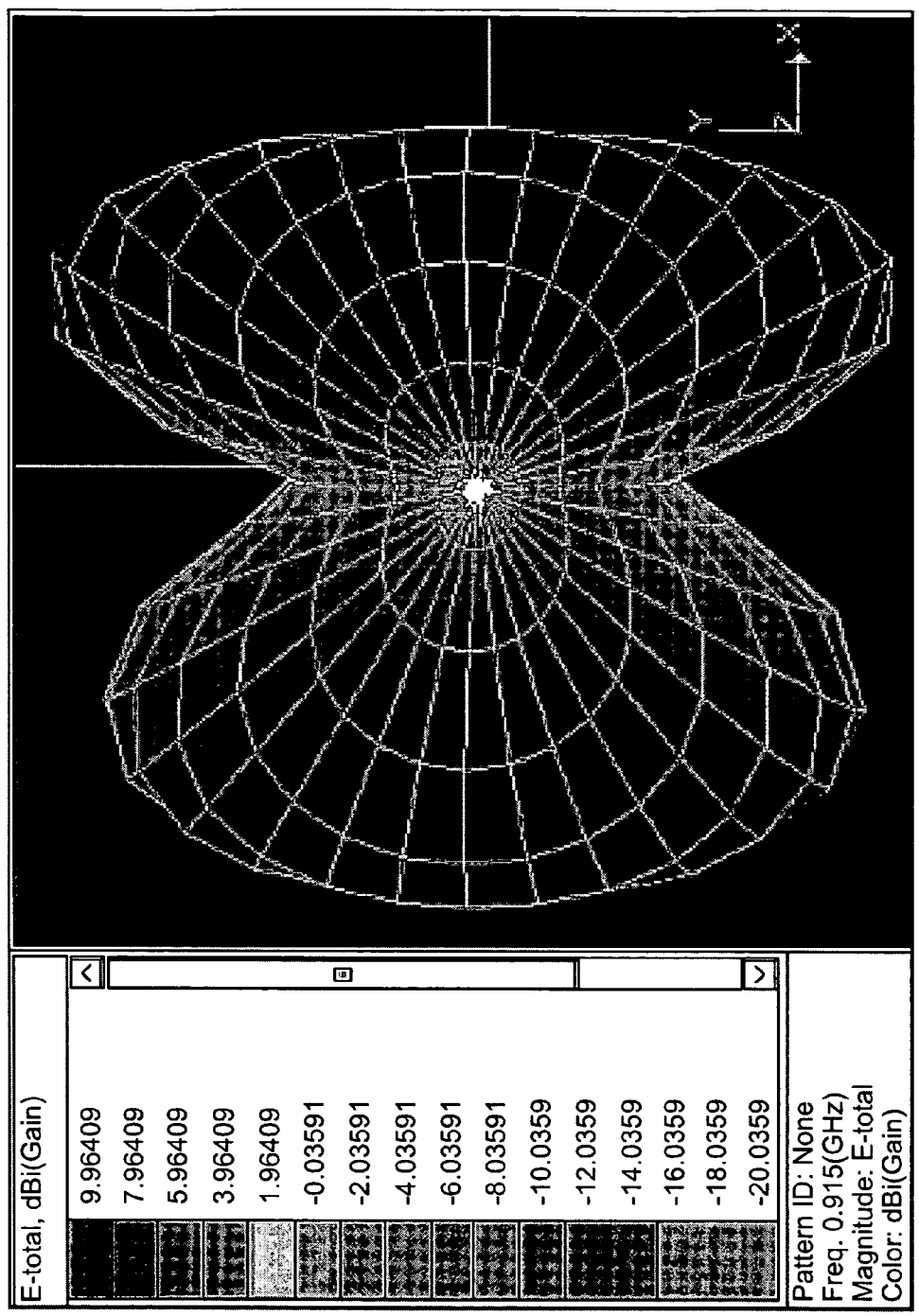
FIG. 11, which is presented as FIGS. 11A and 11B, is a schematic view of a radiation pattern of the RF antenna as in FIG. 10.
FIGS. 11C and 11D are graphical representations of components of the radiation pattern illustrated in FIGS. 11A and 11B.
Figure 11B:
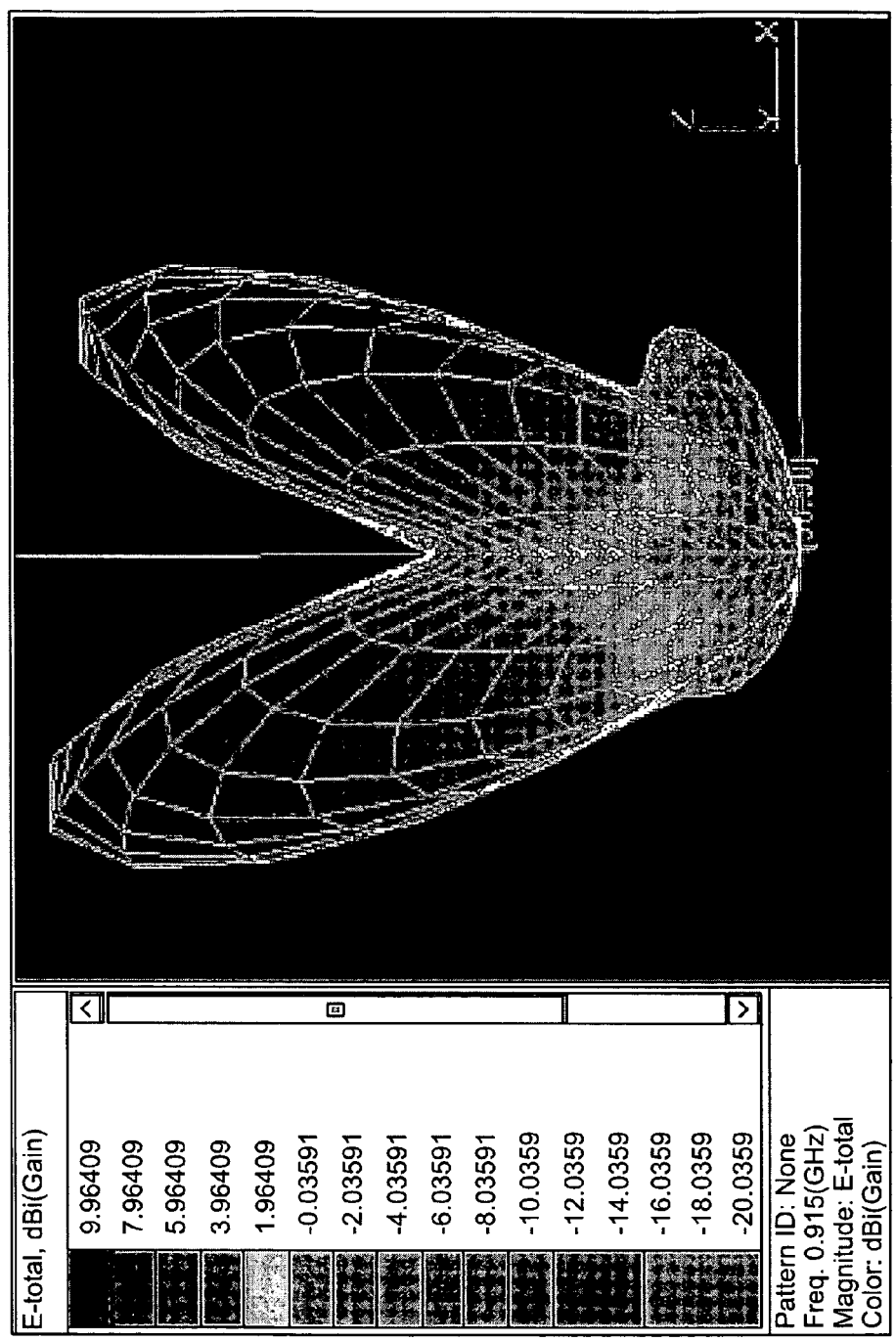

FIGS. 11A and 11B illustrate the radiation pattern resulting from the antenna configuration shown in FIGS. 5 and 10 in the X-Y plane and X-Z plane, respectively. As illustrated particularly in FIG. 11A, the radiation pattern has two main lobes that diverge to either side of the Y axis. Since the Y axis lies longitudinally along the center of the conveyor belt, this means that the main lobes extend away from the center of the belt, that the far field radiation pattern along the belt's center is smaller as compared to the center of the far field pattern shown in FIGS. 9A-9C, and that the gain of the far field pattern along the belt center is less than the far field pattern gain at the same position in FIGS. 9A-9C (approximately 2 dB in FIG. 11A, as opposed to approximately 13 dB as shown in FIG. 9B). To the extent RFID tags are positioned toward the sides of the belt, the gain of the two main lobes as shown in FIG. 11 is reduced about 3 dB from the main lobe of the pattern shown in FIG. 9. Thus, both in terms of gain and spatial orientation, the far field pattern of the antenna arrangement shown in FIG. 10 is less likely to detect an RFID tag than the arrangement shown in FIGS. 7 and 8.

Figure 11C:
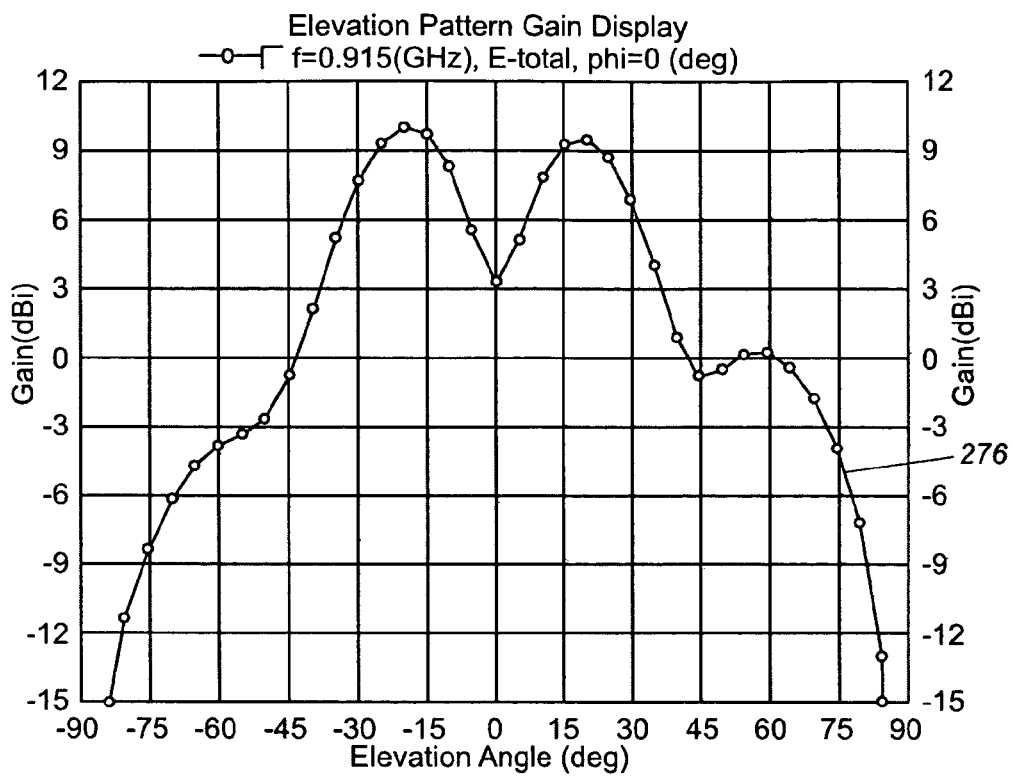
Figure 11D:
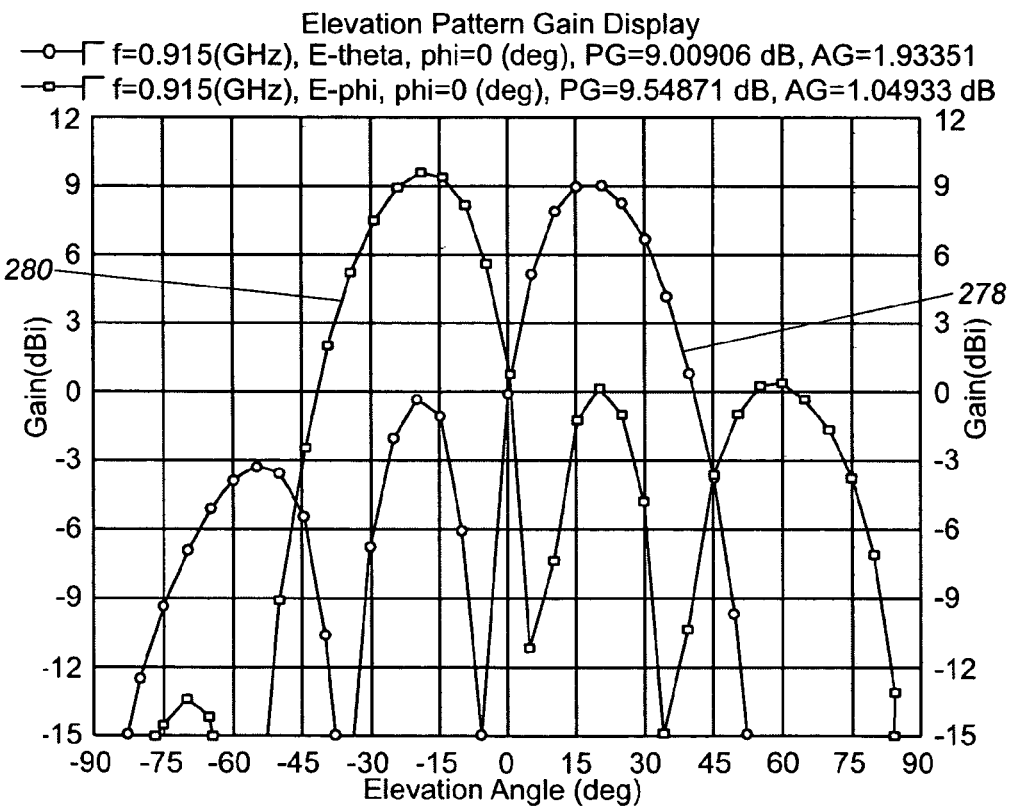

FIGS. 11C and 11D illustrate another aspect of the antenna arrangement shown in FIG. 10 that reduces the probability the far field radiation pattern will detect an RFID tag from the probability applicable to the antenna arrangement shown in FIG. 8. As should be understood in this art, the radiation pattern shown in FIG. 9 from the antenna arrangement of FIG. 8 is circularly polarized in the far field. That is, the far field radiation pattern shown in FIG. 9 can detect an RFID tag at any orientation in the horizontal (X-Y) plane. The radiation pattern does not detect vertically oriented tags. The alternating rotational directions of the current patterns on the patch elements shown in FIG. 10, however, result in contributions to the overall radiation pattern that are linearly polarized.

Referring again to FIG. 10, for example, the radiation patterns of patch elements 332a and 332c tend to cancel each other in the far field because these two patch elements are 180° out of phase. Thus, the total radiation pattern can be considered a combination of contributions from element 332a and 332b, on the one hand, and element 332b and 332c, on the other. Referring to FIGS. 11C and 11D, the total gain pattern 276 (taken in the X-Z plane) is comprised of a linearly polarized first pattern 278 and linearly polarized second pattern 280 that is offset 90° in polarization with respect to first pattern 278. More specifically, the difference in current pattern rotational direction between patch elements 332a and 332b results in a gain pattern exhibiting polarization in the Y direction according to pattern 280, whereas the difference in current pattern rotation between patches 332b and 332c results in a gain pattern that is polarized in the X direction according to pattern 278. Thus, to the extent an RFID tag passes through the far field radiation pattern of the antenna arrangement shown in FIG. 10 at a point at which the tag is perpendicular to the field's polarization in that area, the tag may not be detected. In other words, the radiation pattern shown in FIGS. 11A and 11B is not uniform in its polarization in the horizontal plane, and it is therefore possible that an RFID tag may pass through the far field pattern undetected, depending upon its horizontal orientation and the path taken through the field. Thus, as a result of its different polarization characteristics, the far field pattern shown in FIG. 11 may be less likely to detect RFID tags than is the pattern shown in FIG. 9.

Referring again to FIGS. 5, 6, 7 and 18, the placement of antenna 76 and frame 302 between the conveyor frame and belt generally provides insufficient space for placement of radiation absorbing materials that might otherwise block the antenna's far field radiation pattern. Thus, the reduction of the far field pattern through phase shifting of the drive signal applied to the respective patch elements reduces the effectiveness of the far field pattern in generating RFID tag responses and thereby reduces the likelihood of undesired tag reads.

Figure 12A:
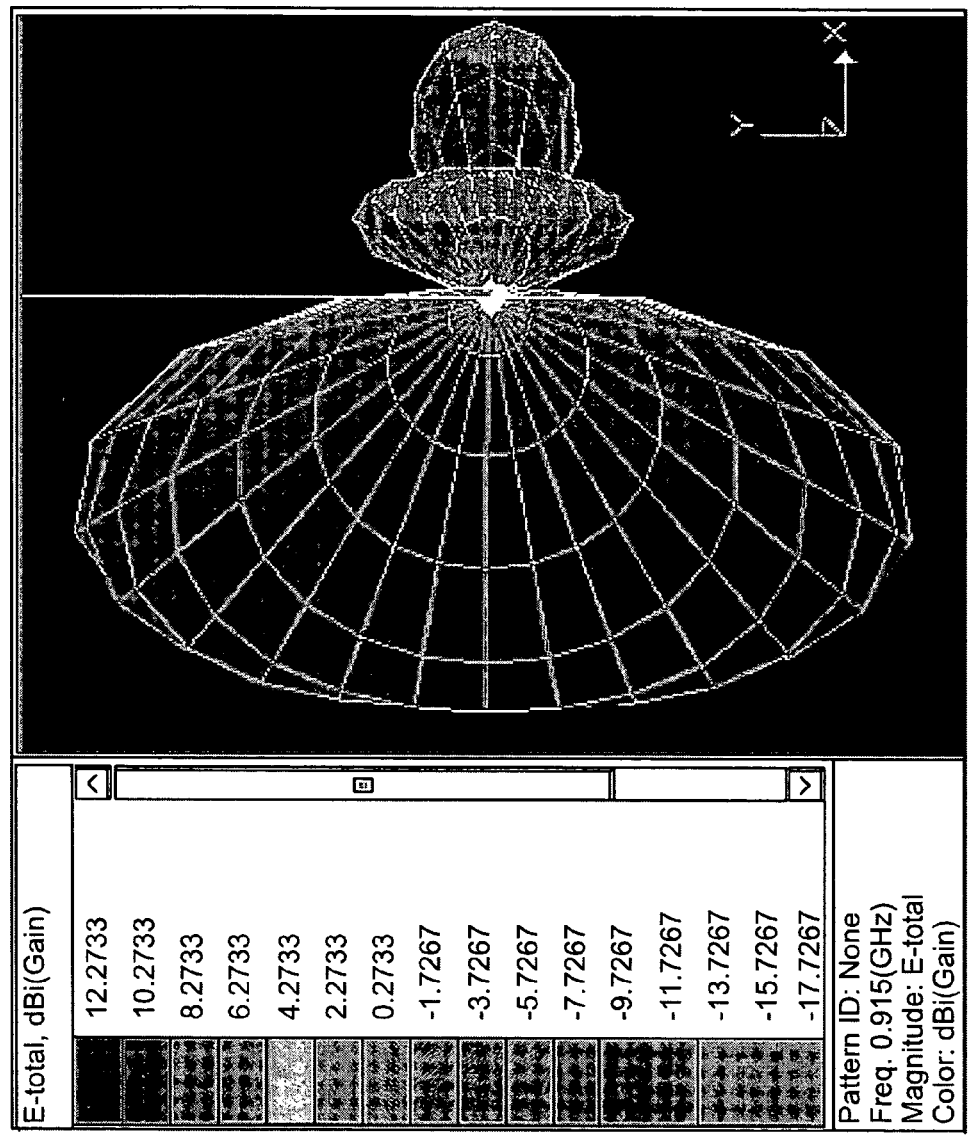
FIG. 12, which is presented as FIGS. 12A and 12B, is a schematic view of a radiation pattern from an RF antenna in accordance with an embodiment of the present invention.
Figure 12B:
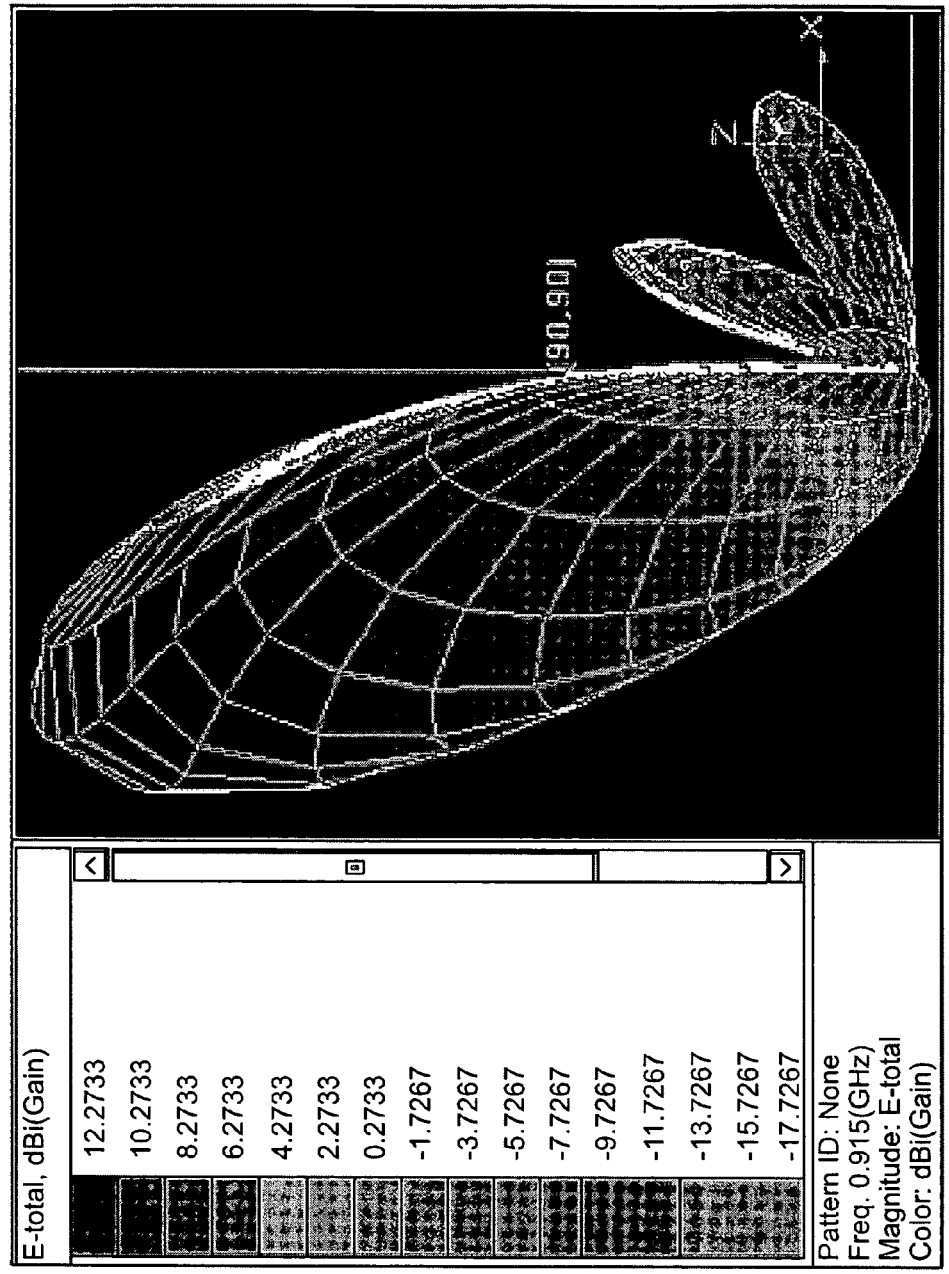

In view of the present disclosure, it should be understood that various modifications can be made to the antenna arrangement shown in FIG. 10 while still improving the antenna's far field performance over an arrangement such as shown in FIG. 8. Assume, for example, that the lengths of feed traces 333a, 333b and 333c remain the same as in FIG. 10 but that the feed lines are attached to corners 362a, 362b, and 362c of square connectors 350a, 350b and 350c respectively. The resulting radiation pattern is illustrated in FIGS. 12A (X-Y plane) and 12B (X-Z plane). As with the pattern shown in FIG. 11, the radiation pattern illustrated in FIG. 12 is relatively narrow in the Y direction at the center of the conveyor belt. Although the gain of the main lobe is not significantly reduced from the gain of the main lobe shown in FIG. 9, the lobe on the right hand side of the belt is relatively small.

Still referring to FIG. 11, the width of the antenna radiation pattern in the Y direction can be further reduced through the use of a double row of patch array elements. That is, two parallel rows, each having three patch elements in the same configuration as shown in FIG. 10, are disposed adjacent to each other and extend transversely across the span of the conveyor belt. Thus, two patch elements 332a are aligned in the Y direction, two patch elements 332b are aligned in the Y direction, and two patch elements 332c are aligned in the Y direction. Referring to a frame of the type shown in FIG. 7, for example, the dual antenna may be accommodated by extension of bottom pan 316 in the Y direction. A third rail 310 is disposed between the two adjacent antennas 76 such that flanges 326 of the adjacent antennas are received in corresponding grooves 328 on opposite sides of the third rail. Cover 309 is also extended in the Y direction to cover both antennas. Connector 336 is replaced by a splitter that splits the drive signal provided by center conductor 342 to respective feed lines that connect to the respective antenna entry points.

Although additional parallel rows may be added to the arrangement to further narrow the far field radiation pattern, the number of such rows may be limited by the resulting increase of the near field detection area. That is, because the near field detection zone is increased with each antenna row, an increase in the number of antenna rows could actually increase the likelihood of undesired simultaneous RFID tag reads from different packages, depending on the spacing between packages on the conveyor. Accordingly, the number of additional rows will generally depend upon the configuration of the particular system.

Similarly, the number of patch elements in a single row in the X direction may also depend upon the width of the conveyor belt. An approximately 26 inch wide conveyor belt assumed in the examples described above favors the three-patch configuration at the 902 MHz-928 MHz operating range. Where patch arrays are used with belts of different widths or in different frequency ranges, however, and/or where patches otherwise differing in their dimensions are used, more or fewer patch elements may be used within a transverse row. In such circumstances, phase shifted drive signals may be applied to the patches to improve far field performance.

Figure 13:
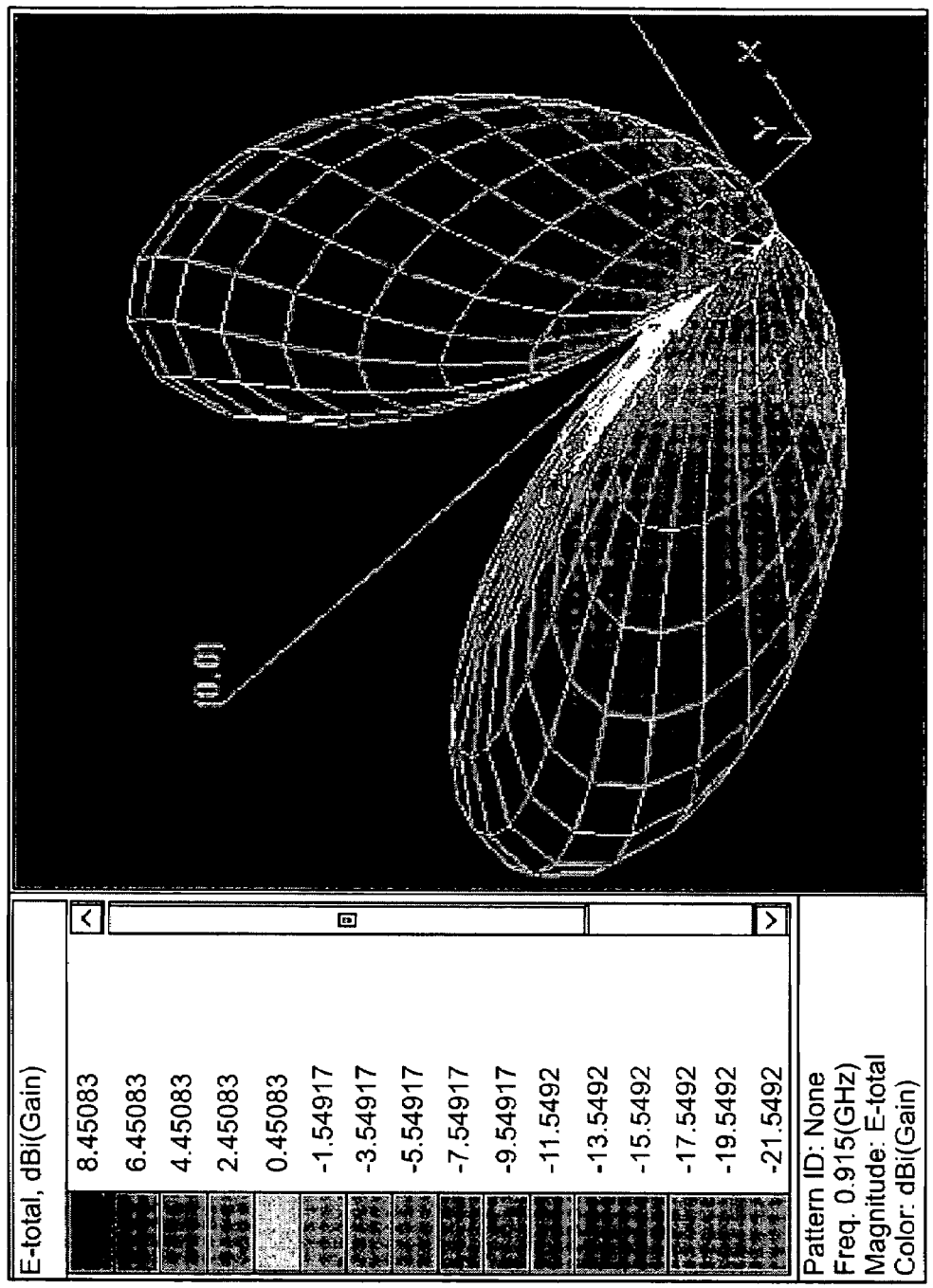
FIG. 13 is a schematic view of a radiation pattern from an RF antenna in accordance with an embodiment of the present invention.
Figure 22:
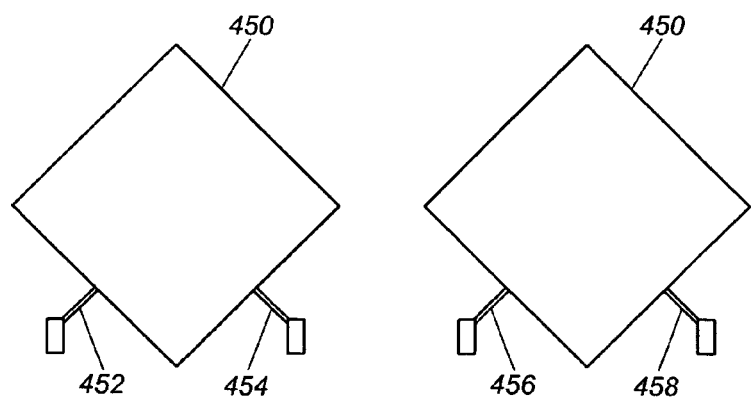
FIG. 22 is a schematic illustration of a patch array for an RF antenna in accordance with an embodiment of the present invention.

Referring to FIG. 22, for example, assume that a patch array used under a narrower belt (e.g., approximately 20 inches) has two 5.15 inch square patch elements 450 extending transversely across the width of the belt. Assume also that the feed line (similar to feed line 333 in FIG. 8) to the square connector of one patch element is one-half wavelength longer than the feed line to the other patch element and that the feed lines both connect to the bottom left hand corner of the respective square connectors. If feed line 452 is considered at −180°, then feed line 454 is at −90°, feed line 456 is at 0°, and feed line 458 is at 90°. That is, the patch elements are 180° out of phase, and the patches' electric current patterns rotate in the same direction. As indicated by the resulting radiation pattern illustrated in FIG. 13, the width of the far field radiation pattern is reduced at the belt center line, and the two main lobes have reduced gain.

Figure 14A:
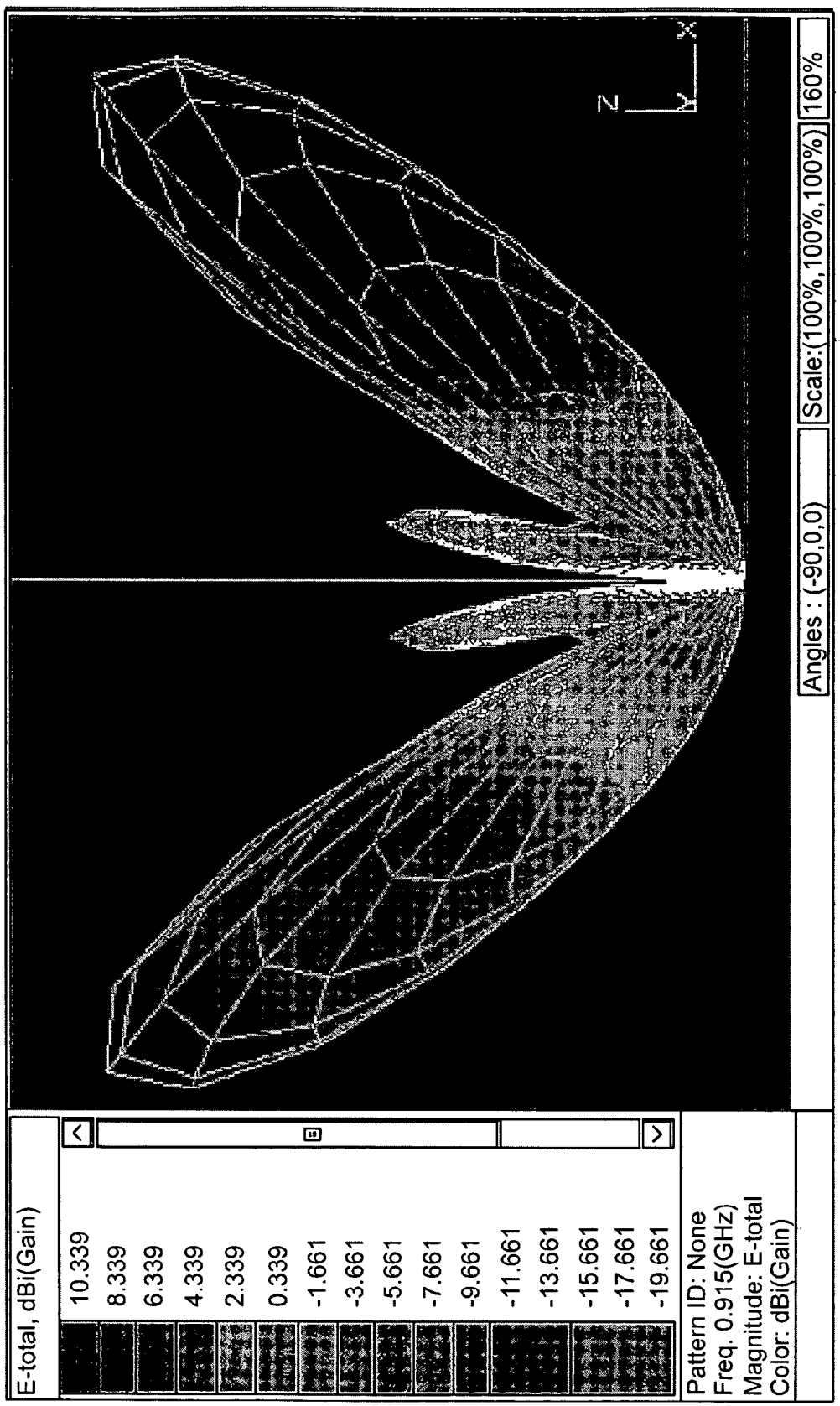
FIG. 14, which is presented as FIGS. 14A and 14B, is a schematic view of a radiation pattern from an RF antenna in accordance with an embodiment of the present invention.
Figure 14B:
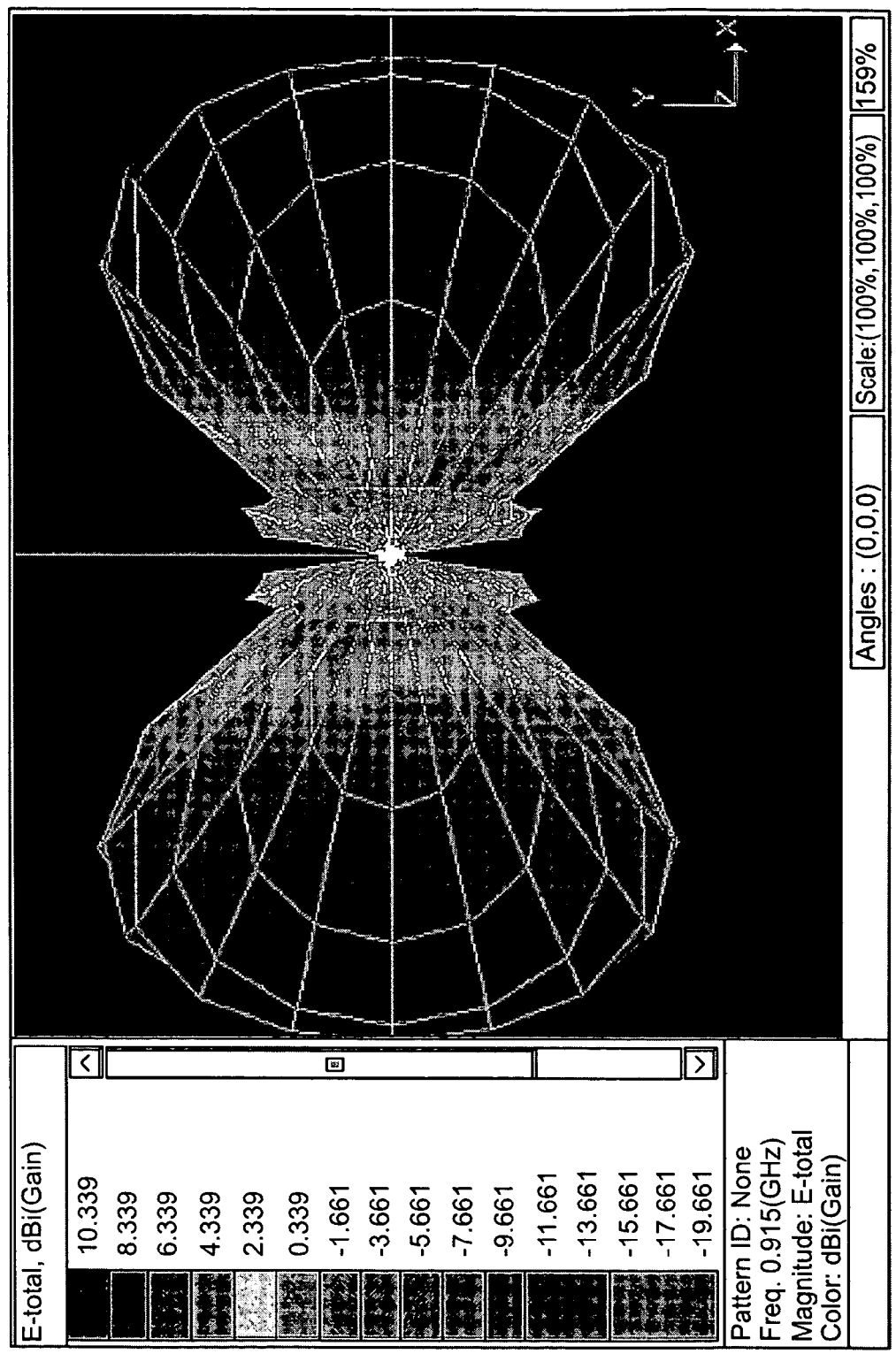
Figure 15:
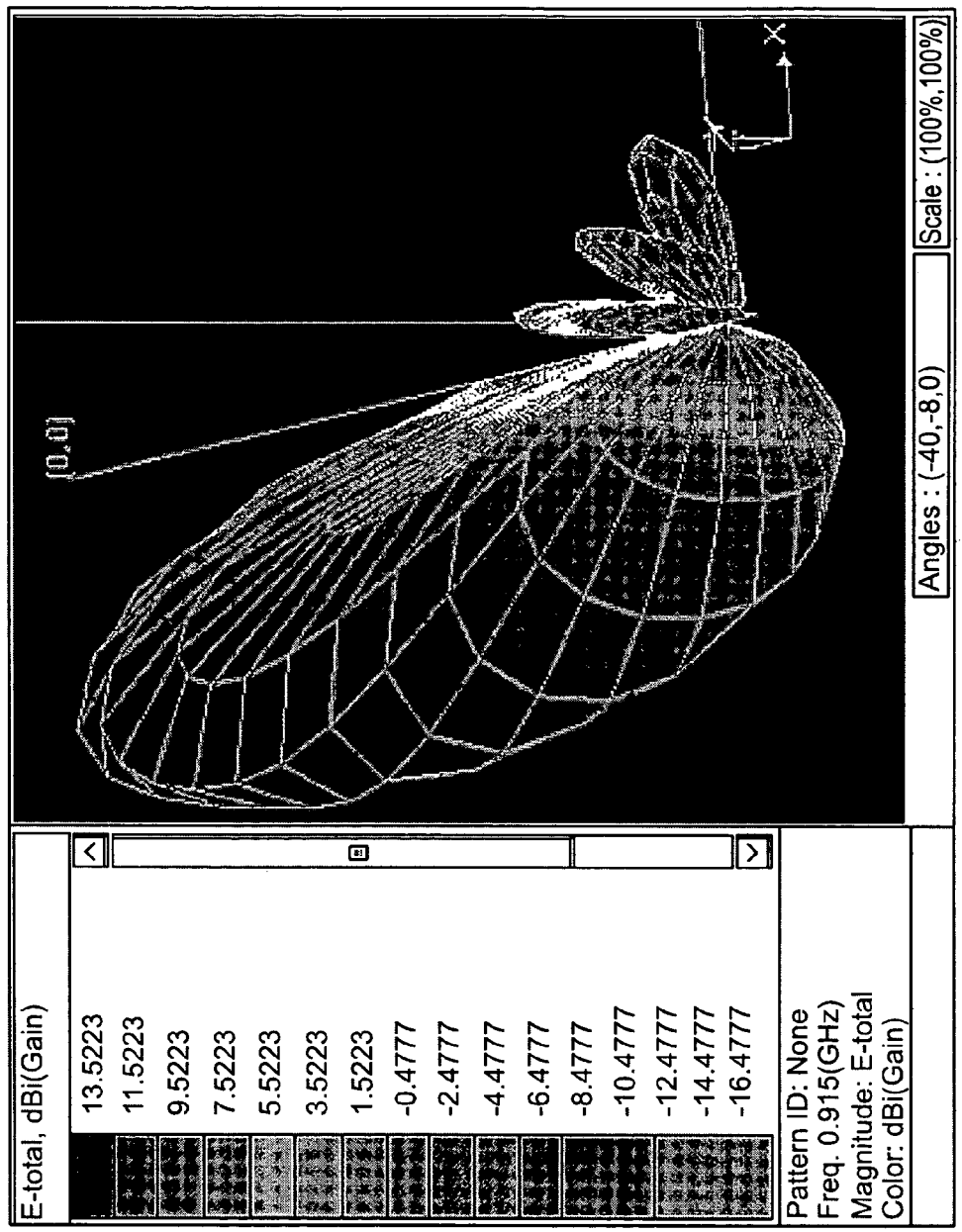
FIG. 15 is a schematic view of a radiation pattern from an RF antenna in accordance with an embodiment of the present invention.
Figure 23:
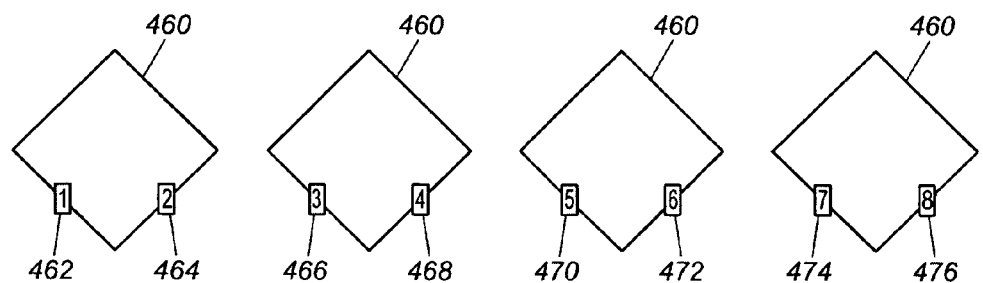
FIG. 23 is a schematic illustration of a patch array for an RF antenna in accordance with an embodiment of the present invention.

Referring to FIG. 23, assume now a wider conveyor belt (e.g., approximately 40 inches) and an antenna array comprised of four 5.15 inch square patch elements 460 arranged side-by-side with a center-to-center spacing of nine inches. FIGS. 14A and 14B illustrate the resulting radiation pattern when feed lines 462 and 470 are considered at −180°, feed lines 464 and 472 are at −90°, feed lines 466 and 474 are at 0°, and feed lines 468 and 476 are at 90°. That is, the drive signals are applied to the patch elements so that the patch elements of each pair of adjacent elements are 180° out of phase and all patch elements have the same current pattern rotation. FIG. 15 also illustrates a four-element radiation pattern. In this instance, feed lines 462 and 476 can be considered at −90°, feed lines 464 and 466 are at 0°, feed lines 468 and 470 are at 90°, and feed lines 472 and 474 are at 180°. Thus, the patch elements of each adjacent pair of elements are 90° out of phase, and all patches have the same current pattern rotation.

Figure 16A:
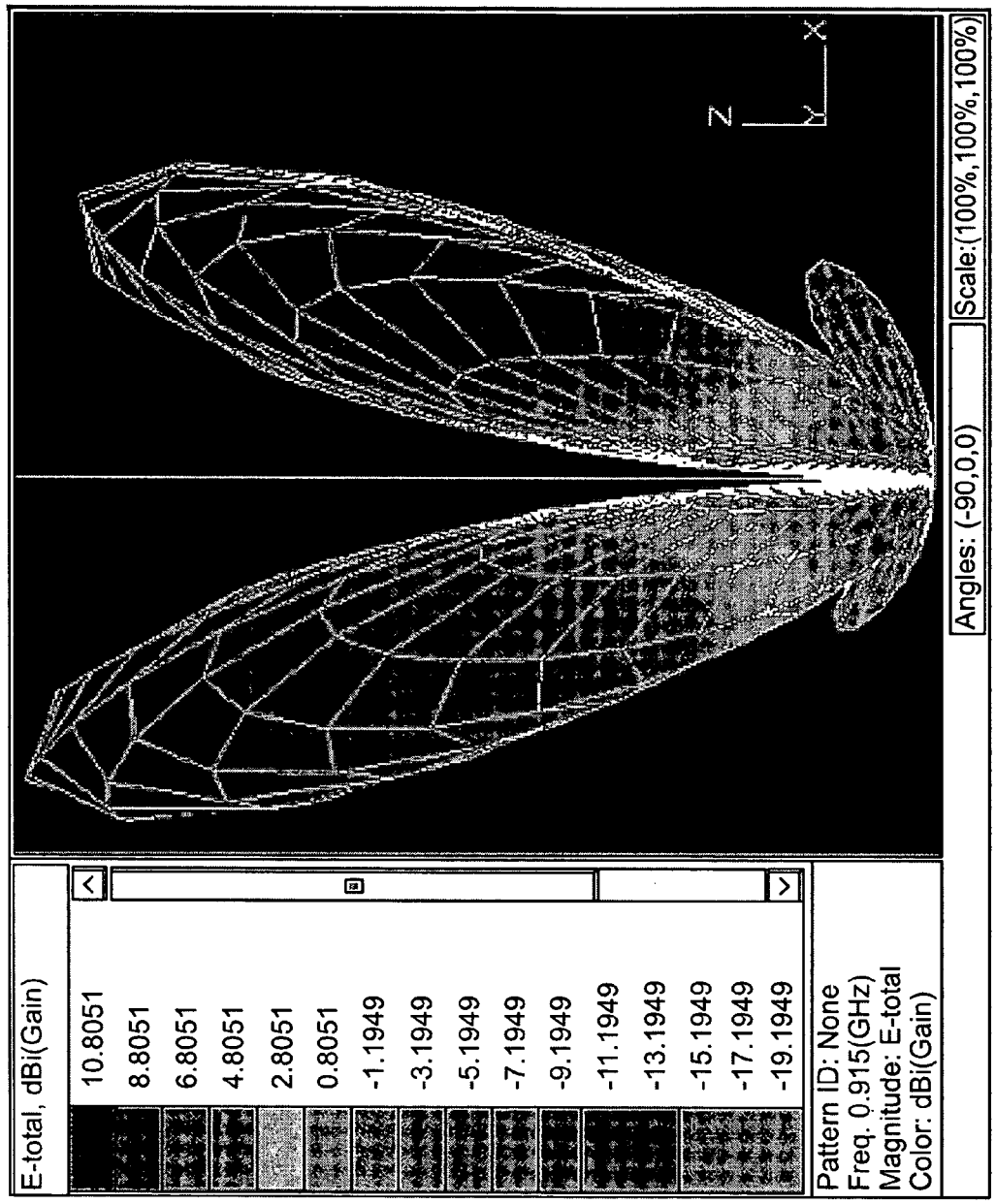
FIG. 16, which is presented as FIGS. 16A and 16B, is a schematic view of a radiation pattern from an RF antenna in accordance with an embodiment of the present invention.
Figure 16B:
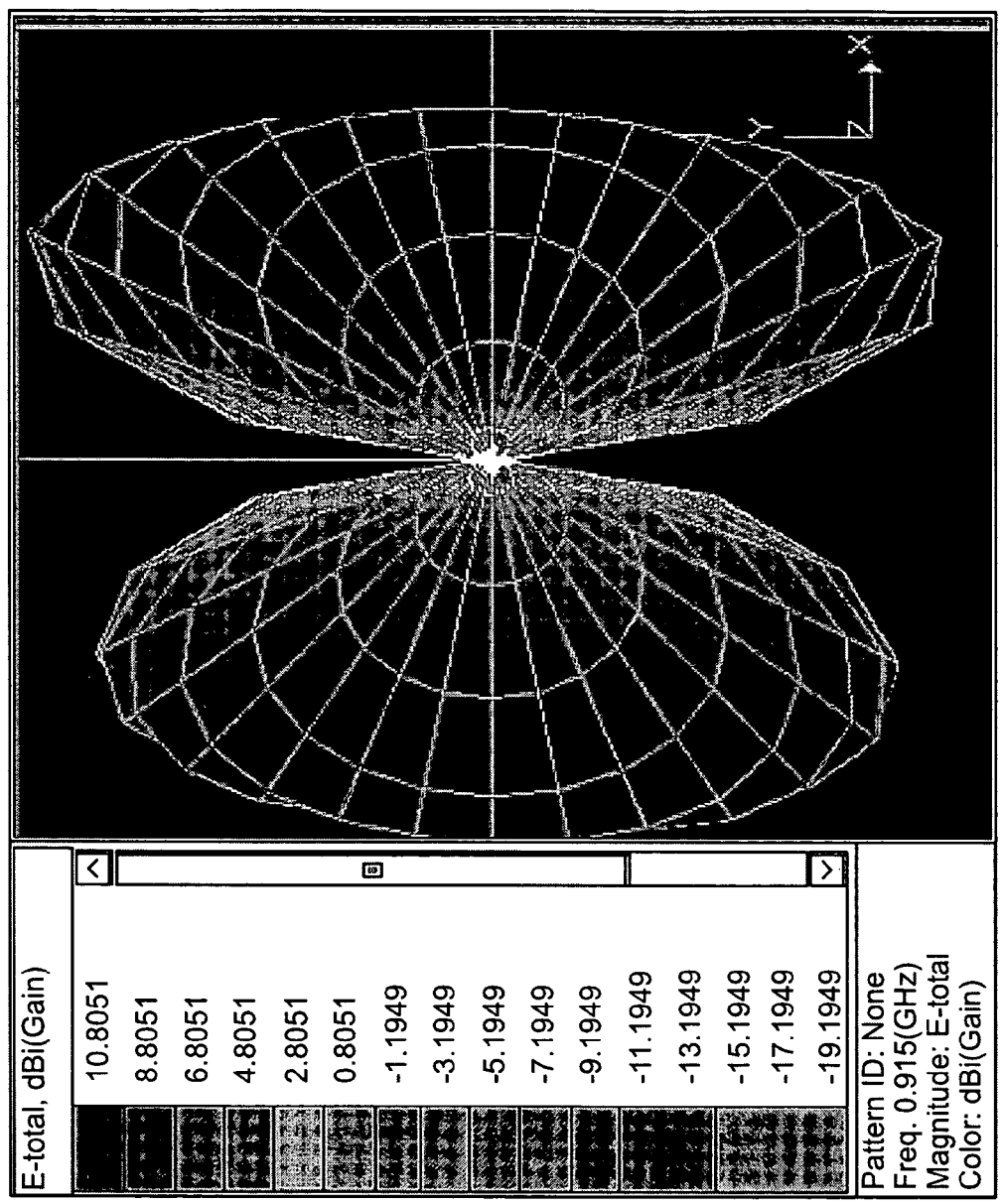

FIGS. 16A and 16B illustrate a radiation pattern when feed lines 462 and 466 can be considered at 0°, feed lines 464 and 476 are at −90°, feed lines 468 and 472 are at 90°, and feed lines 470 and 474 are at 180°. Thus, the first and third patch elements, and the second and fourth patch elements, are 180° out of phase, and the current rotation of patch elements one and three is opposite to the current pattern rotation of patch elements two and four.

As described above, the default sequence generated by antenna sequence generator 202 (FIG. 2) includes instructions to activate antennas 46, 56, 66, and 76 (FIG. 1) one-by-one in a round-robin sequence. In accordance with this default sequence, antenna sequence thread 204 activates each antenna via its corresponding antenna engine individually and sequentially, thereby avoiding interference that might occur if antennas were activated simultaneously. At each antenna, the sequence thread first drives the engine to query for one of the two standard tag protocols (i.e. class 0 or class 0.1) and then the other. That is, there are two query/receive cycles for each antenna. Thus, if all four antennas are activated for a given package, eight reads are required to fully query for a tag.

Depending on the speed at which the system moves packages, the distance between packages, and the rate at which the system reads tags, there may be insufficient time to execute eight tag queries. For example, assume a package moves at 600 feet/minute, that 0.104 seconds is needed to execute all eight reads, that the minimum length of a package handled by the system is six inches, and that the minimum distance between two packages is fifteen inches. As noted above, the system defines the detection zone as a distance from the start window equal to a package's length plus one-half the distance between sequential packages. In one embodiment, however, if the gap between packages is greater than or equal to ten inches, and less than twenty inches, the detection zone distance equals the package's length plus the distance between sequential packages, less ten inches. Thus, the minimum detection zone, and therefore the shortest distance over which a tag in the system under this configuration might be available to be read, is 11 inches. At 600 ft/min, the tag would be available for reading only for 0.0917 seconds—less time than is needed to execute all eight reads. Further, in a preferred embodiment the system desirably makes two attempts to read and confirm a tag. With a tag available for only 0.0917 seconds, the system can make, at best, only one attempt to read a tag.

Moreover, because tags on package bottoms pass so closely to the bottom antenna, the bottom antenna's beam width may not extend the detection zone's full width when reading such tags. In one preferred embodiment of a bottom antenna as discussed herein, for example, the antenna beam width between the antenna patches immediately above the conveyor belt and in the direction of the conveyor's movement is approximately 4.25 inches (beam width reaches approximately ten inches at the patches). Thus, and again assuming the package moves at 600 ft/min, a bottom tag would be optimally readable by the bottom antenna only for 0.0354 seconds. This is less than the time needed to cycle through the eight antenna queries and therefore increases the chance a bottom tag will not be read.

Figure 32:
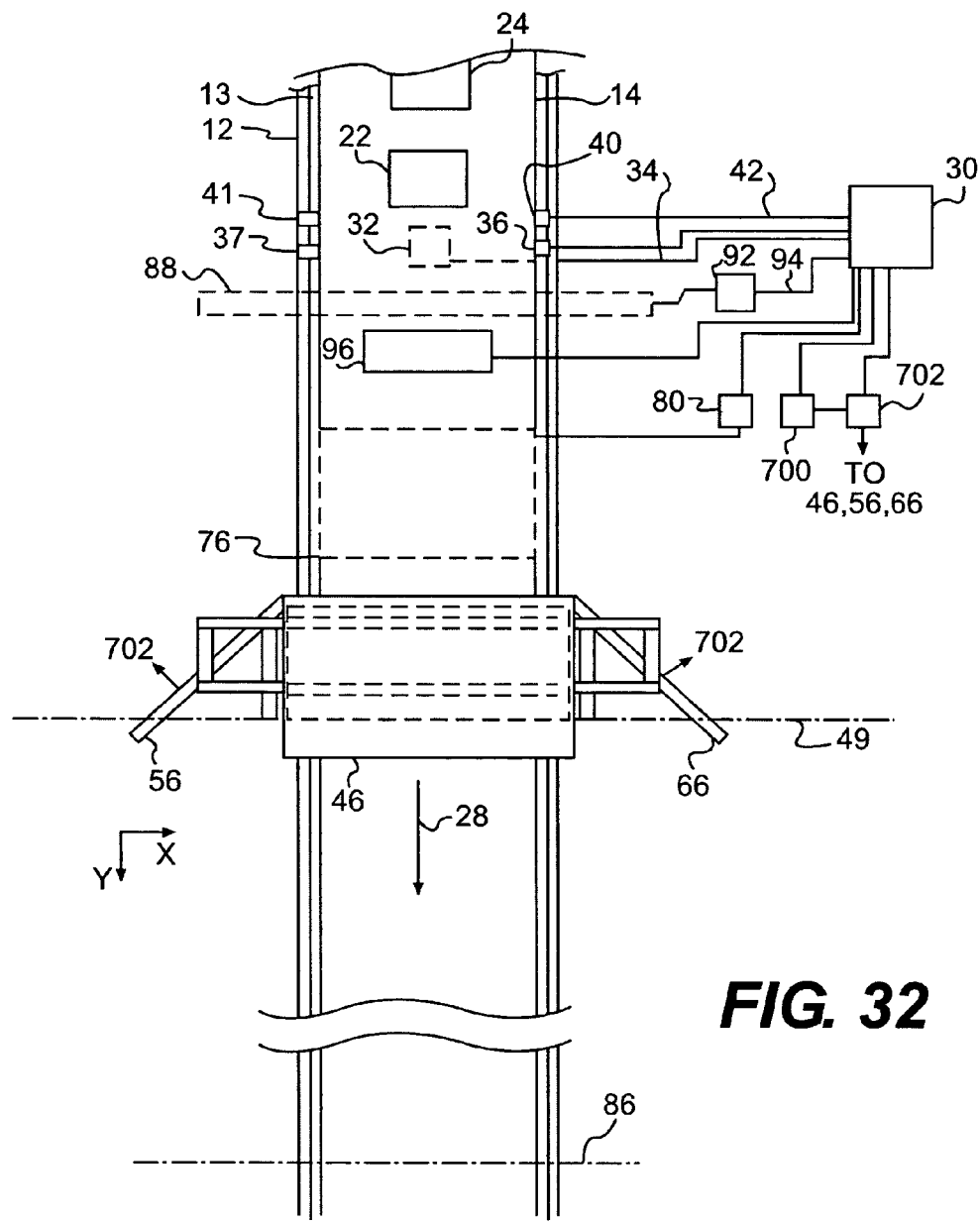
FIG. 32 is a schematic view of a conveyor system in accordance with an embodiment on the present invention.

Accordingly, in one preferred embodiment of the present invention, and referring to FIG. 32, bottom antenna 76 is disposed upstream, with respect to the belt's path of travel, from the other three tunnel antennas as shown in FIG. 1. Bottom antenna 76 is activated continuously, i.e. without interruption to allow for activation of the downstream antennas. Thus, the bottom antenna queries for tags simultaneously with each of the downstream antennas as they are activated in sequence. Accordingly, the bottom antenna should cycle through the two reads (where only class 1 and class 2 tags are read) during the time when a tag is optimally readable by the bottom antenna.

More specifically, the downstream edge of the printed circuit board on which the patch elements of antenna 76 are disposed is fourteen inches upstream from the upstream edges of absorber pads 48, 58 and 68 as shown in FIGS. 20A and 20C. In the presently described embodiments, the bottom antenna printed circuit board is 18 or 20 inches in length, and the patch elements in the bottom antenna are disposed approximately 43-45 inches upstream from their non-staggered position with the other three antennas as shown in FIGS. 1 and 20B. In one embodiment, the length of the PCB in the Y direction (FIGS. 20A-20C) is twenty inches where ramps are provided in the frame, and eighteen inches otherwise. It should be understood, however, that the length of the upstream shift of antenna 76 may vary as desired, provided undesired RF interference between simultaneously activated antennas in the system is avoided. More specifically, as described below, responses are received from RFID tags by the staggered antenna as the tag passes through an area proximate the antenna into which the antenna radiates its query signals. That is, there is an area proximate the antenna in the path of travel through which the RFID tag travels as it moves on the belt and in which it is desired that the tag receive and respond to RF signals from the antenna. This area may be considered a local detection zone for the staggered antenna and preferably is at least as large as the detection zone defined for the downstream antennas from which the staggered antenna is offset. In one embodiment, the area is tied directly to the size of the downstream detection zone by a predetermined offset applied to responses received by the staggered antenna.

Considering the areas proximate the respective antennas in which it is desired to identify RFID tags passing therethrough to be "detection zones" for the respective antennas, the separation of simultaneously activated antennas is preferably sufficient so that signals from one simultaneously activated antenna do not undesirably inhibit reception of and response to RF query signals of any other simultaneously activated antenna by an RFID tag in the detection zone of the other simultaneously activated antenna. Radiation from one simultaneously activated antenna may extend into the detection zone of another simultaneously activated antenna, and it is therefore possible that some degree of interference may occur in the respective detection zones. The extent to which such interference is acceptable may depend, for example, on the performance level required by the user of the conveyor system, and the separation distance may be chosen based on system testing. With the antennas spaced at various distances, the system may be tested until an acceptable read rate is achieved using simultaneously activated antennas and/or until the system receives an acceptably low number of simultaneous reads from the same tag by staggered, simultaneously activated antennas. The separation distance may further depend, for example, on the type and configuration of any RF shielding employed around the antennas tending to reduce interference, the power at which the antennas are driven, the antennas' radiation patterns, and the environment around the antennas. If the system is operated in an area in which RF reflective surfaces exist relatively closely about the antennas, for instance, it may be desirable to further separate the simultaneously activated antennas to reduce the likelihood that a first antenna will receive a signal from an RFID tag responding to a query from a simultaneously activated second antenna. Accordingly, the spacing between staggered antennas in a given configuration may depend on one or more of these several factors as applicable.

As in the embodiment described above with respect to FIGS. 1 and 2, RFID engine 80 is controlled by HSC 30 to drive bottom antenna 76. While respective engines 62, 72 and 52 (FIG. 1) may again be employed to drive antennas 56, 66 and 46 in the tunnel downstream from staggered bottom antenna 76, in the presently described embodiment a single engine 700 drives the three aligned tunnel antennas. In operation, both engines drive their antennas in the same manner as described above. HSC 30 initiates a transmission from antenna 76 by a command to the engine's microprocessor, which in turn sends a bit sequence to the engine's transmitter for driving the antenna at a specified frequency and power level. If a response signal is detected and returned by the antenna, the engine's receiver removes the carrier signal and sends the resulting information to the FPGA for extraction of digital data to the microprocessor and on to HSC 30.

Antenna engine 700 is similar in construction and operation to the engines described above with respect to FIGS. 1 and 2. The antenna engine has a single port from which an output feed line drives the three tunnel antennas through a radio frequency switch 702. To drive a particular one of the three antennas, HSC 30 simultaneously outputs a first signal to antenna engine 700 defining the power and frequency of the RF signal to be sent by the selected antenna and a second signal to antenna switch 702 to thereby select the particular antenna to which the switch will direct the engine's driving signal.

In the alternative, antenna engine 700 may include multiple ports by which the engine respectively drives antennas 46, 56, and 66. While the engine preferably drives the ports and antennas with a single transmitter/receiver pair, it should be understood that the engine may include a transmitter/receiver pair for each antenna. In addition to antenna power and frequency, HSC 30 provides to the engine's microprocessor the identification of the antenna to be so activated, and the microprocessor selects the appropriate port.

As described in the earlier embodiment with respect to FIGS. 1 and 2, depending on a package's height, antenna sequence generator 202 includes all four RF tunnel antennas in the antenna sequence. By default, one preferred sequence requires activation of each antenna to query and receive responses for one tag class and then the other in a round-robin sequence. Referring to FIGS. 1 and 2, for example, antenna sequence thread 204 in the default sequence instructs antenna engine 52 to power antenna 46 on, set its power level and frequency to transmit to and receive signals from class 0 RFID tags, transmit an RF query signal, and read any corresponding returned signals. Antenna sequence thread 204 then instructs antenna engine 52 to change the power level and frequency of antenna 46 to query and receive responses from class 1 tags. As determined by the antenna sequence, antenna sequence thread 204 then instructs the next antenna engine to attempt to read class 0 and class 1 through its antenna in the same manner.

Figure 33:
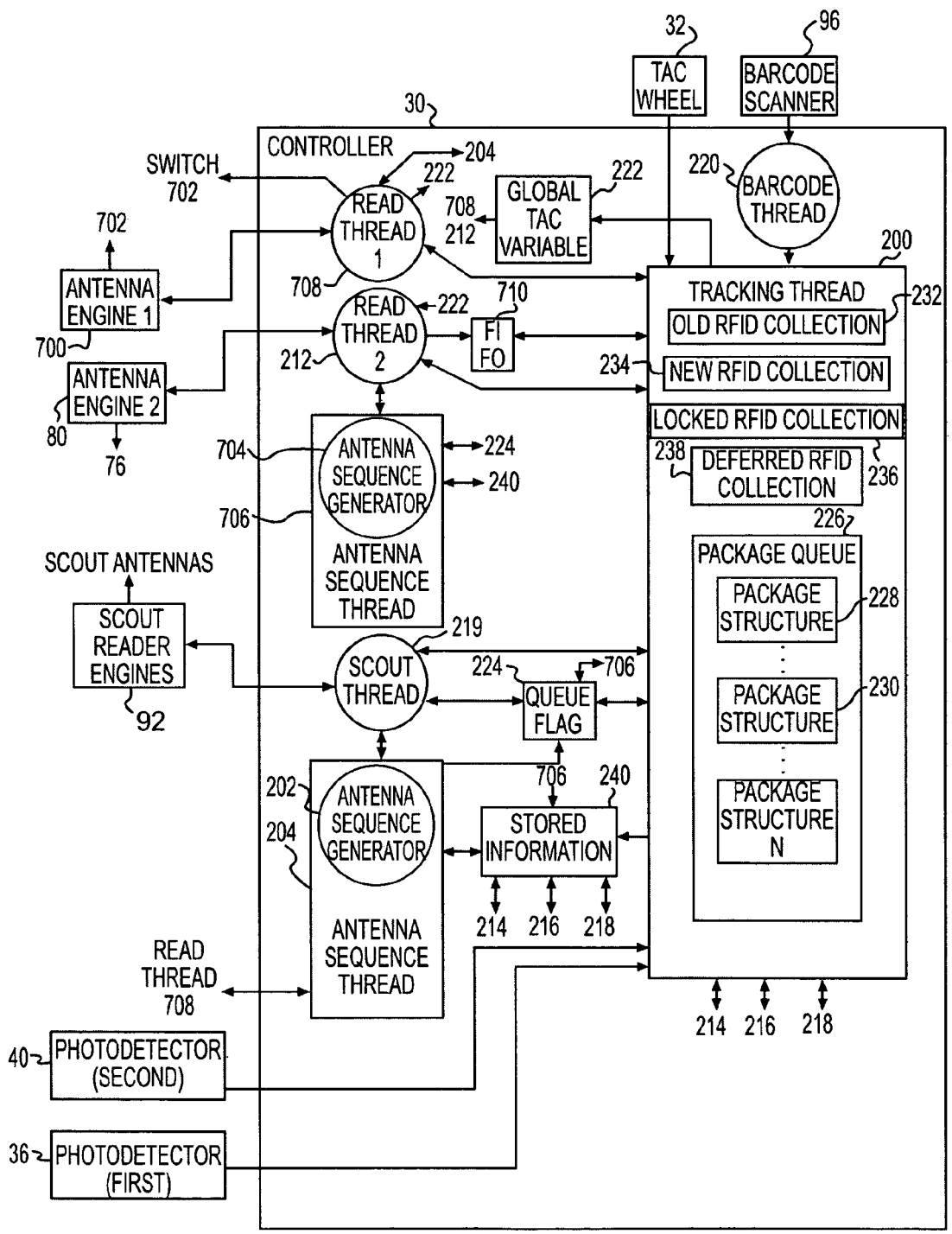
FIG. 33 is a functional block diagram of a tracking system for use with the conveyor system as in FIG. 32.

In the presently described embodiment, however, bottom antenna 76 remains on continuously, whereas the antennas (46, 56, and 66) that remain in their original positions in the RF antenna tunnel continue to alternate in the round-robin sequence described above. Referring also to FIG. 33, antenna sequence thread 204 instructs engine 700 to drive antennas 46, 56, and 66 and instructs antenna switch 702 to select each of the three antennas in turn and in conjunction with the instructions to engine 700. Because bottom antenna 76 is disposed upstream from the RF antenna tunnel a sufficient distance so that RF tags on conveyor belt 14 should not receive and respond to transmissions from the downstream antenna tunnel and bottom antenna 76 at the same time, the bottom antenna continuously transmits and receives RF signals without effective interference with or by the other antennas.

A second sequence generator 704 defines a sequence that includes an id and corresponding instructions only for bottom antenna 76. A second antenna sequence thread 706 constantly checks queue flag 224. If queue flag 224 indicates that a package structure is in package queue 226, second antenna sequence thread 706 initializes antenna engine 80 and requests a sequence from second antenna sequence generator 704. Because the sequence from second sequence generator 704 includes only antenna 76, second sequence thread 706 continuously activates the bottom antenna as long as a package structure is in the queue. Second sequence generator 704 defines the power level at which to drive the antenna during its activation, the class of RFID tags to attempt to read during the antenna activation (for example, read class 0, read class 1 or read class 0 and class 1), and the length of time the antenna is polled (i.e. the length of time for a query and response cycle). The poll time may be selected as part of the system configuration. In one embodiment, the default poll time is thirteen milliseconds.

Any RFID information received by antenna 76 during read periods is transmitted via antenna engine 80 to a read thread 212 at HSC 30. At HSC 30, tracking thread 200 assigns a variable to the RFID information equal to the global TAC variable 222 plus the number of TAC pulses that correspond to the distance by which antenna 76 is displaced upstream from the position it would otherwise have occupied in the RF tunnel. The tracking thread then stores the variable and the associated RFID information in a FIFO structure 710. FIFO 710, which is a data structure known as a first-in-first-out stack that should be well understood in the art, is maintained by tracking thread 200 but is illustrated separately in the figures for purposes of explanation. The tracking thread thereafter compares the value of global TAC variable 222 with each variable stored in FIFO structure 710 at every incoming TAC pulse. The FIFO variable located at the top of the stack (i.e. the variable stored in the stack the longest amount of time) has the lowest value and will be the first to equal global TAC variable 222. When a FIFO variable equals global TAC variable 222, tracking thread 200 removes the variable and the associated RFID information from FIFO structure 710 and processes the RFID information in the same manner as if it had received the RFID information at that time from any of the downstream tunnel antennas via read thread 708. The FIFO variable associated with the RFID information is treated as the TAC value for that RFID information when the algorithm considers RFID information read while a package is in the detection zone. The tracking thread may consider each RFID information as it is received, or the tracking thread may accumulate all RFID information as it is received while a package is within the detection zone (i.e. while the package's start-of-read window variable has decremented to zero but its stop-read window variable has not), order the RFID information according to its associated TAC values when the package's stop-read window decrements to zero, and then consider each RFID information in turn, by associated TAC value, according to the algorithm described above with respect to FIGS. 1 and 2. Because the variable assigned to the RFID information stored in FIFO 710 corresponds to the value the global TAC variable would have if bottom antenna 76 had received the RFID information when the package carrying the transmitting RFID tag were in the same position with respect to bottom antenna 76 were bottom antenna 76 in the position it would have occupied if it were aligned with the downstream tunnel antennas, the RFID information from FIFO 710 is considered in turn as if the tag from which the RFID information was received had been read by an antenna aligned with the downstream tunnel antennas.

The delay in providing the received tag information to tracking thread 200 corresponds to the travel of the RFID tag (and, therefore, the package on which it is disposed) from (a) the position at which the tag actually transmitted the received signal to (b) the position from which the tag would have transmitted the signal were the bottom antenna aligned in the tunnel as described with respect to FIG. 1. Accordingly, tracking thread 200 processes RFID tag information from the bottom antenna relative to other RFID information transmitted by antenna read thread 708 as if bottom read antenna 76 was not offset from the RF antenna tunnel. Thus, upon receiving any RFID tag information, whether from the top, side or bottom antennas, tracking thread 200 processes and stores the information according to the same algorithm as if the four antennas were aligned.

Because the tag information received from the offset antenna is considered by the algorithm with respect to the same start/stop-read window differential, the TAC variable assigned to the RFID information in FIFO 710, and the resulting delay, define the length of the local detection zone for the staggered antenna to be the same as the length of the common detection zone for the downstream antenna(s). The delay therefore causes the tag responses to be treated as if the detection zones for all the tunnel antennas coincided.

It should be understood that other suitable methods of associating RFID information received from the staggered bottom antenna with the appropriate package may be employed. For example, rather than assigning the sum of the global TAC variable and a TAC value equal to the distance between the staggered bottom antenna and the position the bottom antenna would have occupied in alignment with the downstream antennas, tracking thread 200 may assign a variable to the RFID information equal to the number of TAC pulses that correspond to the distance by which antenna 76 is displaced upstream from the other tunnel antennas. Tracking thread 200 then stores the variable and the associated RFID information in a FIFO structure 710. The tracking thread decrements each variable stored in FIFO structure 710 by one TAC value at every incoming TAC pulse. Accordingly, the FIFO variable located at the top of the stack, which will also be the variable stored in the stack the longest amount of time, has the lowest value. When the variable at the top of the stack is equal to zero, tracking thread 200 removes the variable and the associated RFID information from FIFO structure 710 and processes the RFID information in the same manner as if it had received the RFID information at that time from the tunnel antennas via read thread 708.

Still further, the system may be configured to define a local detection zone, and associated start and stop read window variables, with the staggered bottom antenna and to associate RFID information received from the bottom antenna with package structures for packages passing through the bottom antenna's local detection zone in the same manner as discussed above with respect to the common detection zone for the antenna tunnel as in FIG. 1. However, when RFID information is assigned to a package structure based on reception of the RFID information from the staggered bottom antenna, an offset variable may be assigned to the stored RFID information equal to the offset (in TAC pulses) between the staggered bottom antenna and the position the bottom antenna would have maintained in alignment with the downstream antennas so that the antennas maintain a common detection zone. The tracking thread decrements this variable with each incoming TAC pulse and, when the variable decrements to zero, re-processes the RFID information in the same manner as if it had received the RFID information at that time from the tunnel antennas via read thread 708.

In the embodiment described with respect to FIGS. 1 and 2 above, antenna engine read threads 206, 208, and 210 receive and process RFID tag information from antenna engines 62, 72, and 52 before sending the information to tracking thread 200. In the presently-described embodiment, the functions of antenna engines 62, 72, and 52 are consolidated into antenna engine 700, and the functions of antenna read threads 206, 208, and 210 have, likewise, been consolidated to a single antenna read thread 708. Any RFID tag information received by antennas 46, 56, and 66 is transmitted to antenna read thread 708 by antenna engine 700. Antenna read thread 708 transmits the information to tracking thread 200, which processes this information in a manner identical to the algorithm described above with respect to FIG. 2.

Figure 34:
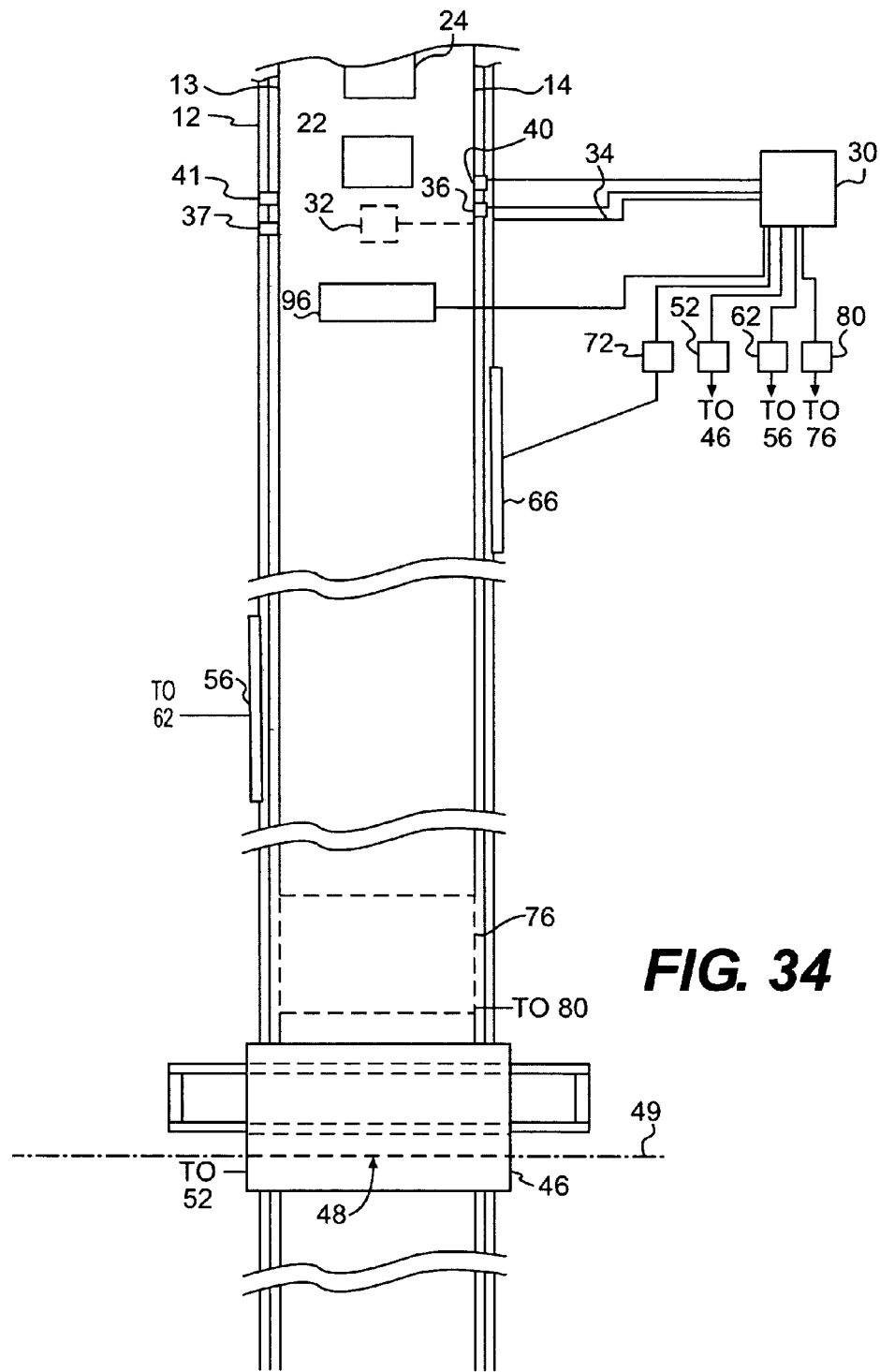
FIG. 34 is a schematic view of a conveyor system in accordance with an embodiment of the present invention.
Figure 35:
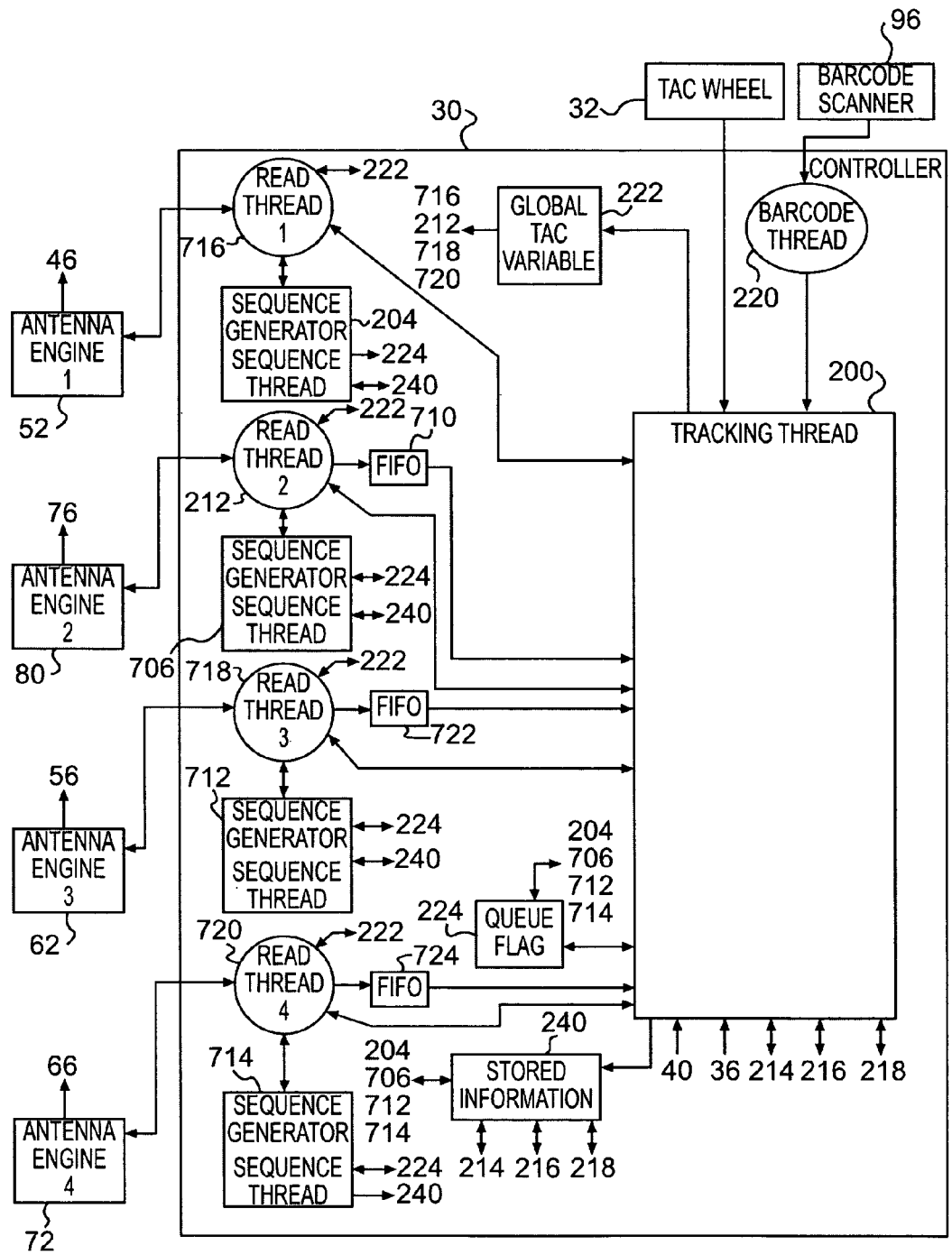
FIG. 35 is a functional block diagram of a tracking system for use with the conveyor system as in FIG. 34.

In a still further preferred embodiment, and referring also to FIGS. 34 and 35, two of the three antennas remaining in alignment with the downstream RF antennas in the embodiment of FIG. 32 are offset upstream from their tunnel positions in FIG. 32 and set apart from one another a distance sufficient so that RFID tags on conveyor belt 14 should not receive and respond to transmissions from any two antennas at the same time. As described above, the distance by which each antenna is moved upstream from the RFID antenna tunnel and separated from the other antennas depends on several factors and may vary so long as the spacing acceptably avoids undesired RF interference between antennas. The particular spacing in a given configuration may be determined by spacing the antennas at various separations, running packages through the staggered antenna group, recording the results and determining whether responses from a single RFID tag are received by multiple antennas and, if so, whether the number and/or rate of such multiple reads are acceptable in the environment in which the system operates.

In the embodiment as shown in FIG. 34, the bottom antenna is again disposed 43-45 inches upstream from its position shown in FIG. 1. The downstream edge of side antenna 56 is disposed fourteen inches (or other suitable distance as determined by system testing) upstream from the upstream edge of bottom antenna 76, and the downstream edge of side antenna 66 is disposed fourteen inches (or other suitable distance as determined by system testing) upstream from the upstream edge of side antenna 56. As indicated in FIG. 34, side antennas 56 and 66 are not disposed at a 45 degree angle with respect to the belt but are, instead, disposed facing the belt in a plane parallel to the belt's direction of travel. As noted above, the 45° angled orientation of the antennas to the belt centerline may improve the likelihood of tag reads, particularly where the belt carries packages generally defining six planar sides aligned parallel or perpendicular to the path of travel, but a flush alignment such as shown in FIG. 34 is also suitable, for example including where the belt carries items of irregular shape and/or orientation on the belt, such as airline luggage.

RF absorber pads may be omitted. In one preferred embodiment, however, respective absorber pads are disposed adjacent to and immediately upstream and downstream from each side antenna. Top antenna 46 remains disposed at an angle with respect to the belt, as described above with respect to FIG. 1. Where absorber pads are provided, L-shaped metal plates may be provided that extend vertically upward from the conveyor. Ferrite RF absorber pads are disposed on respective plates (and may be disposed on the front and back of each plate) and extend slightly upstream or downstream of the edge of metal plate, depending whether the pad is upstream or downstream, respectively, of the antenna.

The separation among the antennas allows the system to drive the antennas simultaneously and continuously, and, preferably, respective RF engines 72, 52, 62 and 80 drive antennas 66, 46, 56 and 66. Referring also to FIG. 35, engines 52, 80, 62 and 72 are controlled by respective sequence threads 204, 706, 712 and 714 and output received RFID information to respective read threads 716, 212, 718 and 720.

Each of the sequence generators defines a sequence that includes an id and corresponding instructions only for its respective antenna. The corresponding sequence thread constantly checks queue flag 224. If queue flag 224 indicates that a package structure is in package queue 226 (see FIG. 2), the antenna sequence thread initializes its corresponding antenna engine and requests a sequence from the antenna sequence generator. Because the sequence includes only the single corresponding antenna, the sequence thread continuously activates the antenna as long as a package structure is in the queue. The sequence generator defines the power level at which to drive the antenna during its activation, the class of RFID tags to attempt to read during the antenna activation (for example, read class 0, read class 1 or read class 0 and class 1), and the length of time the antenna is polled for each read.

Each of the three staggered antennas functions in the same manner as described above regarding bottom antenna 76 in FIGS. 32 and 33. When HSC 30 receives any RFID information from any of the staggered antennas, tracking thread HSC 30 stores the information in a FIFO structure 710, 722 or 724 in association with a variable equal to the global TAC variable 222 at the time the RFID information is received, plus the number of TAC pulses that correspond to the distance by which the receiving antenna has been displaced from the position it would otherwise have occupied in the RF tunnel as shown in FIG. 1 (i.e. from a position in which the detection zones for the tunnel antennas coincide). When the global TAC variable thereafter equals a stored TAC variable, tracking thread 200 processes the RFID tag information associated with the stored TAC variable according to the procedure as described above with respect to staggered bottom antenna 76 and FIGS. 32 and 33. Accordingly, the delay in considering the RFID tag information compensates for the offsets of the antennas from their positions in which the antennas share a common detection zone, and information is considered by the tracking thread as if all four antennas were disposed at their tunnel positions as in FIG. 1, with respect to line 49 (see FIG. 1).

Figure 36:
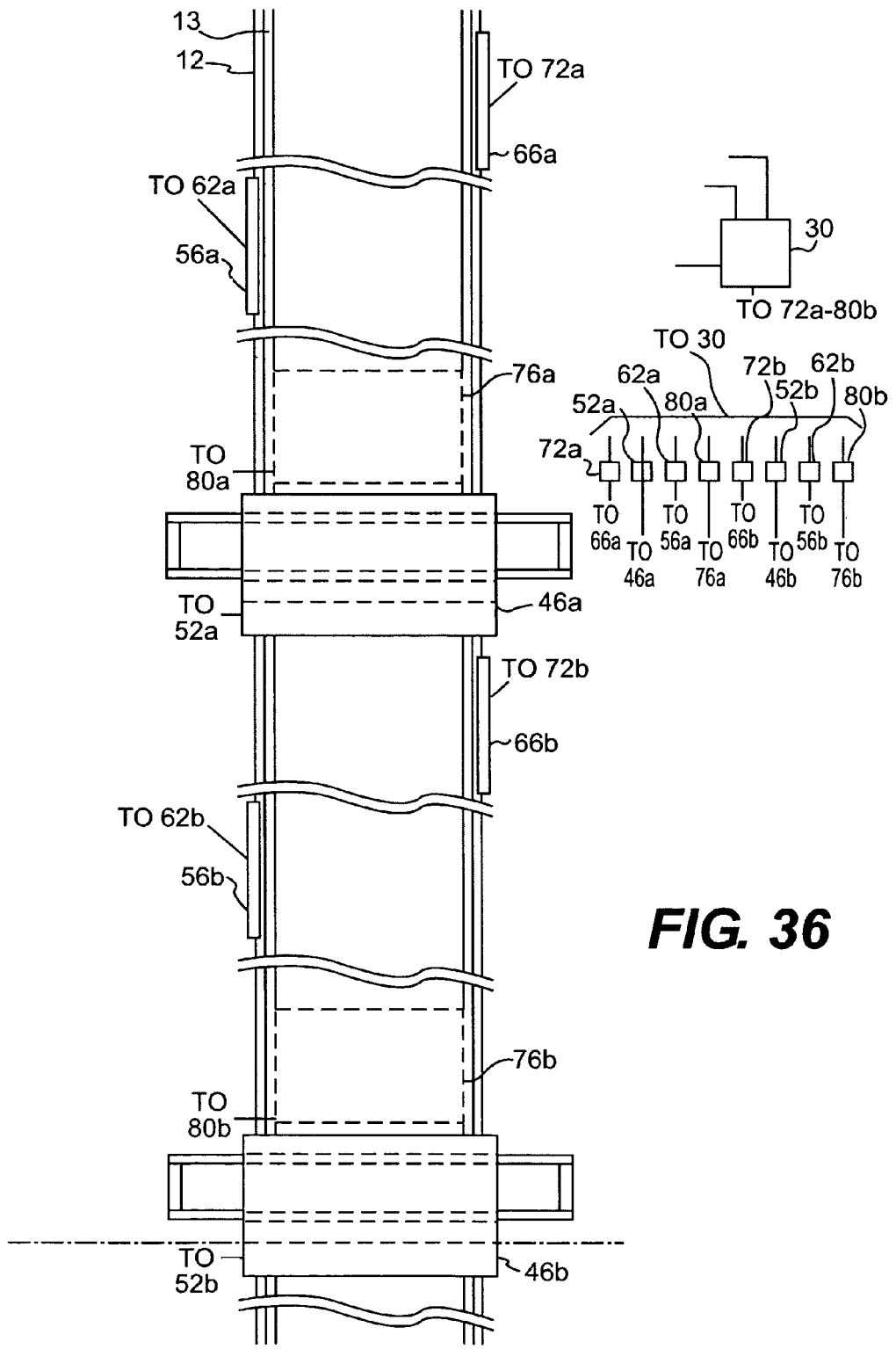
FIG. 36 is a schematic view of a conveyor system in accordance with an embodiment of the present invention.
Figure 37:
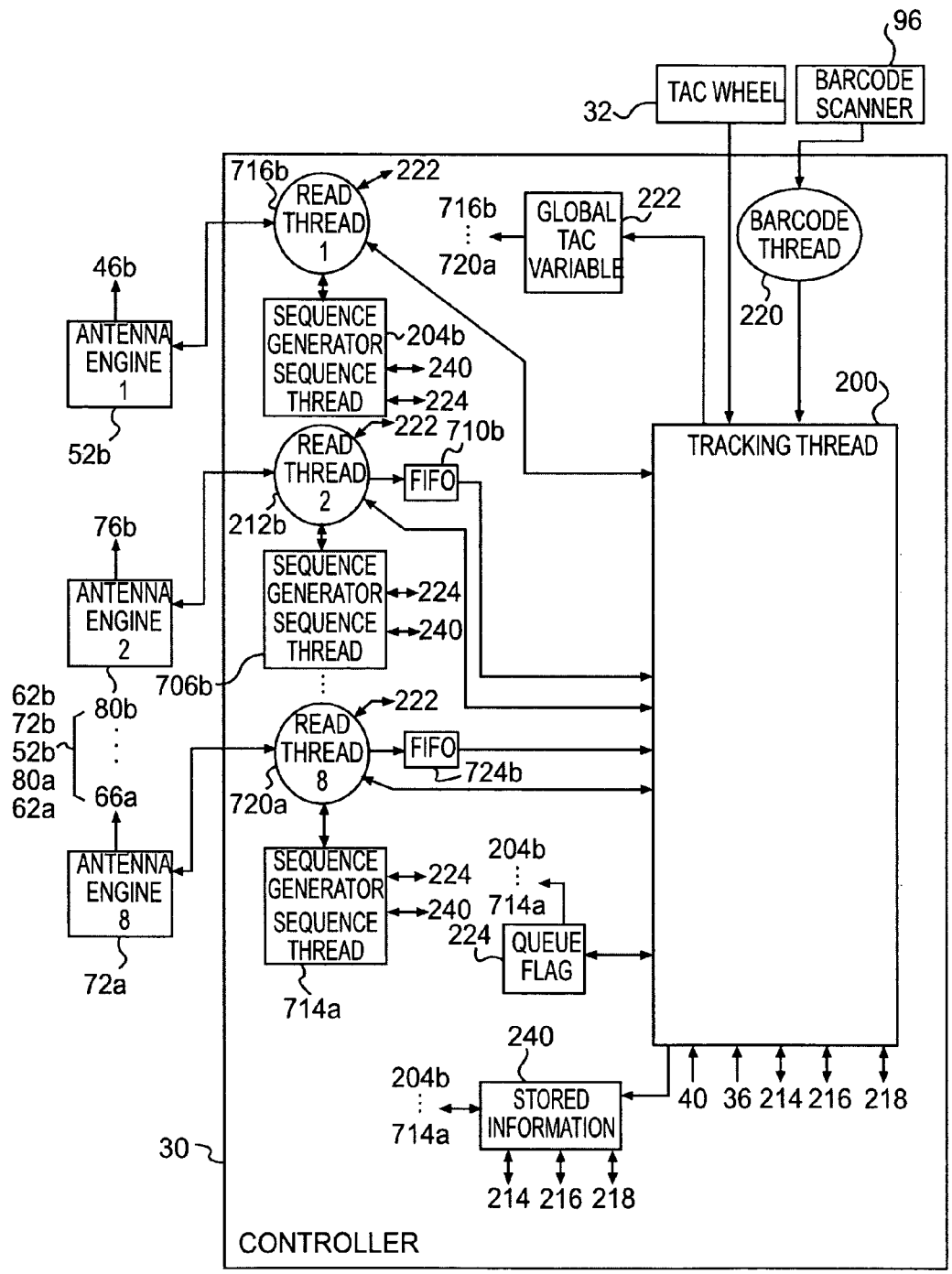
FIG. 37 is a functional block diagram of a tracking system for use with the conveyor system as in FIG. 1.

As discussed above, a given package typically carries RFID tags of one class. Although staggering antennas as set forth in the above-described embodiment allows each staggered antenna to constantly attempt to read RFID tags located on a package, the antenna generally spends half its operating time querying for a class of tags that will not be found on the package. In an alternative embodiment, and referring to FIGS. 36 and 37, a companion antenna identical in structure and operation to each staggered antenna is added to the conveyor system so that each of the two antennas in each antenna pair continuously queries for a respective one of the two tag classes, while its duplicate antenna continuously queries for the other. The antenna pair therefore performs approximately twice as many queries as a single antenna, thereby increasing efficiency and accuracy.

The companion antennas are disposed together as a group as a replication of the initial antenna group and are disposed upstream from the initial group. The dimensions and orientation of the companion antennas is the same for the initial antennas, and components of the two antenna groups are designated in FIG. 36 with "a" and "b" reference number suffixes. Each antenna is, again, offset sufficient distances from the other antennas so the antennas do not interfere with each other. Respective engines 72a, 52a, 62a, 80a, 72b, 52b, 62b and 80b drive antennas 66a, 46a, 56a, 76a, 66b, 46b, 56b and 76b and are controlled in turn by HSC 30. Engines 52a, 80a, 62a, 72a, 52b, 80b, 62b and 72b are controlled by respective sequence threads 204a, 706a, 718a, 720a, 204b, 706b, 718b and 720b and output received RFID information to respective read threads 716a, 212a, 718a, 720a, 716b, 212b, 718b and 720b.

Each of the sequence generators defines a sequence that includes an id and corresponding instructions only for its respective antenna. The corresponding sequence thread constantly checks queue flag 224. If queue flag 224 indicates that a package structure is in package queue 226, the antenna sequence thread initializes its corresponding antenna engine and requests a sequence from the antenna sequence generator. Because the sequence includes only the single corresponding antenna, the sequence thread continuously activates the antenna as long as a package structure is in the queue. The sequence generator defines the power level at which to drive the antenna during its activation, the class of RFID tags to attempt to read during the antenna activation (for example, read class 0 for the "a" antennas, and read class 1 for the "b" antennas), and the length of time the antenna polls for a tag.

Each antenna offset upstream from its tunnel position functions in the same manner as described above regarding bottom read antenna 76 in FIGS. 32 and 33. When HSC 30 receives any RFID information from any of the staggered antennas, tracking thread 200 stores the information in a FIFO structure (710a, 722a, 724a, 710b, 722b, 724b and a FIFO structure for staggered top antenna 46a in communication with and between a read thread 716a (not shown) and tracking thread 200) in association with a variable equal to the global TAC variable 222 at the time the RFID information is received, plus the number of TAC pulses that correspond to the distance by which the receiving antenna has been displaced from the position it would otherwise have occupied in the RF tunnel as shown in FIG. 1. When the global TAC variable thereafter equals a stored TAC variable, tracking thread 200 processes the RFID tag information associated with the stored TAC variable according to the procedure as described above with respect to staggered bottom antenna 76 and FIGS. 32 and 33. Accordingly, the delay in considering the RFID tag information compensates for the offsets of the antennas from their aligned positions in which the antennas share a common detection zone, and information is considered by the tracking thread as if all eight antennas were disposed at their respective tunnel positions in FIG. 1, with respect to line 49 (see FIG. 1).

The number of staggered antennas along the conveyor system is generally equal to a multiple of the number of antennas the conveyor system would employ within a single RF antenna tunnel described with respect to FIG. 1. For example, where each antenna transmits and receives signals for only one class of RFID tags, the number of antennas is preferably equal to the number of tag types the system is expected to handle (e.g. two when the system handles class 0 and class 1, or three where the system additionally processes Gen2 tags) multiplied by the number of antennas employed by one RF antenna tunnel. This allows each antenna to continuously query for tags of a specific type.

Figure 24:
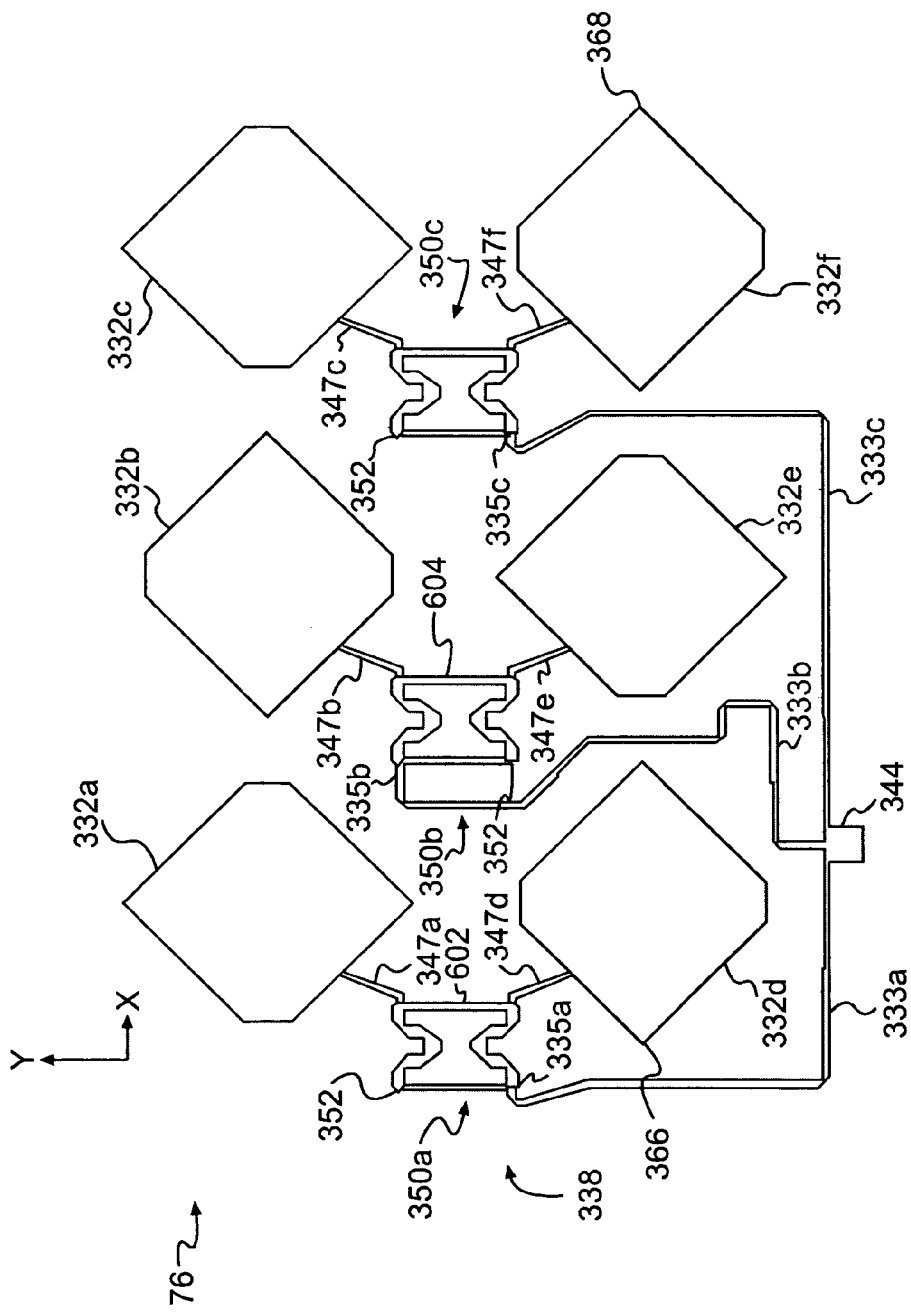
FIG. 24 is a schematic illustration of an RF antenna in accordance with an embodiment of the present invention.

A double row patch array may be configured so that it can be received and secured in the same frame, for example as shown in FIG. 7, as the single row patch array. Referring to FIG. 24, for example, patch array antenna 76 includes two rows of three patch elements 332 on the side of a substrate 330 (see, e.g. FIG. 7) opposite the antenna's ground plane. Each patch is made of approximately 0.0014 inch thick copper or other high-conductivity metal to form a corner-truncated square patch (patch size of 5.25 inches per side before truncation and 4.4 inches per side after truncation) and is disposed in the substrate so that the top of the patch is flush with the top surface of the substrate. A corporate feed network 338 drives patches 332, and the area required for the feed network is therefore reduced from the area that would be required if both rows of patch elements were fed by a dual point feed network as shown in FIG. 10. Accordingly, depending on the dimensions of the substrate of the single row array of FIG. 10 and the frame in which it is secured, the two rows and feed network of FIG. 24 may be mounted to a substrate to fit in a frame of the same construction and dimensions as the frame for the single row substrate.

A coaxial connector at 344 connects the antenna's printed circuit board to an RF cable from engine 80 (FIG. 1). Feed network 338 is a corporate network that combines the power received from each patch element and delivers the combined signal to a center conductor along separate paths from respective patch elements 332a-332f. Each path includes a respective single feed line 347a-347f attached mid-way along one side of the patch element. Each feed line 347a, 347b, 347c, 347d, 347e and 347f is attached at its opposite end to a corner of a 3 dB quadrature hybrid coupler 350a, 350b, 350c having sides of a length (approximately 2.8 inches in the presently described embodiment) approximately one-quarter wavelength of the signal carried by the feed network. As should be understood in this art, the antenna wavelength can be affected by, for example, the antenna's substrate and cover material permittivity, and the signal specifics, as well as antenna dimensions, are provided herein for purposes of explanation and not in limitation of the present invention. Two sides of each quad coupler are compressed to allow disposition of the couplers between the two patch element rows. A trace (not shown) extends from a first bottom corner 352 and is connected to ground through a resistor. The opposite corner on the left side of the quad coupler is connected to the feed trace.

The feed trace extending from quad coupler 350 has an impedance of 130 ohms, whereas entry point 344 exhibits an impedance of approximately 150 ohms to all three traces. Accordingly, a one-quarter wave element may be disposed within the feed trace to match the impedances. Also in this embodiment, patch array antenna 76 operates within a frequency range of 902 to 928 MHz, and the feed network and patch elements are preferably constructed so that there is less than −15 dB return loss within this frequency range or otherwise within the frequency range in which the antenna is desired and/or designed to operate.

The patch elements are aligned in sequence in each row extending transverse (the X direction) to the path of the conveyor belt so that center patches 332b and 332e are disposed in the center of the belt's path. The patches in each row are preferably aligned in tandem, so that the side patches are aligned with the center patches in the transverse direction, and the distance from patch corner 366 to patch corner 368 is approximately 25.4 inches in this embodiment, or approximately the width of the conveyor belt that, in a typical retail distribution center, can be expected to range in width between 24 and 28 inches. The center-to-center spacing between adjacent patches is approximately 9 inches.

In operation, and assuming the midpoint of the 902 MHz-928 MHz range in this embodiment (i.e. 915 MHz), the center conductor applies the drive signal to entry point 344 so that the drive signal is then applied by feed traces 333a-333c to corners 335a-335c of the respective quad couplers. Center feed trace 333b is one-quarter wavelength longer than feed trace 333a. Thus, the signal provided to center quad coupler 350b lags the signal at left coupler 350a by 90°. Right trace 333c is one-half wavelength longer than feed trace 333a, and the signal provided to right coupler 350c lags the signal at left coupler 350a by 180°.

Because the length of each leg of each quad coupler is one-quarter of the drive signal wavelength, each leg introduces a one-quarter phase shift in the signal. Thus, if the drive signal applied at the left quad coupler is at 0°, the signal applied to patch 332d (at its feed trace 347a) is at 270°, and the signal applied at patch element 332a (at its feed trace 347d) lags by an additional 90°, to 180°. As should be understood in this art, the differences in length in the feed traces, as well as the differences in length of paths in the quadrature couplers, may result in slight differences in power applied to the patches, but this affect may preferably be offset at least to some degree through adjustment of trace width in the couplers.

If the drive signal applied at the left coupler is at 0°, the one-quarter wavelength increase in length from trace 333a to trace 333b results in a signal at 270° applied at the top left corner of center coupler 350b. Thus, the signal applied to patch 332b (at feed trace 347b) is at 180°, and the signal applied at patch element 332e (at feed trace 347e) lags by an additional 90°, to 90°. As discussed in more detail below, electric current in center patches 332b and 332e rotates opposite to the direction of rotation of electric current in side patch elements 332a, 332c, 332d and 332f. If the length of trace 333b is equal to the length of trace 333a, the total power and gain pattern from the antenna would be the same as that of the presently described embodiment, but the polarization of both gain pattern lobes would be in the Y direction rather than the X and Y directions, respectively, as discussed below. Such a configuration is within the scope of the present invention, as are other patch and/or feed network configurations, as should be apparent upon review of the present disclosure.

If the drive signal applied at the left quad coupler is at 0°, the one-half wavelength increase in length from trace 333a to trace 333c results in a signal at 180° applied at the bottom left corner of right square connector 350c. Thus, the signal applied to patch 332f is at 90°, and the signal applied at patch element 332c lags by an additional 90°, to 0°.

As indicated in FIG. 24, opposing corners of each patch element 332 are truncated. As should be understood in this art, where such a clipped patch element is fed at a single point, the surface electric current pattern in the patch element rotates in the direction from the feed point away from the adjacent clipped corner. Thus, the electric current patterns on patches 332a, 332c, 332d and 332f rotate in the counterclockwise direction (in the perspective of FIG. 24), whereas the electric current patterns on patches 332b and 332e rotate in the clockwise direction. Referring again specifically to patch elements 332a and 332d, the patch elements are disposed in tandem with respect to each other so that their corner-to-corner axes in the Y direction are aligned. With this orientation as a reference and as shown in FIG. 24, feed line 347a attaches to a side of patch element 332a that is rotationally offset 90° in the counterclockwise direction with respect to the side of its corresponding tandem patch element 332d to which feed line 347d attaches. Because the electric current patterns on patches 332a and 332d rotate in the same (counterclockwise) direction, the 90° counterclockwise relative offset between the feed points introduces a 90° lead in the electric current pattern in patch 332a with respect to the electric current pattern on patch 332d. This compensates for the 90° lag in the signal applied to patch 332a with respect to the signal applied to the corresponding patch element 332d arising from leg 602 in quad coupler 350a. Accordingly, the electric current patterns in patches 332a and 332d are in phase with respect to each other as the patterns rotate.

Patch elements 332c and 332f, including the clipped corners and feed points for feed lines 347c and 347f, are disposed in the same orientation with respect to each other as are patch elements 332a and 332d. Like feed line 333a, feed line 333c attaches to the lower left corner of the quad coupler. Thus, the electric current patterns for these patches are also in phase with respect to each other as the patterns rotate. Further, the tandem alignment of patches 332c and 332f is parallel to the tandem alignment of patches 332a and 332d. However, because feed line 333c introduces a half-wavelength lag in the signal applied to the coupler for patches 332c and 332f with respect to the signal applied to the coupler for patches 332a and 332d, the electric current patterns of patch elements 332c and 332f are 180° out of phase with respect to the electric current patterns of patch elements 332a and 332d. The electric fields of the corresponding radiation patterns of patches 332a and 332d are 180° out of phase with respect to the electric fields of the corresponding radiation patterns of patches 332c and 332f, at points equidistant from patches 332a and 332d, on one hand, and patches 332c and 332f, on the other hand.

Center patch elements 332b and 332e are also disposed in tandem with respect to each other so that their corner-to-corner axes in the Y direction are aligned. The tandem alignment of patches 332b and 332e is parallel to the tandem alignment of patches 332a/332d and patches 332c/332f, and feed lines 347b and 347e attach to patches 332b and 332e at the same respective sides as feed lines 347a/347d and 347c/347f attach to patches 332a/332d and 332c/332f. Again, the feed line attaches to a side of the upper patch element (332b) that is rotationally offset 90° in the counterclockwise direction with respect to the side of the lower patch element (332e) to which the feed line attaches. However, because the electric current patterns on patches 332b and 332e rotate in the clockwise direction, the 90° counterclockwise relative offset between the feed points introduces a 90° lag in the electric current pattern in patch 332b with respect to the electric current pattern on patch 332e. This compensates for the 90° lead in the signal applied to patch 332b with respect to the signal applied to patch 332e arising from leg 604 in quad coupler 350b. Accordingly, the electric current patterns in patches 332b and 332e, and therefore the electric fields in the patches' radiation patterns at equidistant points, are in phase with respect to each other as the patterns rotate.

Figure 25A:
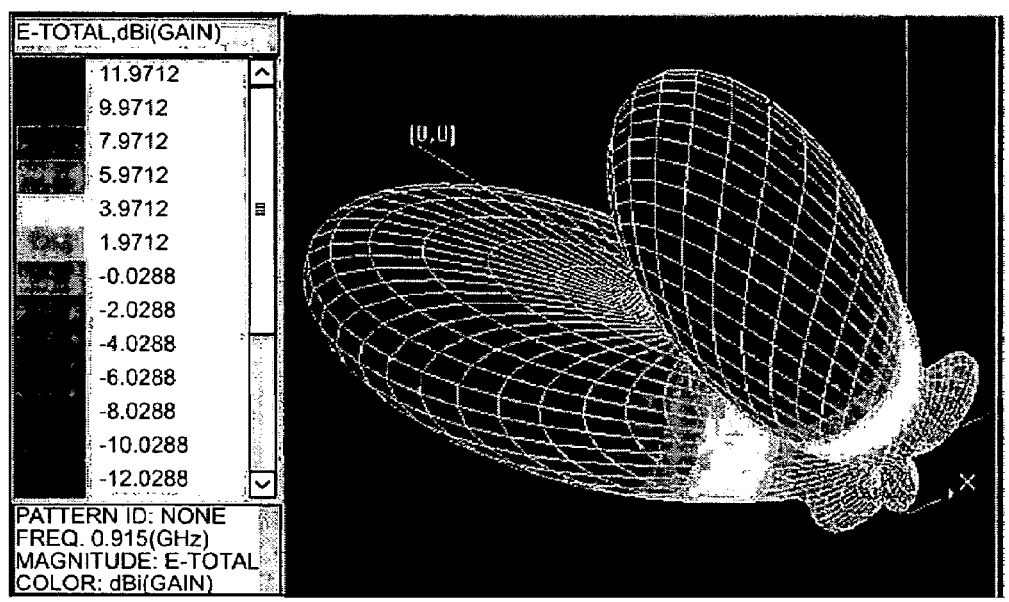
FIG. 25, which is presented as FIGS. 25A, 25B and 25C, is a schematic view of a radiation pattern from an RF antenna as in FIG. 24.
Figure 25B:
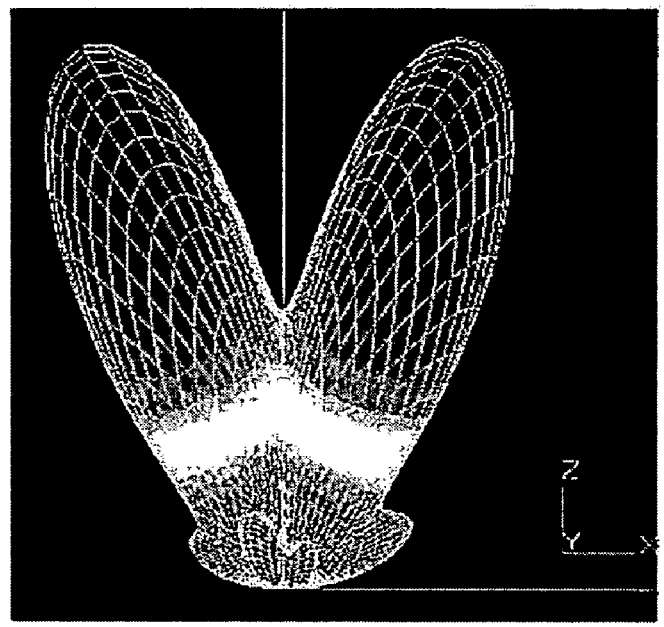
Figure 25C:
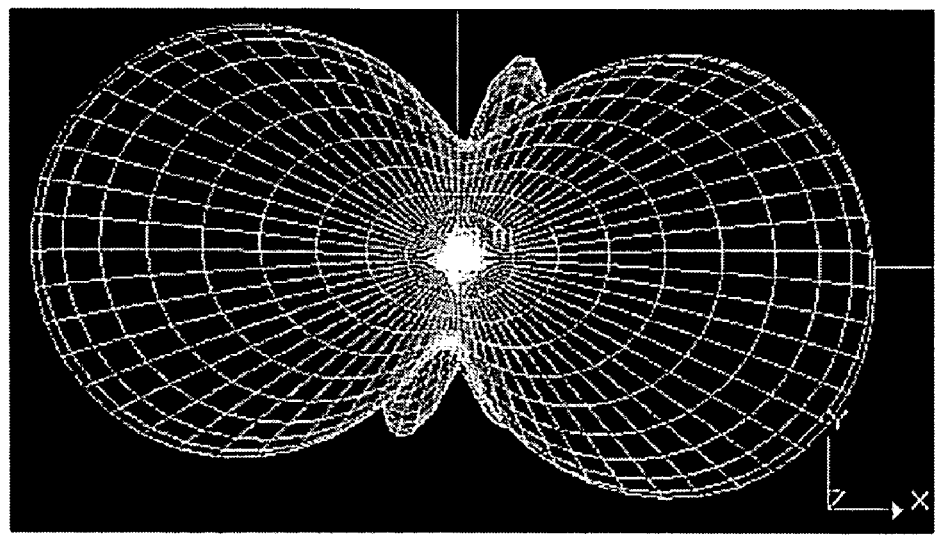

FIGS. 25A-25C illustrate the far field gain pattern resulting from the antenna configuration shown in FIG. 24 in perspective view, the X-Z plane and the X-Y plane, respectively. The dual-main lobe pattern is similar to the pattern shown in FIGS. 11A and 11B for the single row array, but the pattern is narrower in the conveyor belt's direction of travel, i.e. the Y direction. Accordingly, the dual row design increases the area of the antenna's near field pattern in the Y direction, thereby increasing the likelihood the antenna will desirably read RFID tags passing over the antenna on the underside of packages, while decreasing the antenna's far field pattern in the Y direction, thereby reducing the likelihood the antenna will undesirably read tags on other packages. Additional rows may further emphasize this affect and are encompassed by the present disclosure. Preferably, the width of patch rows in such antennas does not exceed the minimum Y direction detection zone width expected in the system.

Figure 26A:
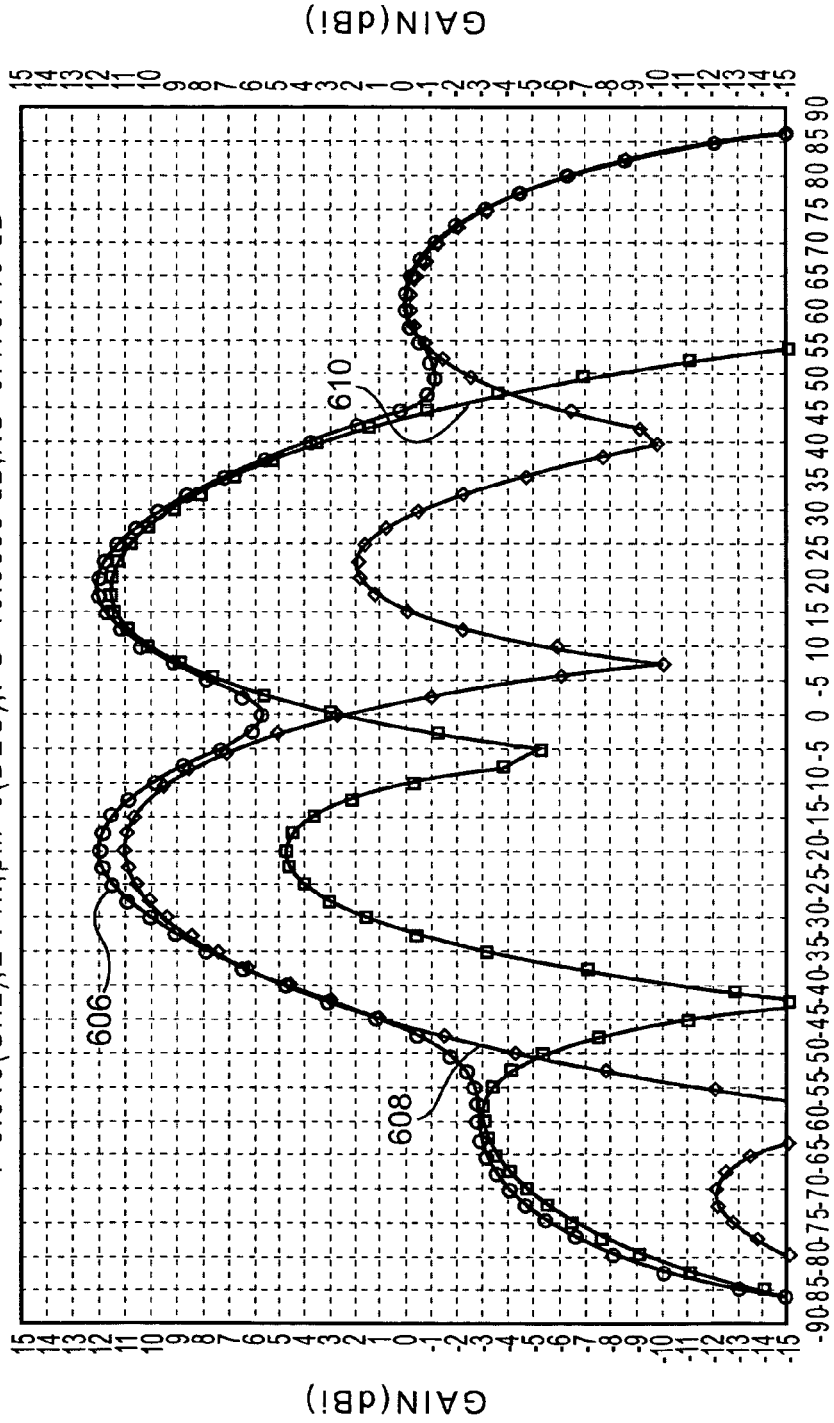
FIG. 26, which is presented as FIGS. 26A, 26B, 26C and 26D, is a schematic view of a radiation pattern of the RF antenna as in FIG. 24.
Figure 26B:
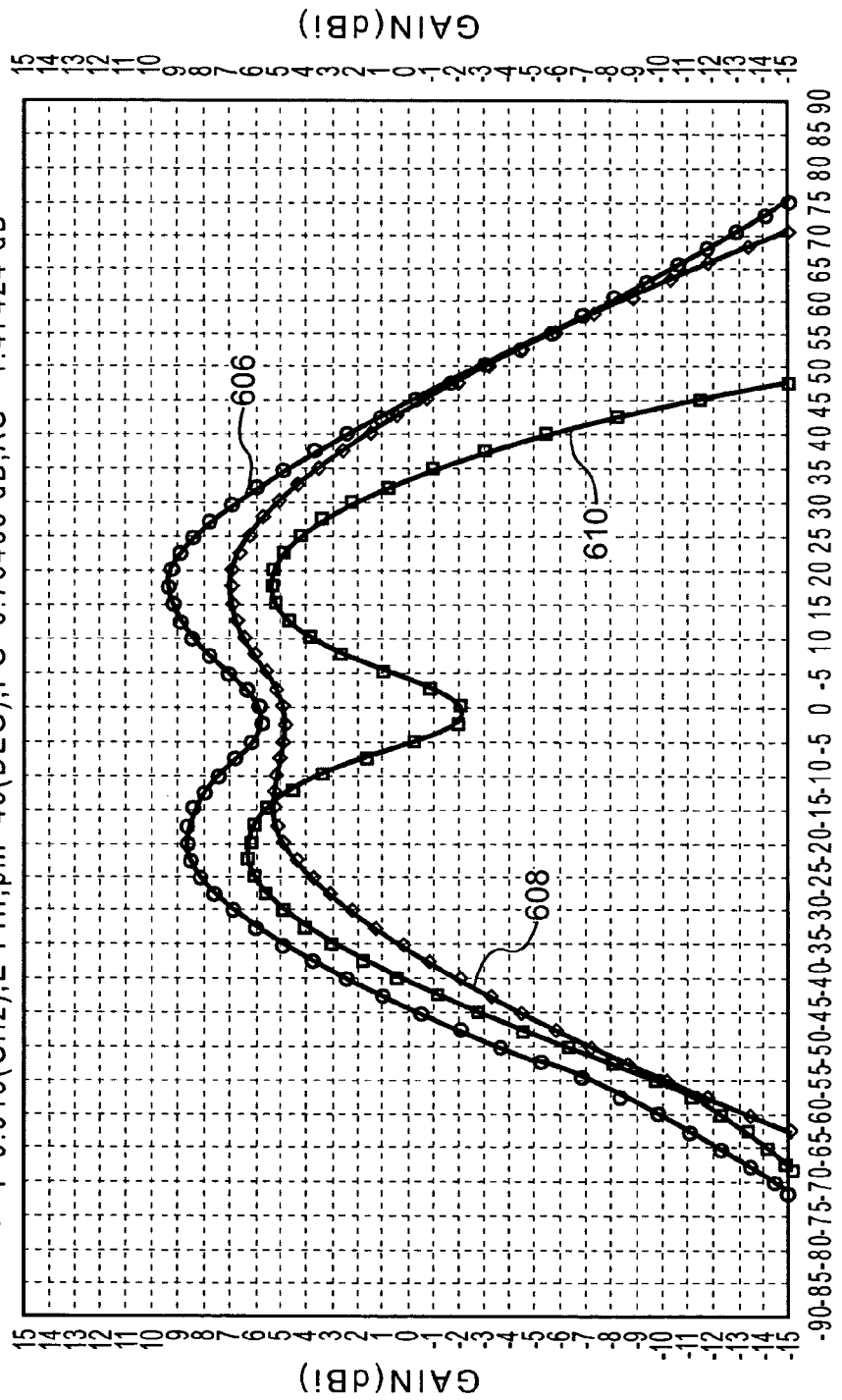
Figure 26C:
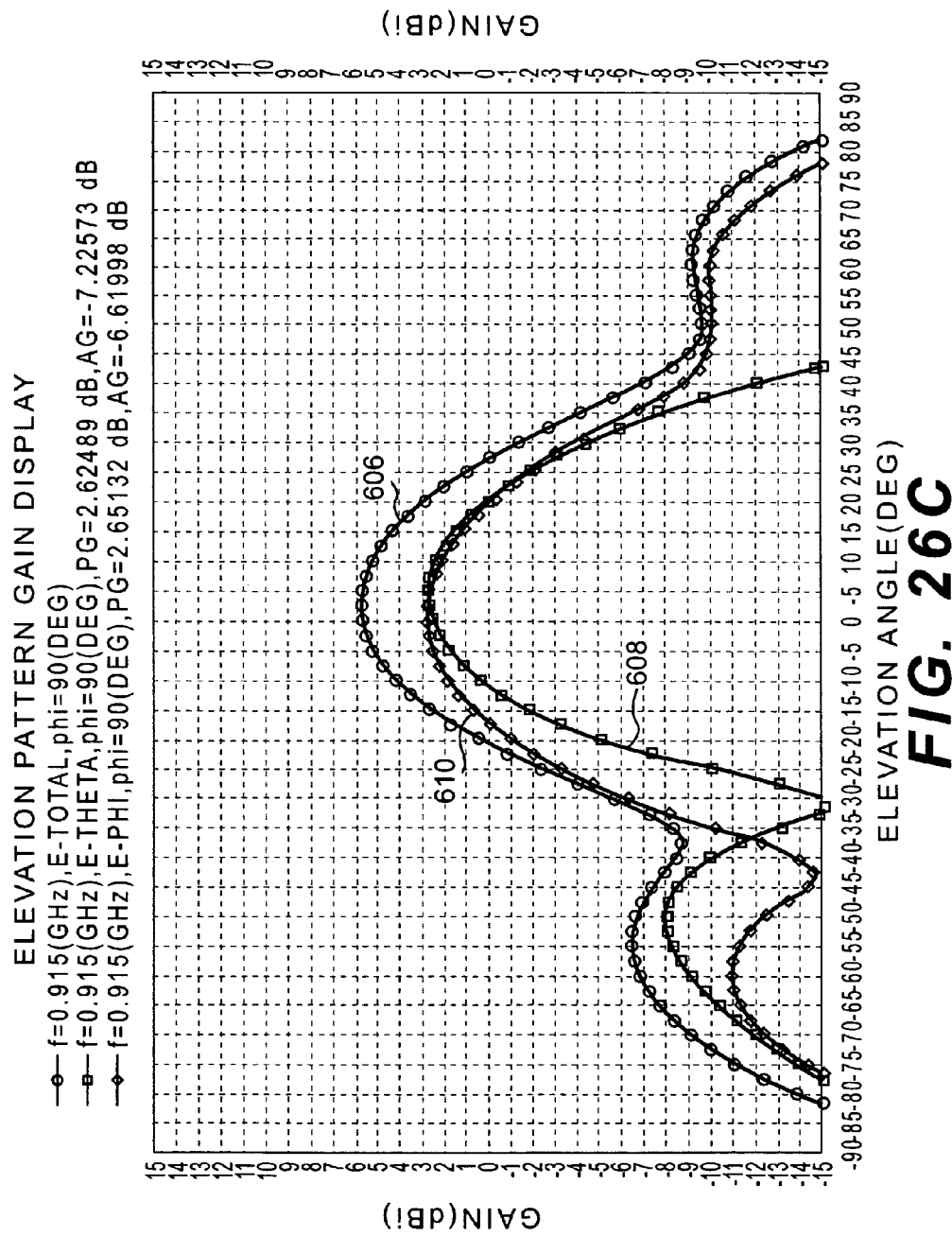
Figure 26D:
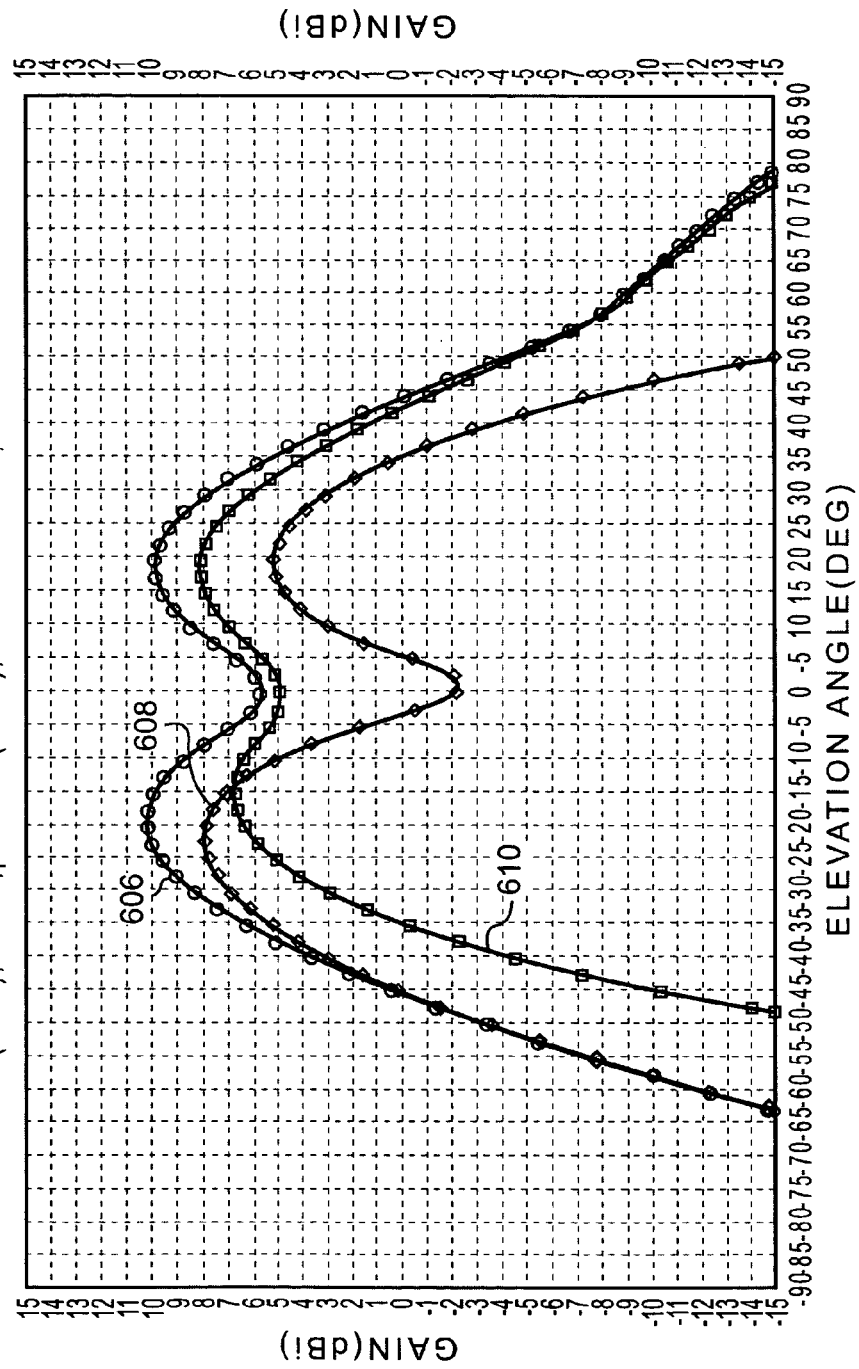

Referring to FIG. 26A, the total gain pattern 606 (taken in the X-Z plane) is comprised of a linearly polarized first pattern 608 and a linearly polarized second pattern 610 that is offset 90° in polarization with respect to first pattern 608. FIGS. 26B-26D illustrate the same gain patterns, taken in the (45°X, 45°Y)-Z plane, Y-Z plane and (135°X, 135°Y)-Z plane, respectively. The gain for the dual row pattern described herein is approximately 3 dB higher than the single new embodiment described with respect to FIG. 10. Accordingly, power to the dual row antenna is reduced to maintain the gain within FCC regulations, e.g. that the effective isotropic radiated power be not greater than 36 dBm. For example, in the dual row embodiment described herein, the gain is greater than 6 dB, and the patches are therefore preferably driven at a power level less than 1 watt.

In another preferred embodiment of the present invention, and referring to FIGS. 27A-27G, interference antennas are provided upstream (with respect to the belt's direction of travel 28) from the query/receive antennas in the RF tunnel to radiate radio frequency signals that interfere with reception of and response to radio frequency query signals from the query/receive antennas and thereby block responses from tags upstream from the detection zone. The reduced likelihood the query/receive antennas 46, 56, 66 and 76 (antenna 76 not shown; see FIG. 1) will receive responses from upstream tags reduces the need for RF absorbers proximate the antennas, and RF absorbers are therefore omitted in the illustrated embodiment. Otherwise, the construction and orientation of side antennas 56 and 66, top antenna 46 and bottom antenna 76 is the same as discussed above with respect to FIGS. 1, 20A-20D and 24.

As described above, each of side antennas 56 and 66 is attached to antenna frame 44 (FIG. 1) so that the generally planar antenna is oriented in a vertical plane at a 45° angle with respect to a vertical plane including the conveyor belt's centerline and so that the antenna, and therefore the center of its radiation pattern, faces the conveyor belt in the downstream direction at a 45° angle. In the embodiment shown in FIG. 1, this antenna orientation, in conjunction with the RF absorber pads, defines a reference line 71 (FIG. 20A) extending transversely across conveyor belt 14 at the upstream edges of query/receive antennas 46, 56 and 66 and upstream of which the power level of signals from the radiation patterns emitted by the query/receive antennas is generally too low to activate RFID tags such that the RFID tags respond to the antennas. In the embodiments illustrated in FIGS. 27A-27G, however, the transition between an area from which the query/receive antennas can receive RFID tag transmissions, and from which they do not generally receive RFID tag transmissions, is defined by the presence of interference antennas 402, 404 and 416 proximate the query/receive antennas.

More specifically, and referring initially to antenna 56, the antenna radiation pattern can be considered to extend from the antenna's front face within an effective range extending approximately 60° to either side of lines 403 normal to the antenna's front face at the edges of the patch array, as indicated schematically at 405. At 60°, the radiation pattern power level drops to approximately −3 dB and beyond 60° drops rapidly further. As should be understood in this art, however, the point at which the radiation pattern is sufficient to activate a tag such that the tag can effectively read and respond to the activating signal may depend on factors such as the power at which the antennas are driven, the orientation of tags being read and the construction of the tags themselves. Thus, the effective range indicated at 405 can vary, and it should be understood that the 60° spread is provided for purposes of explanation and not in limitation of the present invention.

The construction of interference antenna 402 is the same as that of antenna 56 and is therefore not discussed further. Interference antenna 402 is attached to the antenna frame so that the interference antenna is oriented in a vertical plane at a 60° angle with respect to a vertical plane 401 including the conveyor belt's centerline and so that the antenna, and therefore the center of its radiation pattern, faces the conveyor belt in the upstream directions at a 30° angle 399 with respect to centerline plane 401. Interference antenna 402 may be driven at the same power level as antenna 56, and the antenna's radiation pattern (gain pattern) can be considered to extend from the antenna's face within an effective range extending approximately 60° to either side of lines 407 normal to the antenna's front face at the edges of its patches, as indicated schematically at 409 and 411.

The power at which the interference antennas are driven is not necessarily the same as the power their adjacent query/receive antennas 46, 56 and 66 are driven, but this can be used as a starting point in a testing procedure to determine the appropriate power. More specifically, packages on which RFID tags are disposed (or, simply, the tags) are placed on the belt in various positions upstream from line 411. Power to the interference antennas is then scaled up and down until a level is reached at which the operating antennas do not read the RFID tags or do so at an acceptable rate. The packages (or tags) are then disposed at various positions downstream from line 49 so that the RFID tags are within an expected detection zone, and power is applied to the query/receive antennas according to an antenna sequence as described above while power is supplied to the interference antennas at the level determined in the first stage of the test. If the query/receive antennas read the tags without interference from the interference antennas, the interference antenna power level may be acceptable, and further tests can be performed based on packages carried by the belt when in motion. If, however, the interference antennas undesirably interfere with the ability of the query/receive antennas to read RFID tags, then the power supplied to the interference antennas is reduced until an acceptable read rate is achieved. The first and second steps are repeated until an interference power level is defined that both prevents reads upstream from the detection zone and allows reads within the detection zone at rates acceptable or desirable within the context of the particular system. In an alternate method, the gap between lines 411 and 49 is eliminated, and RFID tags are placed upstream and downstream from line 411 (or other line at another desired distance upstream from the detection zone) in the first and second test stages, respectively. While this second method may require acceptance of some degree of interference downstream from the transition line, and some degree of tag reads upstream from the line, it may provide a more precisely-defined transition.

It may also be desirable to drive the interference antenna at power levels lower than the query/receive antenna power levels to reduce overall in-band noise. In-band noise can be more or less problematic in a given RF system, for example depending on surfaces proximate to the RF antennas that may reflect noise to the antennas. Where relatively greater RF reflective surfaces are present proximate the antennas, it may be desirable to reduce the interference antenna power. Furthermore, it should also be understood that it is not necessary that the interference antennas be constructed similarly to the query/receive antennas, provided the interference antennas reduce undesired upstream RFID tag responses to the degree desired for a given RF system.

As described in more detail below, the transmission from interference antenna 402 reduces the likelihood that an RFID tag receiving the interference antenna's signal will respond to a signal also received by antenna 56 or any of the other query/receive antennas. Thus, even though the radiation pattern from antenna 56 extends upstream from line 411, the presence of the radiation pattern from interference antenna 402 generally prevents undesired responses from RF tags upstream from line 411.

Moreover, interference antenna 402 is disposed with respect to the query/receive antenna and the belt so that antenna 402 radiates radio frequency signals into an area that is proximate to and generally excludes the common detection zone defined for the query/receive antennas. The signals from antenna 402 can be considered to be entirely excluded from the detection zone when the signals from antenna 402 within the detection zone are such that they would not prevent a radio frequency tag from responding to query signals from the query/receive antenna anywhere within the detection zone. This may occur, for example, if the power level of the signals from antenna 402 is such that a radio frequency tag in the detection zone would not distinguish the signals from antenna 402 from noise, or if the power level of the signals from antenna 402 within the detection zone is otherwise sufficiently below the query/receive antenna query signal power level that the tag always responds to the query signal. The signals from antenna 402 may be considered to be generally excluded from the detection zone if the gain pattern from antenna 402 extends into the detection zone defined by the start window and stop-read window, and interferes with the reception of and response to query signals from the query/receive antennas by RFID tags in the detection zone, but does so to less than the full extent of the detection zone and leaves a portion of the detection zone in which the signals from antenna 402 do not interfere with the query/receive query signals that is sufficiently large that the system achieves a rate of successful reads of radio frequency identification tags on packages passing through the detection zone that is acceptable under the conditions and criteria under which the system is designed to operate. Thus, the signals from antenna 402 may interferingly extend into the majority of the detection zone, provided the remaining part of the detection zone is sufficient to permit the query/receive antennas to read radio frequency identification tags at an acceptable rate.

Because the effective antenna radiation patterns may vary, line 411 is not precise, and it is possible that RFID tags slightly upstream from line 411 may receive and respond to signals from the query/receive antennas (46, 56, 66 and 76) and/or that signals from the interference antennas may prevent RFID tags slightly downstream from line 411 from responding to the query/receive antennas. The area upstream and downstream from line 411 in which such conditions may occur can depend on the particular antenna construction and power but, in the presently described embodiment, does not extend into the detection zone downstream from line 49. In another embodiment illustrated in FIG. 27B, interference antenna 402 is attached to the antenna frame so that the interference antenna is oriented in a vertical plane at 45° angle 399 with respect to a vertical plane including the conveyor belt's centerline and so that the antenna, and therefore the center of its radiation pattern, faces the conveyor belt in the upstream direction at a 45° angle. A 45° orientation of antenna 402 can be preferred to potentially increase the number of RFID tags for which the antenna can effectively interfere. While the resulting line 411 extends across belt 14 at a 15° angle with respect to a line 413 normal to the belt's moving direction, line 411 does not cross into the detection zone or does so only minimally.

Figure 27A:
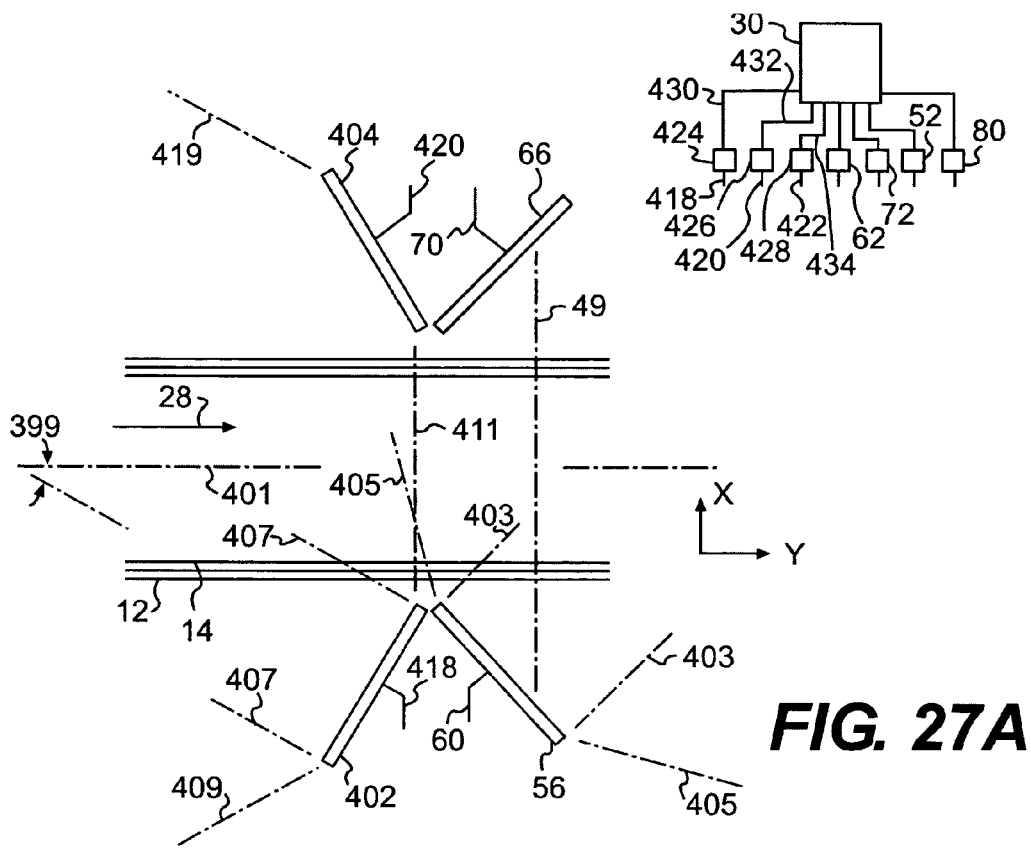
FIG. 27A is a schematic view of a conveyor system in accordance with an embodiment of the present invention.
Figure 27B:
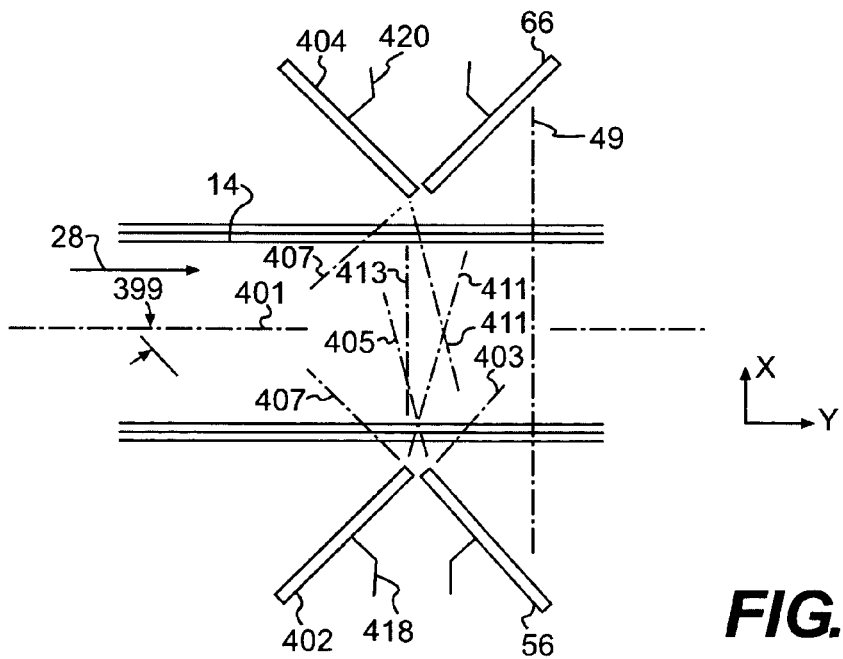
FIG. 27B is a schematic view of a conveyor system in accordance with an embodiment of the present invention.
Figure 27C:
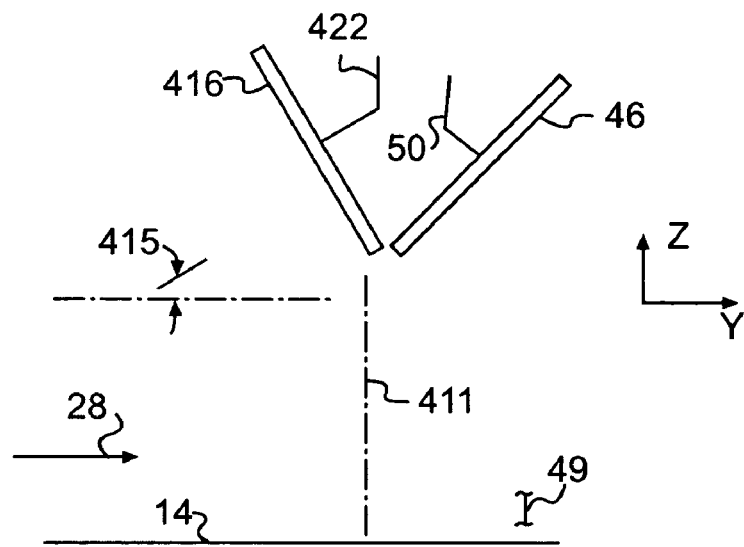
FIG. 27C is a schematic view of a conveyor system in accordance with an embodiment of the present invention.

Returning to FIG. 27A, the construction and orientation of interference antenna 404 is the mirror image of the construction and orientation of interference antenna 402. Interference antenna 404 is, preferably, driven at the same power level as antenna 402, and the antenna's radiation pattern can be considered to extend from the antenna's face within an effective range extending approximately 60° to either side of the antenna's front face, as indicated at 419 and 411. Referring also to FIG. 27C, top interference antenna 416 is disposed on the antenna frame so that its downstream edge is aligned with line 411 (expanded as a plane in FIG. 27C) and so that the interference antenna spans transversely across the path of belt 14 at a 60° angle in the upstream direction with respect to a horizontal plane parallel to the conveyor belt. Interference antenna 416, and therefore the center of its radiation pattern, faces the conveyor belt in the upstream direction at a 30° angle 415. The interference antenna's radiation pattern can be considered to extend from the antenna's face within an effective range extending approximately 60° to either side of the antenna's front face. That is, the downstream end of the effective radiation pattern from interference antenna 416 extends generally vertically at plane 411. Accordingly, the three interference antennas define a generally vertical boundary at plane 411 upstream of which RFID tags should not respond to signals from antennas downstream from plane 411.

Preferably, the power level at which top interference antenna 416 is driven is higher than the power of antennas 402 and 404. Because top antenna 416 is disposed farther from the both than antennas 402 and 404, a higher power level may be needed to create a gain pattern sufficient to interfere with reception and response of RF signals by RFID tags proximate the belt. As a result, antenna 416 may create interference downstream of line 411 to an extent greater than antennas 402 and 404, although one skilled in the art should recognize that this effect can be considered when setting the antenna's power level as described above.

Figure 27D:
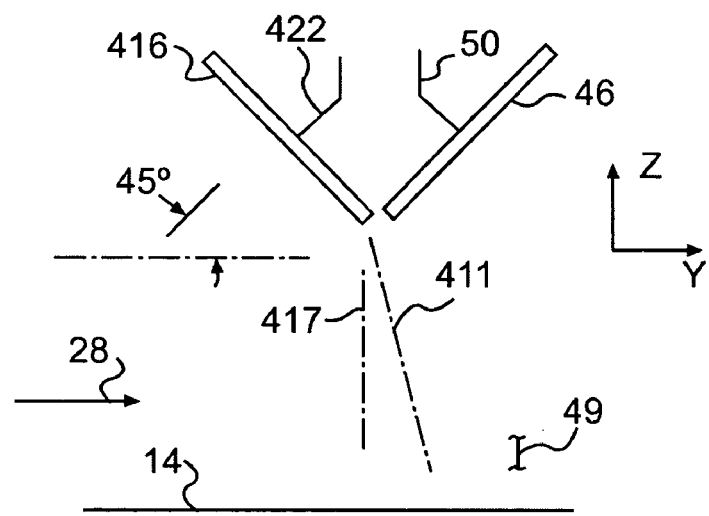
FIG. 27D is a schematic view of a conveyor system in accordance with an embodiment of the present invention.

As noted with respect to interference antenna 402, the orientation of antennas 404 and 416 may vary. In the preferred embodiment in which antenna 402 is disposed at a 45° angle with respect to vertical plane 401, interference antenna 404 is also disposed at a 45° angle with respect to the vertical plane and so that the antenna, and therefore the center of its radiation pattern, faces the conveyor belt in the upstream direction at a 45° angle. Referring also to FIG. 27D, top interference antenna 416 is disposed on the antenna frame so that its downstream edge is aligned with the downstream edges of antennas 402 and 404 (as shown in FIG. 27A) and so that the interference antenna spans transversely across the path of belt 14 at a 45° angle in the upstream direction with respect to a horizontal plane parallel to the conveyor belt. As with antenna 402, the effective interference radiation patterns extend from antennas 404 and 416 at an approximately 15° angle downstream from a vertical plane 417 extending transverse to the belt's path of travel and aligned with the interference antennas' downstream edges but preferably do not cross into, or cross into only minimally, the detection zone downstream of line 49.

Radiation patterns from the three interference antennas preferably cover an area sufficiently far upstream from plane 411 to prevent RFID tags that are otherwise close enough to the antenna tunnel to successfully transmit to the query/receive antennas from receiving and responding to signals from any of the query/receive antennas either directly or as reflected from RF-reflective surfaces proximate the tunnel. In the presently described embodiment, no interference antenna is provided proximate bottom antenna 76 (FIG. 1). The three interference antennas collectively generate a radiation pattern that can interfere with RFID tags on any surface of the package, regardless to which of the query/receive antennas the tag might otherwise respond. Depending, for example, on a package's contents it is possible for RFID tags on a package's bottom surface to respond only to bottom antenna 76 and not to be affected by the side and top interference antennas. The bottom antenna's radiation pattern is, however, relatively narrow in the area immediately above the belt's surface in which these tags are located. Accordingly, there is less risk the bottom antenna will undesirably activate and receive a signal from such a tag upstream from the detection zone, and a bottom interference antenna, while within the scope of the present disclosure, is therefore omitted in the presently described embodiments.

Figure 27E:
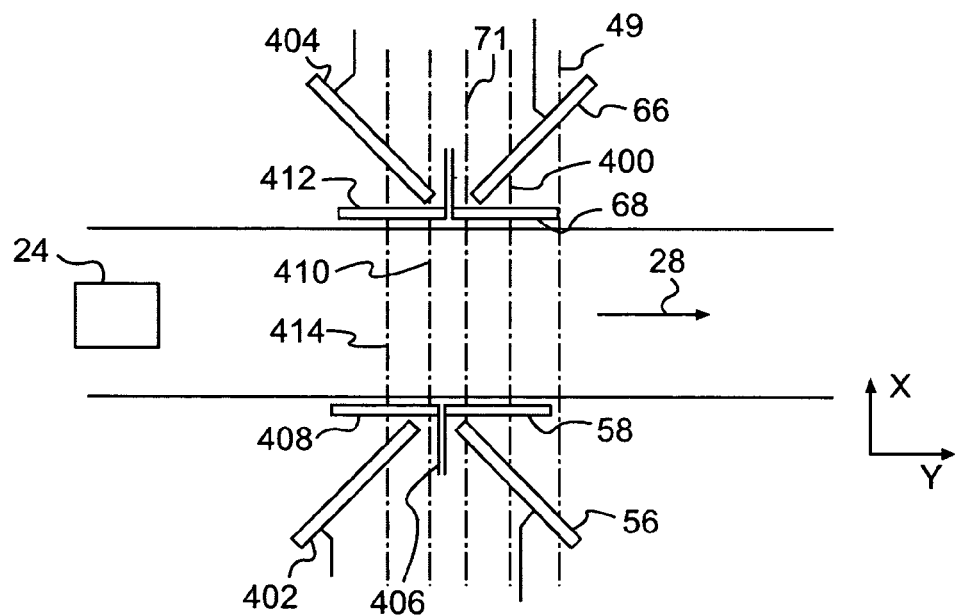
FIG. 27E is a schematic view of a conveyor system in accordance with an embodiment of the present invention.
Figure 27F:
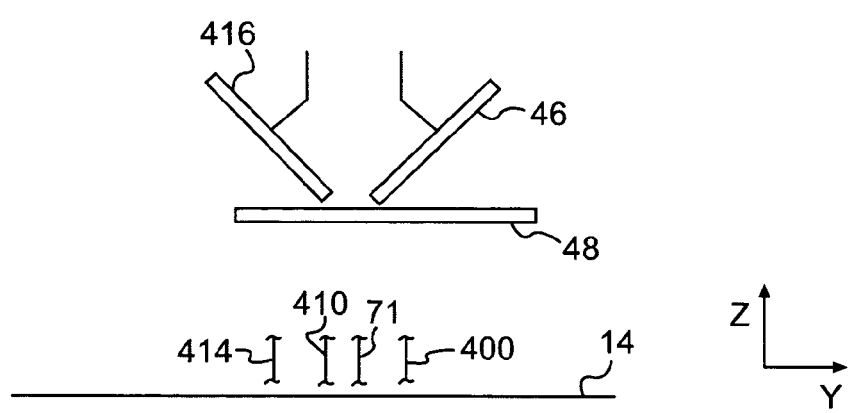
FIG. 27F is a schematic view of a conveyor system in accordance with an embodiment of the present invention.

In another preferred embodiment of the present invention, and referring to FIGS. 27E and 27F, RF absorber pads are disposed between respective pairs of query/receive and interference antennas to establish a more definitive transition between an area from which the query/receive antennas can generally receive RFID tag transmissions and an area from which interference antennas 402, 404 and 416 generally prevent such transmissions. As described above, the power level of the radiation patterns emitted by antennas 46, 56 and 66 is generally too low to activate RFID tags upstream from line 71 such that the tags respond to the transmitting antennas, due to the orientation of antennas 46, 56 and 66 and the presence of RF absorber pads 48, 58 and 68. While the signal power increases between line 71 and the start of the detection zone at line 49, the power level in this area preferably remains generally insufficient to so activate an RFID tag, although it should be understood that the point at which the radiation pattern activates a tag may depend on factors such as the power at which the antennas are driven, the orientation of tags being read, the RFID tags' configuration and the antenna orientation. For purposes of this discussion, however, a line 400 is assumed to define the point at which the radiation patterns from antennas 56 and 66 become sufficiently strong to activate a tag disposed on an outer surface of a package 24 traveling on the conveyor so that the tag respond to the transmitting antenna.

The construction of the interference antennas is the same as in the prior embodiment. Interference antenna 402 is disposed beside conveyor belt 14 at a 45° angle with respect to the belt's centerline and approximately two inches above the conveyor frame. A metal plate 406 extends vertically upward from the conveyor and has an L-shaped cross-section in the X-Y plane. The length of each leg of metal plate 406 is approximately 7.5 inches. The length (in the Y direction) of ferrite absorber pads 408 is approximately 7.75 inches, such that the absorber pads extend slightly upstream of the upstream edge of metal plate 406. Absorber pads 408 are disposed on both sides of the metal plate—i.e. on the side facing the antenna and the side facing the belt.

The construction and orientation of interference antenna 404 is the mirror image of the construction and orientation of interference antenna 402. A reference 410 can be considered to extend transversely across conveyor belt 14 at the back edges of antennas 402 and 404. Due to the orientation of antennas 402 and 404 and the presence of RF absorber pads 408 and 412, the power level of any signal from the radiation patterns emitted by interference antennas 402 and 404 is too low to effectively interfere with reception of and response to RF signals by RFID tags downstream from line 410. As should be understood by those skilled in this art, the point upstream from line 410 at which the radiation pattern effectively interferes with a tag may depend on factors such as the power at which the antennas are driven, the orientation and configuration of the RFID tags, and the antenna orientation. For purposes of this discussion, however, a line 414 is assumed to define the point at which the radiation patterns from interference antennas 402 and 404 become sufficiently strong to effectively interfere with a tag disposed on the side of a package 24 traveling on the conveyor.

Referring to FIG. 27F, top interference antenna 416 is disposed so that its downstream edge is aligned with reference line 410 and at a 45° angle with respect to a plane parallel to the conveyor belt. Absorber pads 48 extend slightly upstream from reference line 410.

In a still further embodiment, the side absorber pads (and their supporting metal plates) are omitted, and absorber pad 48 is shortened so that its upstream edge is at the downstream edge of interference antenna 416 or between the downstream edge of antenna 416 and the upstream edge of antenna 46. Accordingly, the interference antennas may be driven at power levels lower than that when the absorber pads are present, and the interference antennas may interfere with undesired transmissions from RFID tags between lines 410 and 414 that might result from reflected transmissions originating from the query/receive antennas.

In each of the embodiments shown in FIGS. 27A-27F, interference antennas 402, 404 and 416 are connected by feed lines 418, 420 and 422 to respective antenna engines 424, 426 and 428 that drive transmission signals to the antennas. Because the interference antennas do not receive responses from the RFID tags, there is no need for the engines to receive and process return signals, and in another preferred embodiment, engines 424, 426 and 428 are replaced by transmitters that drive the antennas to transmit interference signals but do not receive signals from the antennas. Alternatively, a single engine or single transmitter supporting three or more output ports, or having a single output port to an antenna switch controlled by HSC 30, can be used to drive all three interference antennas, e.g. in a round-robin sequence.

Referring to FIG. 27A, respective output lines 430, 432 and 434 connect antenna engines (or transmitters) 424, 426 and 428 to HSC 30, which controls the engines to drive the antennas. Because interference antennas 402, 404 and 416 operate simultaneously in the presently described embodiment, cables between HSC 30 and the antenna engines are preferably of the same length, as are the cables between the engines and the interference antennas, so that the signals from the interference antennas are in phase and do not cancel. Each engine includes a transmitter and a microprocessor that controls the transmitter and communicates with HSC 30 over the engine's output line. HSC 30 initiates a transmission from the antenna by a command to the engine microprocessor. In response, the microprocessor sends a bit sequence to the transmitter, which then transmits the signal at a specified frequency and power level to the antenna.

Figure 28:
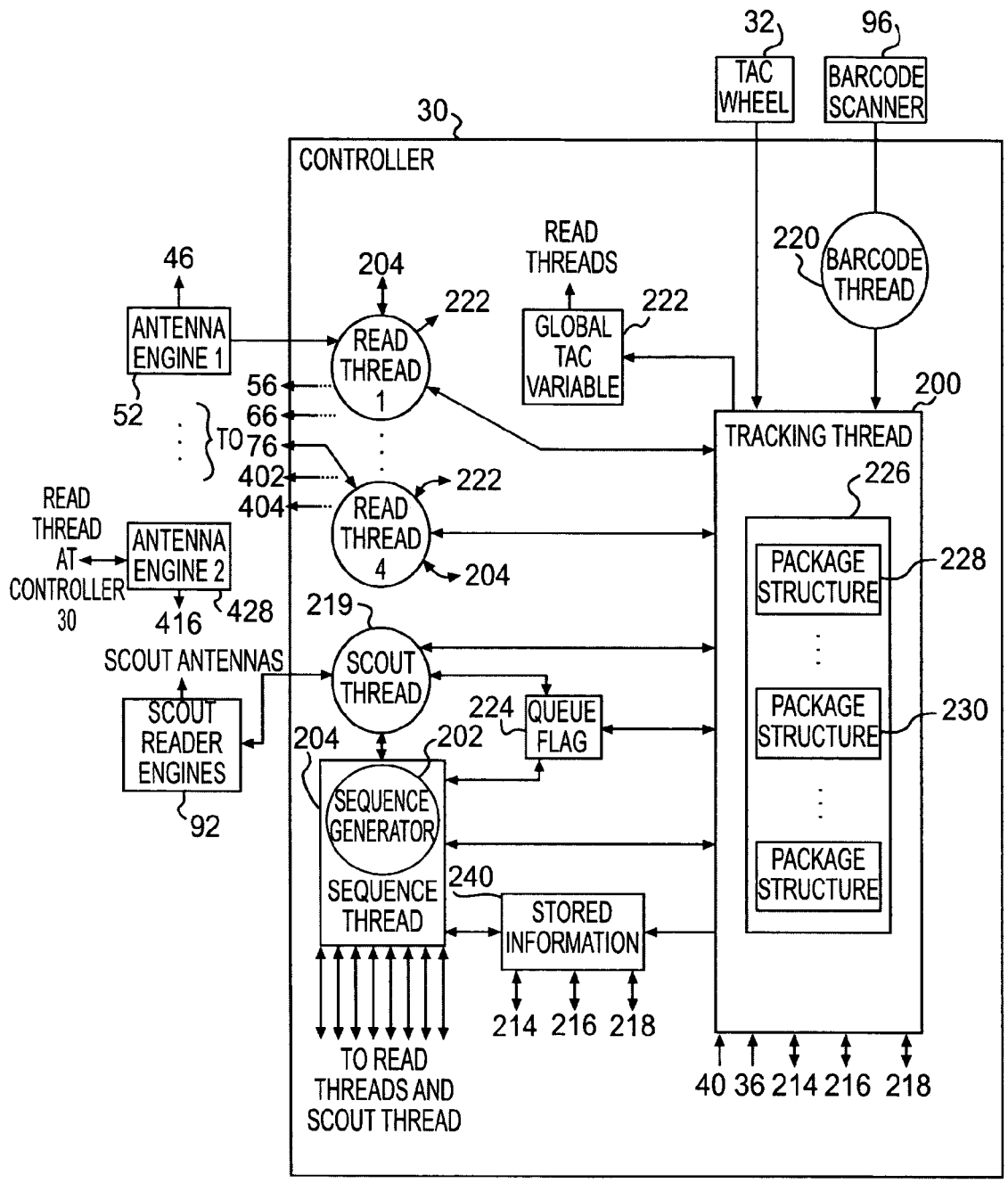
FIG. 28 is a functional block diagram of a tracking system for use with the conveyor system as in FIGS. 27A-27G.

Referring also to FIG. 28, antenna sequence thread 204 controls interference RF engines 424, 426 and 428 and is controlled in turn by antenna sequence generator 202. In the presently described embodiments, antenna sequence generator 202 defines the order in which the antenna sequence thread is to activate the transmit/receive antennas, for example in round-robin fashion. In one preferred embodiment, sequence generator 202 instructs antenna sequence thread 204 to simultaneously activate interference antennas 402, 404 and 416 whenever any of the query/receive antennas are activated. Thus, for example, assume id's 1, 2, 3 and 4 respectively refer to antennas 56, 66, 46 and 76, and that id's 5, 6 and 7 respectively refer to interference antennas 402, 404 and 416. If the sequence generator defines a round-robin sequence among all four transmit/receive antennas, the sequence provided by sequence generator 202 to sequence thread 204 is (a) 1/5/6/7, (b) 2/5/6/7, (c) 3/5/6/7 and (d) 4/5/6/7. Upon reading the first step (a) in the sequence, for example, antenna sequence thread 204 simultaneously instructs engines 62, 424, 426 and 428 to drive their respective antennas 56, 402, 404 and 416. At step (b), the antenna sequence thread simultaneously instructs engines 72, 424, 426 and 428 through the respective read threads to drive their respective antennas 66, 402, 404 and 416, and so on. Accordingly, interference antennas 424, 426 and 428 are activated until antenna sequence thread 204 detects from queue flag 224 that no packages are present, at which point the sequence thread stops driving the antennas through their respective engines. Read threads 222 are provided for transmit/receive antennas 46, 56, 66 and 76 and are preferably provided for the interference antennas for communication between the sequence thread and the interface antenna engines, although the system does not read response signals from the interference antennas. In a still further embodiment, a separate sequence generator/sequence thread is provided for each interference antenna (in an arrangement similar to the sequence thread arrangements shown in FIGS. 33, 35 and 37), while sequence generator/sequence thread 202/204 drives the query/receive antennas as discussed above. Preferably, the interference antennas are activated only when there is at least one package in the package queue (i.e. when the queue flag indicates to the interference antenna's sequence thread that a package is present). Under this condition, the respective sequence generators instruct the interference antenna sequence threads to continuously activate the interference antennas. In one embodiment, the interference antenna sequence threads do not communicate with stored information at 240.

Figure 27G:
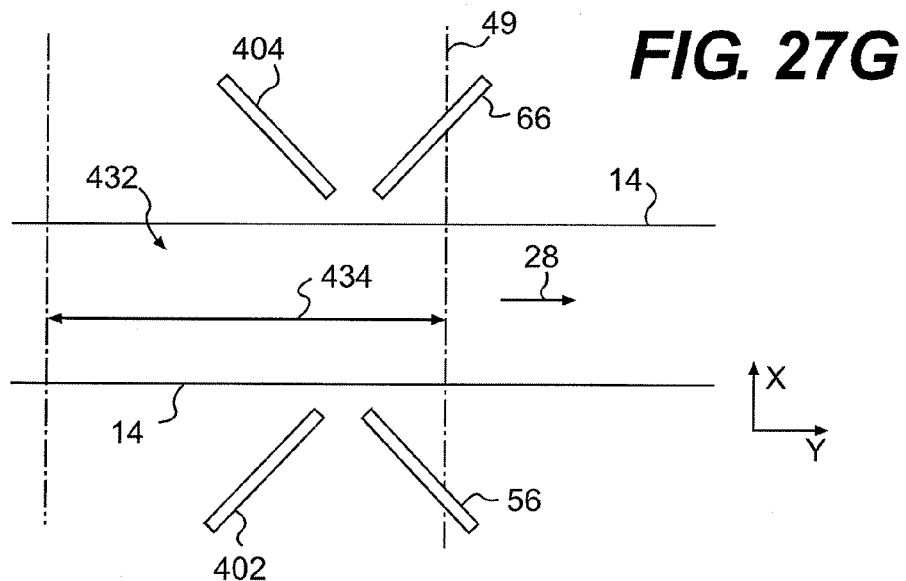
FIG. 27G is a schematic view of a conveyor system in accordance with an embodiment of the present invention.

In an alternate embodiment, and referring to FIG. 27G, the interference antennas are activated only when there is at least one package in the package queue but also only if at least one such package is within a predefined area 432 upstream from start line 49 in which there exists a likelihood that an RFID tag on the package can transmit a response that could be received by the query/receive antennas in the RF antenna tunnel. The length 434 of area 432 upstream from line 49 can depend at least in part on system configuration and ambient conditions. For example, length 434 may be greater for a system in which the tunnel query/receive antennas transmit at a relatively high power level and are surrounded by RF reflective surfaces than for a system in which query/receive antennas transmit at a lower power level and are surrounded by fewer RF reflective surfaces. If the system is operated over periods in which packages are not present in area 432, the resulting reduction in operation of the interference antennas can reduce in-band noise.

In this embodiment, referring also to FIG. 28, upon creation of a package structure 228 for a package entering the system, tracking thread 200 establishes an interference start window distance representing the TAC pulse distance between photodetector 36 (FIG. 1) and area 432. At each incoming TAC pulse, the tracking thread decrements the interference start window so that, at any given time between the point at which the package's leading edge enters the photodetector 36 (FIG. 1) line of sight and the point at which the package's leading edge reaches area 432, the interference distance variable represents the number of TAC pulses remaining between the package's leading edge and area 432. That is, the interference start window distance represents the distance the package needs to travel before entering area 432.

Package structure 228 also includes an interference stop window distance variable that defines length 434 of area 432. When a package first enters the tracking system at photodetector 36 (FIG. 1), tracking thread 200 initializes the interference stop window distance to a predefined distance in TAC pulses. When the interference start window distance for a given package structure decrements to zero, tracking thread 200 begins decrementing the package structure's interference stop window distance variable at each incoming TAC pulse. Tracking thread 200 also constantly checks package structures 228 in package queue 226. If there exists any package structure having an interference start window that has decremented to zero and a non-zero interference stop window distance variable, a package is present in area 432, and tracking thread 200 notifies antenna sequence generator 202 to output an antenna sequence including the interference antennas, as described above or, if individual sequence generators/sequence threads are provided for the interference antenna engines, tracking thread 200 notifies the three interference antenna sequence generators to output antenna sequences to their respective sequence threads to drive their respective interference antennas. If there is no package structure with a zero interference start window distance and a non-zero interference stop window distance, no package is present in area 432, and tracking thread 200 instructs sequence generator 202 to output an antenna sequence without the interference antennas.

For each antenna in the sequence, including the interference antennas, sequence generator 202 defines the power level at which the antenna is driven during its activation and the length of time the antenna is activated. Preferably, the three interference antennas are activated over at least the same time period during which the query/receive antennas are activated.

While respective engines 52, 62, 72 and 80 may be employed to drive antennas 46, 56, 66 and 76, in one preferred embodiment a single engine drives the four query/receive antennas through an RF switch, as discussed above with respect to FIG. 32. In this embodiment, the interference antennas are preferably driven by respective engines where the interference antennas are driven simultaneously with each other and the query/receive antennas.

In the presently described embodiments, engines 52, 62, 72 and 80 drive the query/receive antennas at a carrier signal that frequency hops within a 902-928 MHz range and amplitude shift key modulate the carrier to define the data on the signal according to the various RFID tag protocols. HSC 30 defines the power at which the engine drives the antenna, while the engine defines the dwell time between frequency hops, the data rate (i.e. the rate at which the engine modulates the carrier to put data on the carrier signal) and the timing of the signal's data bits.

While the class 0, class 1 and Gen2 protocols differ, each is configured to operate with a frequency hopping transmitter. Class 0 begins with a number of timing bits. Assuming class 0, upon detecting an incoming query signal, an RFID tag begins a sequence based on the timing bits that sets the RFID tag's receiver timing so that the tag can receive the remainder of the message on the query signal as dictated by the tag's protocol. If, however, the tag simultaneously receives an interference signal that prevents the tag from setting its timing and/or receiving the subsequent instruction, the RFID tag does not respond to the query signal.

In one preferred embodiment, for example, engines 424, 426 and 428 drive their respective interference engines at a sine or square-wave signal at a frequency specific to the protocol at which the query/receive antenna is transmitting. Where the data rate and bit timing are unknown, an interference signal frequency can be determined through testing. A query/receive antenna is disposed coplanar with an interference antenna so that the antennas face in the same direction. An RF tag is disposed between and in front of the antennas a distance sufficient (in one example, approximately 8.25 inches) for the tag to receive signals equally from the two antennas. In a given test, the query/receive antenna transmits a query signal at a known power level and according to the tag's protocol. Simultaneously, the interference antenna is driven at the same power level by a square wave generator at a selectable frequency and depth, and the output of the query/receive antenna is monitored to determine if the tag responds to the query signal. "Depth" refers to the modulation depth, or the ratio of maximum carrier amplitude to the minimum carrier amplitude, in the square wave pattern. For example, a 100% depth indicates the signal changes from full carrier to zero carrier according to the square pattern, whereas a 50% depth indicates the carrier varies between full and half according to the square pattern. A test comprises a selected number (e.g. 100) query signals and corresponding attempts to read the RFID tag, and the test's read percentage is the percentage of such attempts at which the query/receive antenna successfully detected a response from the RFID tag.

The table below describes the results of such a series of tests. Five tests at 100 attempts per test were performed for each selected transmission frequency and depth. The interference and query/receive antennas were three-element patch arrays as described herein. The query/receive antenna frequency hopped over the 902-928 MHz range. The interference antenna transmitted square waves at the various modulation depths in the table below at a 915 MHz carrier frequency that did not frequency hop. The data rate and bit timing of the RF engine driving the transmit/receive antenna were unknown.

| Interference Signal | | Read Percentage | | | | |
|---|---|---|---|---|---|---|
| Freq. | Depth | Test 1 | Test 2 | Test 3 | Test 4 | Test 5 |
| No Signal | No Signal | 100 | 100 | 100 | 98 | 96 |
| 1 KHz | 100% | 27 | 58 | 27 | 49 | 49 |
| 400 Hz | 100% | 29 | 26 | 45 | 31 | 33 |
| 20 kHz | 100% | 35 | 16 | 20 | 27 | 29 |
| 30 kHz | 100% | 32 | 45 | 33 | 38 | 46 |
| 100 Hz | 100% | 62 | 59 | 83 | 62 | 51 |
| 10 kHz | 100% | 13 | 29 | 12 | 8 | 14 |
| 5 kHz | 100% | 38 | 24 | 25 | 18 | 16 |
| 10 kHz | 50% | 57 | 62 | 39 | 51 | 81 |

As indicated in the table, a square wave at 915 MHz carrier and that is amplitude shift key modulated at 10 kHz with 100% depth produced the most effective interference of the signals from the transmit/receive antenna. Referring again to the above-described embodiments, sequence generator 202 defines a sequence that triggers antenna sequence thread 204 to instruct engines 424, 426 and 428 to drive antennas 402, 404 and 416 (at a power level determined as described above) during the time periods when any of engines 52, 62, 72 and 80 activate the query/receive antennas to query for a class 0 RF tag. The microprocessors at engines 424, 426 and 428 are programmed so that, upon receiving instruction from HSC 30/antenna sequence thread 204 to drive the interference antennas at the class 0 power level, engines 424, 426 and 428 drive the respective interference antennas at a power level determined as described above with a 915 MHz non-frequency-hopping signal that carries a square wave that is amplitude modulated at 10 kHz with 100% depth. The carrier frequency may frequency-hop where required by FCC regulations.

The same procedure may be used to determine the frequency of the interference signal for each of the class 1 and Gen2 protocols. Thus, upon receiving instruction from HSC 30/antenna sequence thread 204, engines 424, 426 and 428 drive the respective interference antennas at a power level defined by the sequence thread with a 915 MHz signal carrying a square wave that is amplitude modulated at the frequency and depth determined by the test.

If the data rate and bit timing of the signals at which engines 52, 62, 72 and 80 drive the query/receive antennas are known, the interference signals by which engines 424, 426 and 428 drive the interference antennas can be defined to interfere with specific aspects of the query signals from the query/receive antennas. For example, the interference signal can be timed so that square wave pulses occur between the query signals's timing bits, thereby preventing the RFID tag from setting its internal timing, or otherwise at a time according to the tag protocol that prevents the RFID tag from responding to the query. Such an arrangement may be effected, for example, by synchronizing the data rate among the antennas so that the interference bits can be timed as desired to prevent RFID tag responses. The protocol of the interference signal is preferably specific to the tag protocol so that there is a likelihood of signal interference.

In a further embodiment illustrated in FIGS. 29-31D, interference antennas interfere with undesired RF tag responses through cancellation of electric field (E-field) components in the radiation patterns of the query/receive antennas rather than by interference with data carried by the query/receive antennas' query signals. Antennas 46, 56, 66 and 76 are constructed as described above with respect to FIGS. 1-21, except that the RF absorber pads and their supporting frames are omitted. Side and top antennas 56, 66 and 46 are patch arrays constructed as described above with respect to FIG. 8, while bottom antenna 76 (not shown; see FIG. 1) is constructed as discussed with respect to FIG. 10.

Each of interference antennas 402 and 404 is attached to the antenna frame so that the interference antenna is oriented in a vertical plane at a 45° angle with respect to a vertical plane including the conveyor belt's centerline and so that the antenna, and therefore the center of its radiation pattern, faces the conveyor belt in the upstream direction at an acute angle, preferably 45°. More specifically, in the presently described embodiment, the top surfaces of the antenna patch elements generally define a plane that intersects a vertical plane that includes the belt's centerline in the area proximate the antenna. Top interference antenna 416 is disposed on the antenna frame so that its downstream edge is aligned with the downstream edges of antennas 402 and 404 and so that the interference antenna spans transversely across the path of belt 14 and its generally planar front face extends in the upstream direction at a 45° angle with respect to a horizontal plane parallel to the conveyor belt.

Figure 29:
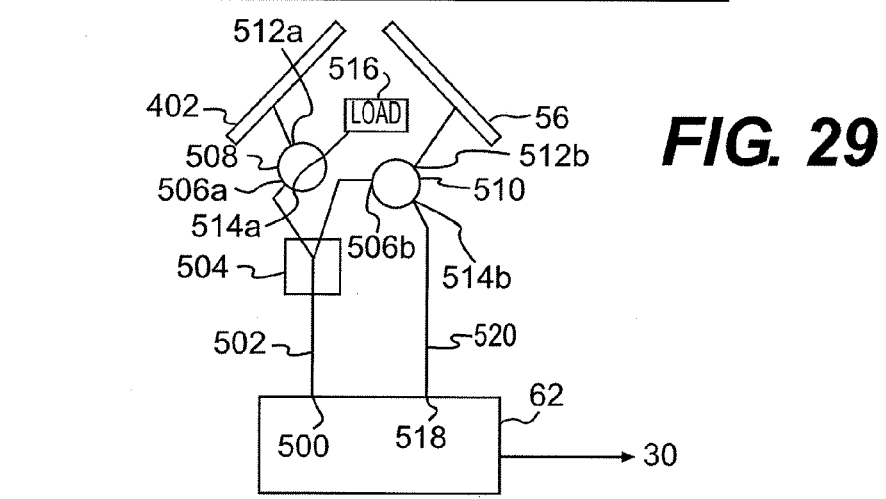
FIG. 29 is a schematic view of a conveyor system in accordance with an embodiment of the present invention.

FIG. 29 illustrates the arrangement of side antenna 56 and interference antenna 402 in relation to RF engine 62. The arrangement of each pair of interference and query/receive antennas (i.e. 402/56, 404/66 and 416/46) with respect to the engine driving the antenna pair is the same. Thus, while the present discussion is provided with respect to antennas 56 and 402 and engine 62, it should be understood that the discussion applies to the opposite side antenna pair and the top antenna pair and their corresponding RF engines.

Engine 62 includes a transmitter that drives antennas 56 and 402 from an output port 500 and feed line 502 to a power splitter 504. The split signal from power splitter 504 is output to respective ports 506a and 506b of three-port RF circulators 508 and 510, each of which defines a clockwise signal circulation from the perspective shown in FIG. 29. Port 512a of circulator 508 outputs to antenna 402, whereas port 512b of circulator 510 outputs to antenna 56. Circulator 508 port 514a outputs to a fifty ohm dead-end RF load 516 that is isolated from antennas 56 and 402 and engine 62. Circulator 510 port 514b outputs to an engine port 518 by a feed line 520.

As should be understood in this art, the signal provided by power splitter 504 to circulator ports 506a and 506b is output to antennas 402 and 56 by ports 512a and 512b, respectively. So that the signals output by the two antennas are in-phase, the feed lines between ports 512a and 512b and the respective antennas are of the same length. Signals received by the antennas are received by the circulators at ports 512a and 512b and output at ports 514a and 514b, respectively, without passing to ports 506a or 506b. Thus, any signal received by interference antenna 402 is directed to load 516 and therefore ignored, while signals received by query/receive antenna 56 is directed to the receiver of engine 62 at port 518.

For purposes of explanation, FIGS. 31A-31D illustrate interference antenna 402 and query/receive antenna 56 oriented side-by-side so that their front faces are coplanar. Respectively corresponding FIGS. 30A-30D schematically illustrate top views of the antennas in their actual 45° orientation to the belt (90° with respect to each other). Feed lines 346 and 348 are applied to the patches on opposite sides in the two antennas, as indicated in FIGS. 31A-31D. Because the signals applied to the antennas are in phase, the direction of the electric current at the patch surfaces of antenna 402 (indicated at 522) is opposite to the direction of electric current at the patch surfaces of antenna 56 (indicated at 524). As noted with respect to FIG. 8, the drive signal applied to each patch element 332 by feed line 346 leads the signal applied by feed line 348 by 90°, causing the electric current patterns in the patches to rotate in the counterclockwise direction, as indicated at 526. The electric current at all patches of both antennas 56 and 402 rotates in the same direction about respective axes perpendicular to the generally planar patch surfaces. As indicated in the sequence shown in FIGS. 31A-31D, electric current directions 522 and 524 oppose each other throughout the clockwise rotation.

Figure 30A:
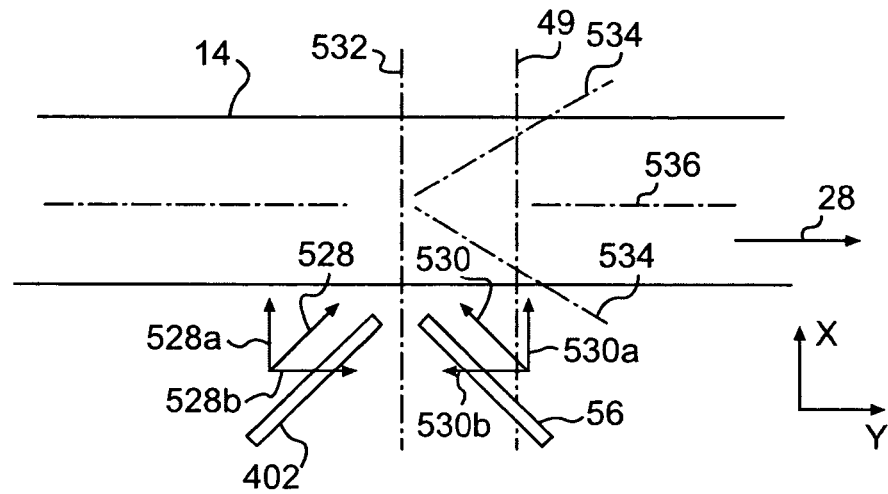
FIG. 30, which is presented as FIGS. 30A, 30B, 30C and 30D, is a schematic view of the conveyor system as shown in FIG. 29.
Figure 30D:
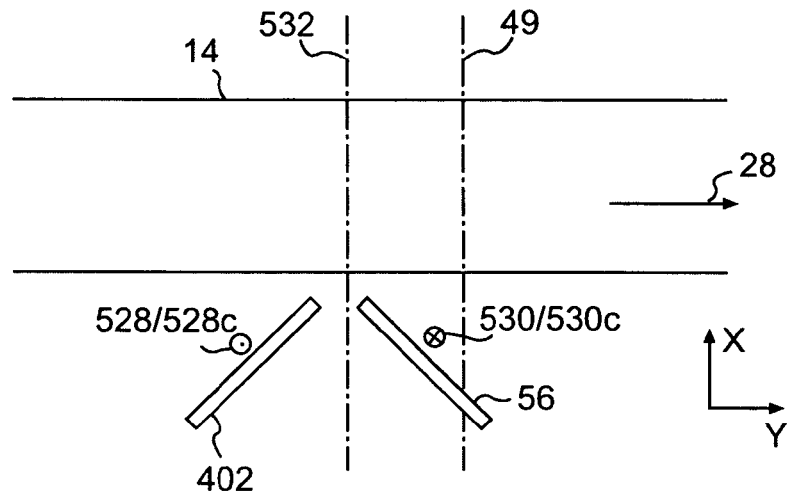
Figure 30C:
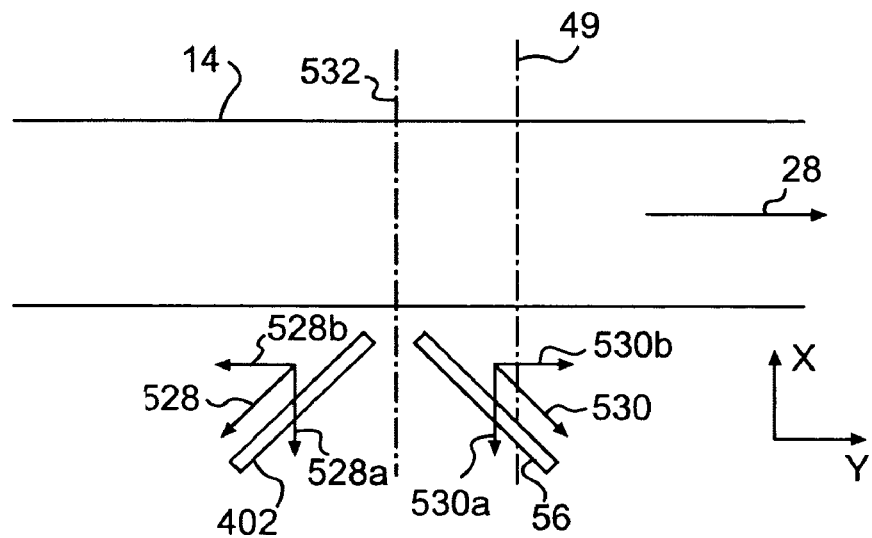
Figure 30B:
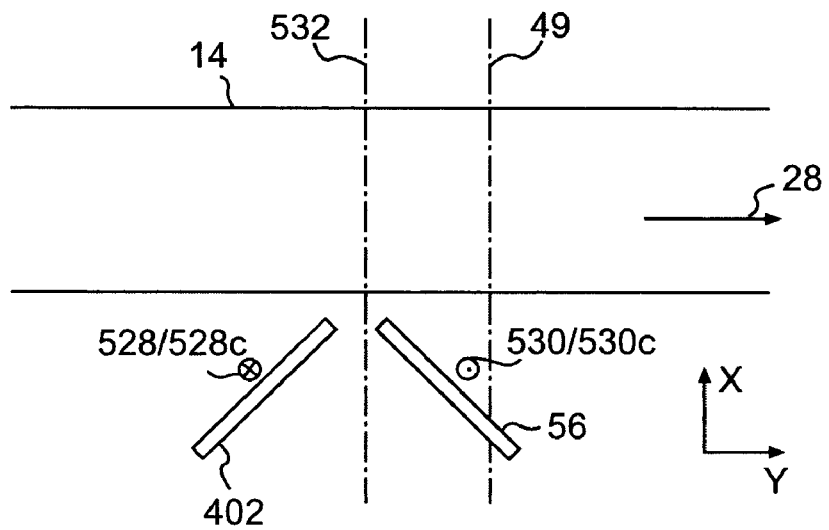
Figure 31A:
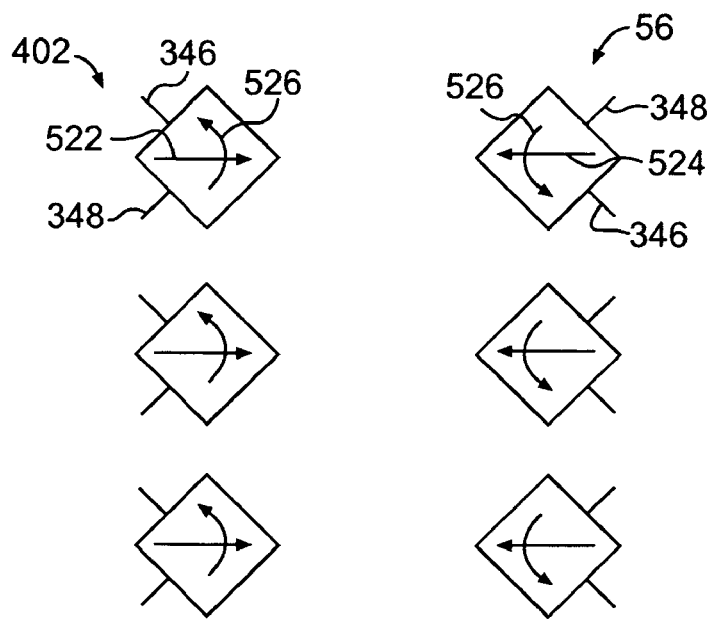
FIG. 31, which is presented as FIGS. 31A, 31B, 31C and 31D, is a schematic view of antenna patch elements of the antennas in the embodiment as shown in FIG. 29.
Figure 31D:
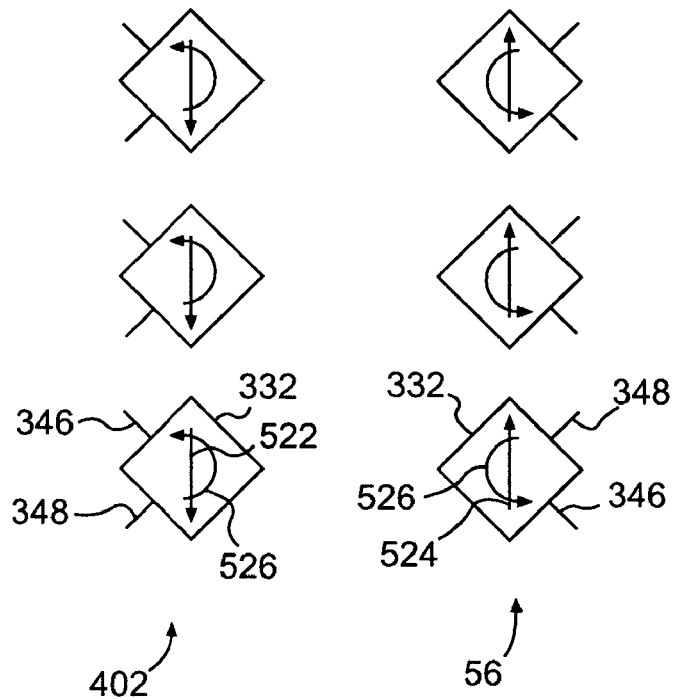
Figure 31C:
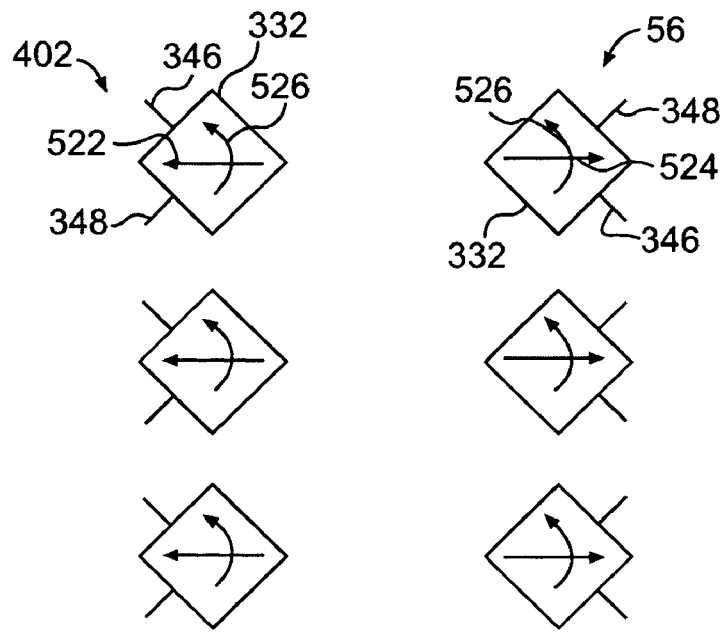
Figure 31B:
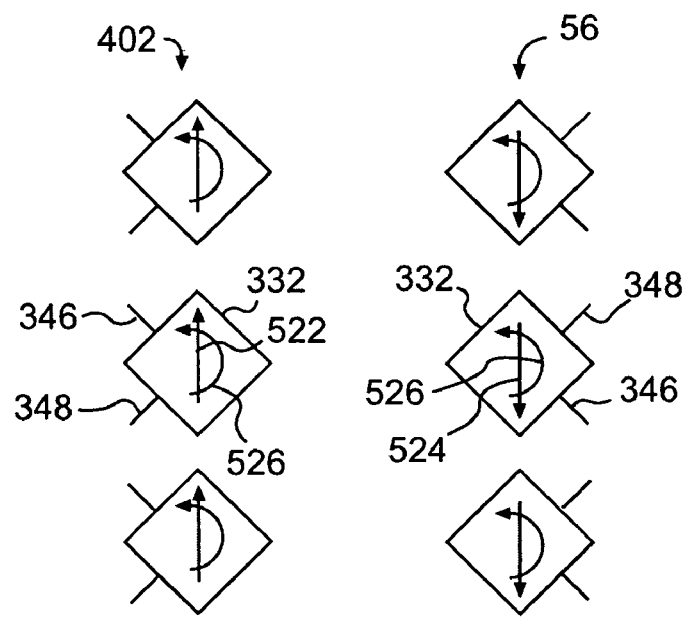

The patches' electric current flow rotational direction determines the direction of the electric field generated by the antennas. Referring to FIG. 30A, the E-field vector 528 for the radiation pattern of antenna 402 can be considered as its component vectors 528a and 528b, whereas the E-field vector 530 for the radiation pattern of antenna 56 can be considered as its component vectors 530a and 530b. As the antennas' electric current pattern rotates, so do the E-field vectors of the corresponding radiation patterns, as shown in FIGS. 30B-30D. As illustrated in the figurees, the component 528b of E-field vector 528 parallel to the direction of travel of conveyor belt 14 (i.e. the Y direction) is always generally opposite the Y-direction component 530b of E-field vector 530. The component 528c of E-field vector 528 in the vertical direction (i.e. in the Z direction) is always generally opposite the Z-direction component of E-field vector 530. However, the component 528a of E-field vector 528 transverse to the direction of travel of conveyor belt 14 (i.e. the X direction) is always generally aligned with the X-direction component 530a of E-field vector 530.

Antennas 402 and 56 radiate the same signal at the same power. Accordingly, at a vertical plane 532 equidistant from antennas 402 and 56, at which the radiation patterns from the two antenna patterns are therefore at equal power, the Y and Z components of the two antenna radiation patterns generally cancel, while the X components add. Assuming a package on conveyor belt 14 is oriented square to the belt such that the package's front, and back sides are parallel to plane 532, only tags on the package front, back and top sides will generally respond to an E-field in the X direction. Tags on the package's bottom surface could also respond, although they are typically too low to respond to the side antenna signal. Thus, at plane 532, only tags on the front, back and top package sides should respond to the query signal from antennas 402 and 56 at plane 532. The radiation pattern emitted by the package's front and back tags is generally centered along the Y axis, with the pattern's strength weakening as it spreads in the X directions. The radiation pattern emitted by the top tags is generally centered along the Z axis, with a component of the pattern's strength weakening as it spreads in the X directions. The signal power reduction at an approximately 30° cone 534 from the front or back tag's radiation pattern centerline 536 is approximately 3 dB and reduces rapidly outside the cone. The signals from the top tags are similarly weak beyond 30° in the X directions. Thus, the strength at the antenna patches of antenna 56 of the radiation pattern from a front, back or top RFID tag at plane 532 is generally insufficient to generate a response recognized by engine 62. That is, the radiation pattern signal is generally indistinguishable from noise. Accordingly, and because cancellation of the query signal Y and Z E-field components prevents responses of RF tags on the package's side, surfaces, antenna 402 should prevent antenna 56 from receiving a response from any RFID tag on the package when the tag is at plane 532.

Moving in the upstream Y direction from plane 532, the radiation pattern from antenna 402 increases in strength over the pattern from antenna 56, and the likelihood increases that the Y and Z E-field components from antenna 402 will activate an RFID tag on the side, top and bottom surfaces of the package, despite the presence of counteracting E-field components from antenna 56. The converse occurs moving in the downstream Y direction from plane 532, and the likelihood increases that the Y and Z E-field components from antenna 56 will activate an RFID tag on the side, top and bottom surfaces of the package, despite the presence of counteracting E-field components from antenna 402. The distance from plane 532 in the downstream Y direction at which the E-field components from antenna 56 become sufficiently strong in comparison to the corresponding components from antenna 402, such that an RFID tag on the package's side, top or bottom surfaces will be energized by and recognizably respond to the radiation pattern, depends upon the configuration of the RFID tag, the power level and frequency of the radiation patterns from antennas 56 and 402, receiver sensitivity and the orientation of antennas 56 and 402 with respect to each other and the RFID tags, and the particular distance will therefore depend upon the configuration in a given system. Preferably, this distance does not extend beyond line 49, the start of the detection zone. In one presently preferred embodiment having an arrangement as described herein in which antennas 402 and 56 are each driven at a power level not greater than 1 watt with a 915 MHz carrier signal, the Y and Z E-field radiation components from antennas 402 and 56 sufficiently cancel so that RFID tags on the side package surfaces within approximately two to three inches upstream from plane 532, and approximately two to three inches downstream from plane 532, do not respond to the query signal.

Antenna 56 begins to receive signals from side RFID tags when the tags move downstream beyond the resulting no-read zone for those tags. The antenna begins to read RFID tags on the top, front and back of the package when those tags move sufficiently downstream so that the 30° cone of the radiation pattern extending upstream from the tag encompasses antenna 56. Thus, while the no-read zones for the two groups of tags are different, they overlap, and there is therefore an area extending from either side of plane 532 in which the RF tags should either not radiate an RF response signal or should not radiate an RF signal that is detectable by antenna 56. It will be recognized that because the no-read zones end upstream from line 49, antenna 56 may read tag responses before the package enters the detection zone. Such reads are assigned to deferred collection 238 (FIG. 2) if no package is presently in the detection zone. If a package is in the detection zone, the algorithm described above should prevent application of the tag information to such package, depending on the tag information otherwise applied to it.

The operation of side antennas 66 and 404, and the resulting no-read zones for RFID tags on the side, top and bottom package surfaces and on the front and back package surfaces, is the same as for antennas 56 and 402 and is therefore not further described. The operation of top antennas 46 and 416 is also the same as for antennas 56 and 402, but because these antennas face downward, instead of to the side, the X and Y E-field components cancel, while the Z E-field component adds.

Figure 38:
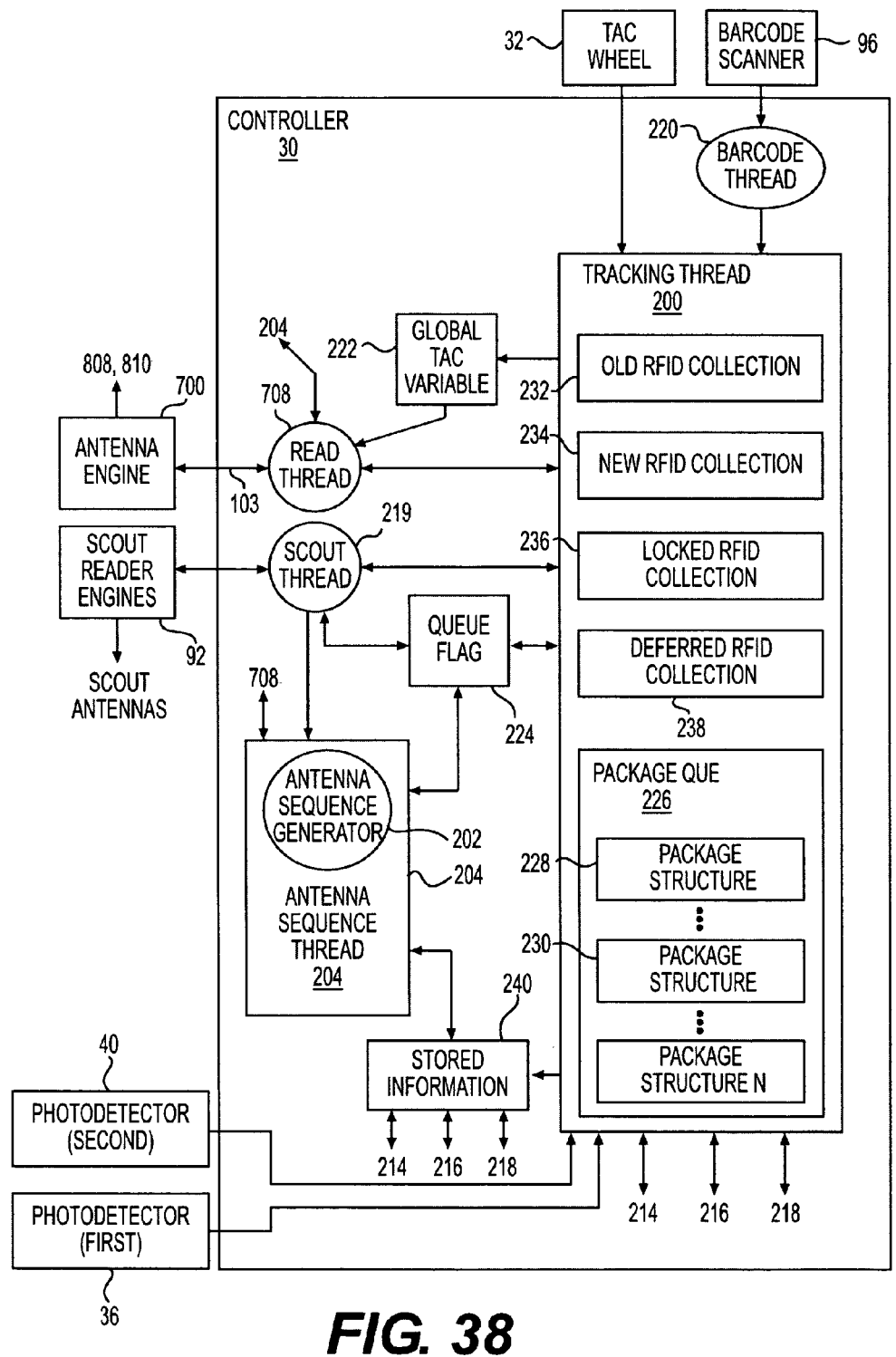
FIG. 38 is a functional block diagram of a tracking system for use with a conveyor system in accordance with an embodiment of the present invention.
Figure 39:
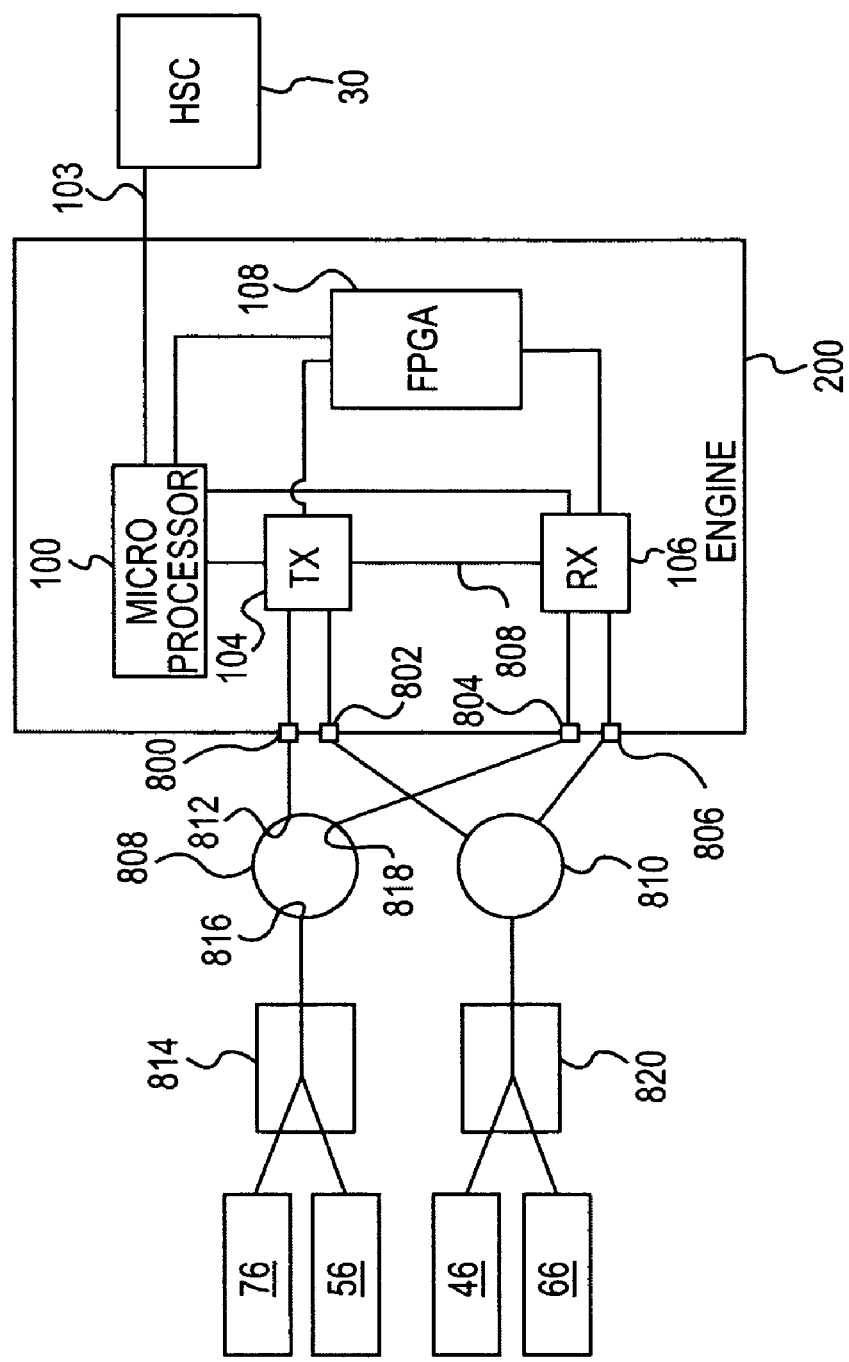
FIG. 39 is a schematic view of the tracking system as in FIG. 38.

In a still further embodiment, illustrated in FIGS. 38 and 39, all four query/receive antennas 46, 56, 66 and 76 are disposed together at an even position with respect to the belt's path of travel in the antenna tunnel (e.g. as shown in FIG. 1). That is, the detection zones for respective antennas coincide such that the tracking algorithm tracks the packages (as described above) with respect to a single, common detection zone, although it should be understood that the system could be configured to separately track the packages with respect to respective detection zones, particularly where the antennas are offset from each other. Preferably, the antennas are disposed so that the detection zones at least partially overlap. RF absorber pads are provided (e.g. as shown in FIG. 1). Interference antennas are not employed but could be provided. Except as discussed herein, the construction and operation of the controller, engine(s) and tracking algorithm are the same as discussed with respect to FIGS. 1 and 2.

The tunnel's antennas are driven by a single RF engine 700 controlled by HSC 30. Engine 700 is comprised of the schematically illustrated components of FIG. 39, including a microprocessor 100, transmitter 104, receiver 106, and FPGA 108. Transmitter 104 and receiver 106 connect to FPGA 108. Microprocessor 100 controls transmitter 104, receiver 106 and FPGA 108 and communicates with HSC 30 via connection line 103. The engine includes four ports 800, 802, 804, and 806. Ports 800 and 802 communicate with transmitter 104, while ports 804 and 806 communicate with receiver 106. Each of transmitter 104 and receiver 106 include a respective switch (not shown) that switches transmitter 104 between port 800 and port 802 and switches receiver 106 between port 804 and port 806. HSC 30 initiates a simultaneous transmission by either of two antenna pairs (76/56 or 46/66) by a command to microprocessor 100. In response, microprocessor 100 sends a bit sequence and a switch instruction to transmitter 104. The switch instruction causes the transmitter to select either port 800 or port 802, depending upon the instruction. As described in more detail below, whenever transmitter 104 drives one of the two antenna pairs, the receiver should be set to receive signals from that same antenna pair. That is, when the switch in transmitter 104 is set to port 800, the switch in receiver 106 should be set to port 804, and when the switch in transmitter 104 is set to port 802, the switch in receiver 106 should be set to port 806. Accordingly, when microprocessor 100 sets the transmitter switch to either port 800 or port 802, a signal from transmitter 104 (indicated at 808) automatically sets the switch in receiver 106 to the appropriate port. Alternatively, microprocessor 100 may send respective signals to transmitter 104 and receiver 106 to set the switches appropriately.

Assuming the transmitter and receiver are set to ports 800/804 or 802/806, the transmitter transmits the signal at a specified frequency and power level to the antenna pair via the specified antenna port. One or both of the antennas return detected signals from an RFID tag via the selected receiver port. Receiver 106 removes the carrier signal and sends the resulting information signal to FPGA 108. FPGA 108 extracts digital data from the receiver's signal and outputs a resulting digital signal to microprocessor 100, which then transmits the digital signal to HSC 30. An RFID engine suitable for use in the presently disclosed embodiment is available from Symbol Technologies, Inc. of San Jose, Calif. (e.g. the Matrics AR400).

Transmitter 104 outputs through ports 800 and 802 to respective RF circulators 808 and 810. The circulators are of an identical construction. Accordingly, while the present discussion addresses circulator 808, it should be understood that circulator 810 has the identical construction and function. Circulator 808 defines a counterclockwise signal circulation from the prospective shown in FIG. 39. The transmitter signal provided to port 812 by transmitter port 800 is output to a power splitter 814 by a port 816. The split signal from power splitter 814 is output to respective bottom and side antennas 76 and 56. The response signals returned by RFID tags and received by these two antennas are combined at power splitter 814 and input to the circulator at port 816. The circulator outputs the received signal from port 818 to receiver 106 via receiver port 804. Transmitter 104 drives top antenna 46 and side antenna 66, and receiver 106 receives signals from these antennas, in the same manner through circulator 810 and power splitter 820.

It is apparent that the system illustrated in FIG. 39 simultaneously drives, and simultaneously reads, multiple antennas, in this instance alternating pairs of antennas 76/56 and 46/66. Thus, for example, each of top antenna 46 and right-side antenna 66 is activated to transmit query signals and receive tag responses at the same time as the other. The antennas in the presently described embodiments are directional, and it is preferred that the centerlines of the gain pattern main lobes of simultaneously activated antennas are not coincident or parallel with each other. Because the top antenna faces downward and the right-side antenna faces horizontally, the centerlines of the two radiation patterns are at least at a 90 degree angle with respect to each other. The radiation patterns are further offset from each other, however, because each of the two antennas is disposed at a 45 degree angle with respect to the belt (and the antennas may be disposed so that the radiation centerlines do not cross). Thus, there is less likelihood that the radiation pattern from one of the two antennas will cause a detrimental level of noise in the other antenna. While there can be an increased likelihood of insufficient antenna isolation if the two side antennas were simultaneously activated, or if the top and bottom antennas were simultaneously activated, this risk is reduced by the angled orientation of the antennas with respect to the belt and may otherwise be influenced by particular system conditions, such as power level. In general, the antennas are disposed so that the gain pattern in one simultaneously activated antenna does not create sufficient noise in any other simultaneously activated antenna to prevent the antennas from receiving responses from the RFID tags at a rate that is acceptable for the particular purposes of the system. Accordingly, while the present embodiment simultaneously drives two antennas at a time, it should be understood that more than two antennas could be operated simultaneously and that combinations of simultaneously driven antennas other than the particular example described herein may be employed.

To the extent the signals transmitted by antennas 76 and 56 have the same power and are in phase with each other where they intersect, the radiation patterns tend to add to each other. Conversely, to the extent they have the same power and are out of phase, the radiation patterns tend to subtract from each other where they intersect. The extent to which this occurs within the system's detection zone depends upon the antenna configuration, the disposition of the antennas, and the lengths of the cables between the power splitter and the antennas. In general, there are points within the detection zone at which the signals from the simultaneously-activated antennas entirely or to some extent cancel, and there are points in the detection zone at which the signals add. Because the RFID tags move through the detection zone, they can be expected to pass through addition zones as well as any cancellation zones that may be present, with the result that the RFID tags may receive and respond to signals from antennas 76 and 56 despite the existence of cancellation areas within the detection zone.

Conversely, when an RFID tag responds to a query signal, the response signal typically reaches antennas 76 and 56 at slightly different times. This can cause some degree of interference when the signals from the antennas are combined at power splitter 814, but the degree of interference is generally insufficient to prevent reader 106 from detecting and reading the response signal.

In the arrangement illustrated in FIGS. 38 and 39, simultaneous activation of two antennas at each antenna activation allows controller 30 to execute, in effect, a two-antenna sequence rather than a four-antenna sequence. Thus, over a given period of time, each of the four antennas is activated twice as often as in the embodiment described above with respect to FIGS. 1 and 2 (assuming that all four antennas are driven in the embodiment discussed with respect to FIGS. 1 and 2), thereby increasing the probability that an RFID tag will be read as it passes through the detection zone. One preferred sequence requires activation of each antenna pair to query for one tag class and then the other. Antenna sequence thread 204 instructs antenna engine 700 to select transmitter and antenna ports 800 and 804, power antennas 76 and 56 on, set their power level and frequencies to transmit to and receive signals from class 0 RFID tags, transmit an RF query signal, and read any corresponding returned signals. Antenna sequence thread 204 then instructs antenna engine 700 to change the power level and frequency of antennas 76 and 56 to query and receive responses from class 1 tags. Antenna sequence thread 204 then instructs engine 700 to switch to transmitter and receiver ports 802 and 806 and attempt to read class 0 and class 1 tags through antennas 46 and 66 in the same manner. The length of time each antenna pair is activated may be selected as part of the system's configuration. In one embodiment, the default activation time is 13 milliseconds (applicable to each of the three tag protocols described herein, i.e. class 0, class 1 and Gen2). Read thread 708 receives the responses received from the RFID tags and passes the information to tracking thread 200. The operation of the read and tracking threads, and the operation of the tracking algorithm in general, is otherwise the same as in the embodiment described above with respect to FIGS. 1 and 2 and is, therefore, not described further herein.

A scout reader (See FIG. 1) may again be provided to make upstream queries for tag type, and the scout thread may provide sufficient instruction to sequence thread 204 so that the sequence thread correspondingly weights the queries to one tag type or another, depending on its prevalence. Because the top antenna 46 is always driven in this example, second photodetector 40 may be omitted.

While one or more preferred embodiments of the invention have been described, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention.

What is claimed is:

1. A conveyor system for processing items on which radio frequency identification tags are disposed, said system comprising:
    a frame;
    a conveyor that is disposed movably on the frame and that conveys items through a path of travel, each item having at least one respective radio frequency identification tag disposed thereon;
    an antenna disposed on the frame with respect to the path of travel so that the antenna radiates radio frequency signals into a first area through which the items pass, wherein the antenna comprises a substrate and a plurality of patch elements having respective generally planar surfaces and that are disposed on the substrate in respective positions that are sequential with respect to a direction transverse to the path of travel,
    wherein the generally planar surfaces of the patch elements are generally coplanar,
    wherein the antenna includes a feed network that applies respective signals to each said patch element that drive electric current at the patch elements to radiate the radio frequency signals,
    wherein the antenna is disposed with respect to the conveyor and the path of travel so that respective said radio frequency identification tags on said items are detected by a near field component of the radio frequency signal radiated by one of the patch elements without interference from the other patch elements, and
    wherein the respective signals applied by the feed network to at least two said patch elements define a predetermined phase shift with respect to each other that is fixed so that respective electric current patterns on the at least two patch elements are out of phase with each other; and
    a radio frequency transmitter that drives the antenna to emit the radio frequency signals into the first area.

2. The system as in claim 1, wherein the respective signals applied by the feed network to each pair of adjacent said patch elements define the predetermined phase shift with respect to each other.

3. The system as in claim 2, wherein the predetermined phase shift between each pair of said adjacent patch elements is the same.

4. The system as in claim 3, wherein the predetermined phase shift between each pair of said adjacent patch elements is approximately 90 degrees.

5. The system as in claim 1, wherein the feed network applies the respective signals from a common source, and wherein the predetermined phase shift is defined by lengths of traces in the feed network between the common source and respective said patch elements.

6. A conveyor system for processing items on which radio frequency identification tags are disposed, said system comprising:
    a frame;
    a generally planar belt that is disposed movably on the frame and that conveys items through a path of travel, each item having at least one respective radio frequency identification tag disposed thereon;
    an antenna disposed on the frame beneath the belt and comprising a substrate and a plurality of patch elements having respective generally planar surfaces and that are disposed on the substrate in respective positions that are sequential with respect to a direction transverse to the path of travel, the antenna being oriented with respect to the belt so that the antenna radiates radio frequency signals into a first area that is proximate the belt and through which the items pass,
    wherein the generally planar surfaces of the patch elements are generally coplanar,
    wherein the antenna includes a feed network that applies respective signals to each said patch element that drive electric current at the patch elements to radiate the radio frequency signals,
    wherein the antenna is disposed with respect to the belt and the path of travel so that respective said radio frequency identification tags on said items are detected by a near field component of the radio frequency signal radiated by one of the patch elements without interference from the other patch elements, and
    wherein the respective signals applied by the feed network to at least two said patch elements define a predetermined phase shift with respect to each other that is fixed so that respective electric current patterns on the at least two patch elements are out of phase with each other; and
    a radio frequency transmitter that drives the antenna to emit the radio frequency signals into the first area.

7. The system as in claim 6, wherein the respective signals applied by the feed network to each pair of adjacent said patch elements define the predetermined phase shift with respect to each other.

8. The system as in claim 7, wherein the predetermined phase shift between each pair of said adjacent patch elements is the same.

9. The system as in claim 8, wherein the predetermined phase shift between each pair of said adjacent patch elements is approximately 90 degrees.

10. The system as in claim 6, wherein the feed network applies the respective signals from a common source, and wherein the predetermined phase shift is defined by lengths of traces in the feed network between the common source and respective said patch elements.

11. A conveyor system for processing items on which radio frequency identification tags are disposed, said system comprising:
    a frame;
    a generally planar belt that is disposed movably on the frame and that conveys items through a path of travel, each item having at least one respective radio frequency identification tag disposed thereon;
    an antenna disposed on the frame beneath the belt and comprising a substrate and a plurality of patch elements having generally planar surfaces and that are disposed on the substrate in tandem with respect to a direction transverse to the path of travel, the antenna being oriented with respect to the belt so that the antenna radiates radio frequency signals into a first area that is proximate the belt and through which the items pass and receives responses to the radio frequency signals from the respective radio frequency identification tags on the items on the belt, wherein the generally planar surfaces of the patch elements are generally coplanar, wherein the antenna includes a feed network that applies respective signals to each said patch element that drive electric current at the patch elements to radiate the radio frequency signals, wherein the antenna is disposed with respect to the belt and the path of travel so that respective said radio frequency identification tags on said items are detected by a near field component of the radio frequency signal radiated by one of the patch elements without interference from the other patch elements, and wherein the respective signals applied by the feed network to each pair of adjacent said patch elements define a predetermined phase shift with respect to each other that is fixed so that respective electric current patterns on the pair of adjacent patch elements are out of phase with each other;

a radio frequency transmitter that drives the antenna to emit the radio frequency signals into the first area; and a radio frequency receiver that receives signals from the antenna corresponding to the responses received by the antenna from the respective radio frequency identification tags and outputs first signals corresponding to the responses.

12. The system as in claim 11, wherein the predetermined phase shift between each said pair of adjacent patch elements is the same.

13. The system as in claim 12, wherein the predetermined phase shift is approximately 90 degrees.

14. The system as in claim 11, wherein the feed network applies the respective signals from a common source, and wherein the predetermined phase shift is defined by lengths of traces in the feed network between the common source and respective said patch elements.

15. A method of processing items on which radio frequency identification tags are disposed, said method comprising the steps of:

providing a frame;

providing a conveyor disposed movably on the frame that conveys items through a path of travel, each item having at least one respective radio frequency identification tag disposed thereon;

providing an antenna on the frame with respect to the path of travel so that the antenna radiates radio frequency signals into a first area through which the items pass, wherein the antenna comprises a substrate and a plurality of patch elements having respective generally planar surfaces and that are disposed on the substrate in respective positions that are sequential with respect to a direction transverse to the path of travel, wherein the generally planar surfaces of the patch elements are generally coplanar, and wherein the antenna includes a feed network that applies respective signals to each said patch element that drive electric current at the patch elements to radiate the radio frequency signals;

applying the respective signals by the feed network to at least two said patch elements, wherein the respective signals define a predetermined phase shift with respect to each other that is fixed;

providing a radio frequency transmitter that drives the antenna to emit the radio frequency signals into the first area so that respective electric current patterns on the at least two patch elements are out of phase with each other; and conveying items on the conveyor through the path of travel so that respective said radio frequency identification tags on said items are detected by a near field component of the radio frequency signals radiated by one of the patch elements without interference from the other patch elements.

16. The method as in claim 15, wherein the applying step comprises applying the respective signals by the feed network to each pair of adjacent said patch elements defining the predetermined phase shift with respect to each other.

17. The method as in claim 16, wherein the predetermined phase shift between each pair of said adjacent patch elements is the same.

18. The method as in claim 15, wherein the feed network applies the respective signals from a common source, and wherein the predetermined phase shift is defined by lengths of traces in the feed network between the common source and respective said patch elements.

* * * * *